United States Patent
Chu

(10) Patent No.: US 11,107,492 B1
(45) Date of Patent: Aug. 31, 2021

(54) OMNI-DIRECTIONAL SPEECH SEPARATION

(71) Applicant: Amazon Technologies, Inc., Seattle, WA (US)

(72) Inventor: Wai Chung Chu, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/574,852

(22) Filed: Sep. 18, 2019

(51) Int. Cl.
| | |
|---|---|
| *G10L 21/028* | (2013.01) |
| *H04R 1/40* | (2006.01) |
| *H04R 3/00* | (2006.01) |
| *G10L 25/21* | (2013.01) |

(52) U.S. Cl.
CPC ............ *G10L 21/028* (2013.01); *G10L 25/21* (2013.01); *H04R 1/406* (2013.01); *H04R 3/005* (2013.01)

(58) Field of Classification Search
None
See application file for complete search history.

(56) References Cited

U.S. PATENT DOCUMENTS

| | | | | |
|---|---|---|---|---|
| 5,625,697 A | * | 4/1997 | Bowen .................... | H04M 9/08 381/92 |
| 2004/0037436 A1 | * | 2/2004 | Rui ........................ | H04R 3/005 381/92 |
| 2011/0131044 A1 | * | 6/2011 | Fukuda ................... | G10L 15/20 704/246 |
| 2012/0140947 A1 | * | 6/2012 | Shin ....................... | H04R 3/005 381/92 |

* cited by examiner

*Primary Examiner* — James K Mooney
(74) *Attorney, Agent, or Firm* — Pierce Atwood LLP

(57) ABSTRACT

A system configured to perform directional speech separation using three or more microphones. The system may dynamically associate direction-of-arrivals with one or more audio sources in order to generate output audio data that separates each of the audio sources. Using three or more microphones, the system may separate audio sources covering 360 degrees surrounding the microphone array, whereas a two-microphone implementation is limited to 180 degrees. The system identifies a target direction for each audio source, dynamically determines directions that are correlated with the target direction, and generates output signals for each audio source. The system may associate individual frequency bands with specific directions based on a phase difference detected by two or more microphones.

20 Claims, 33 Drawing Sheets

FIG. 1
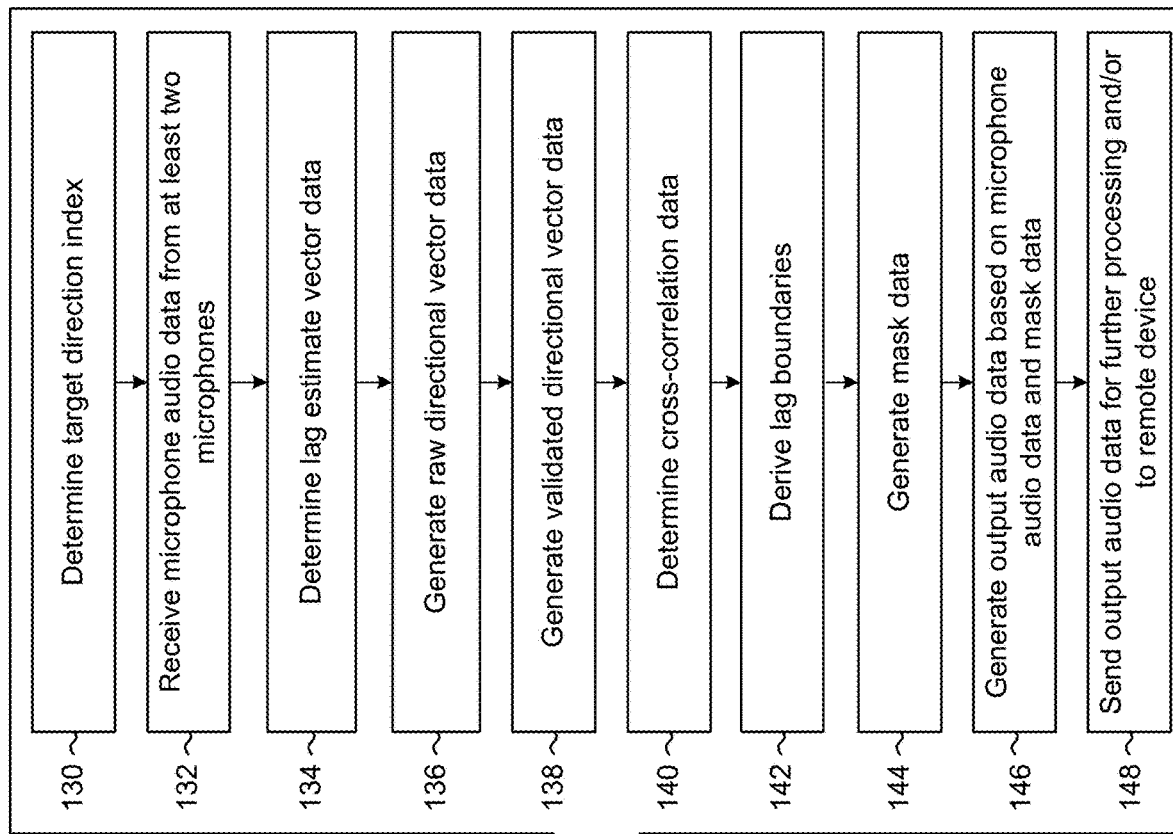
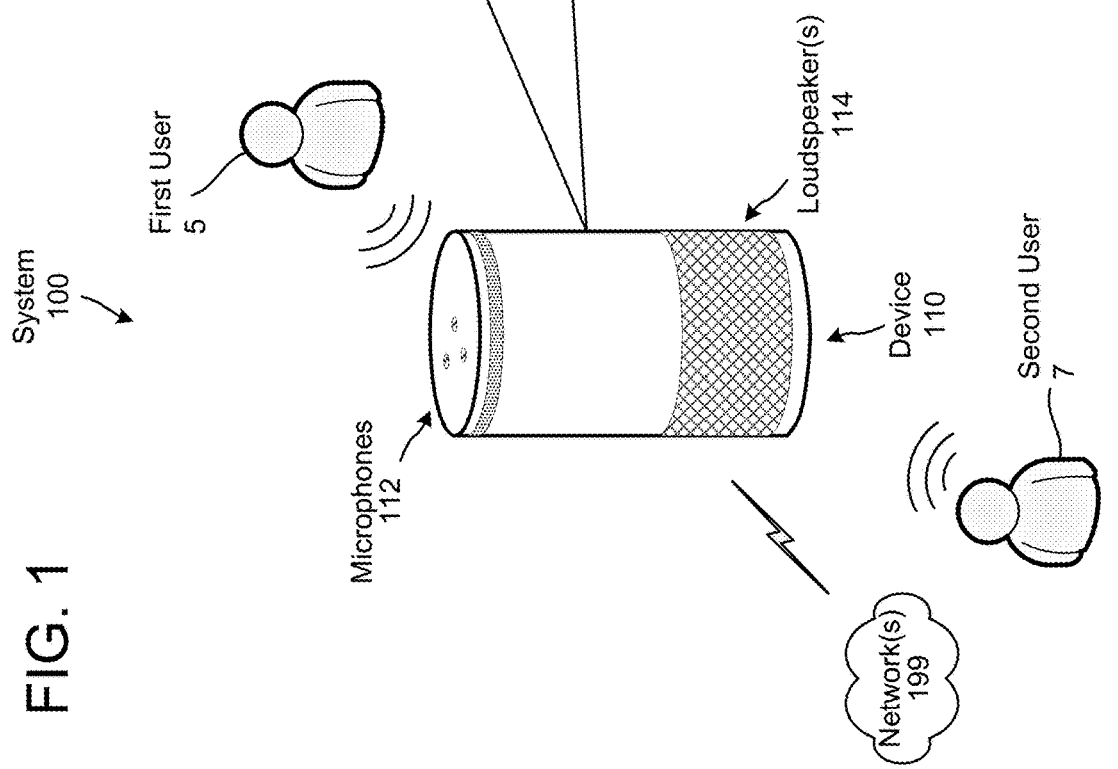

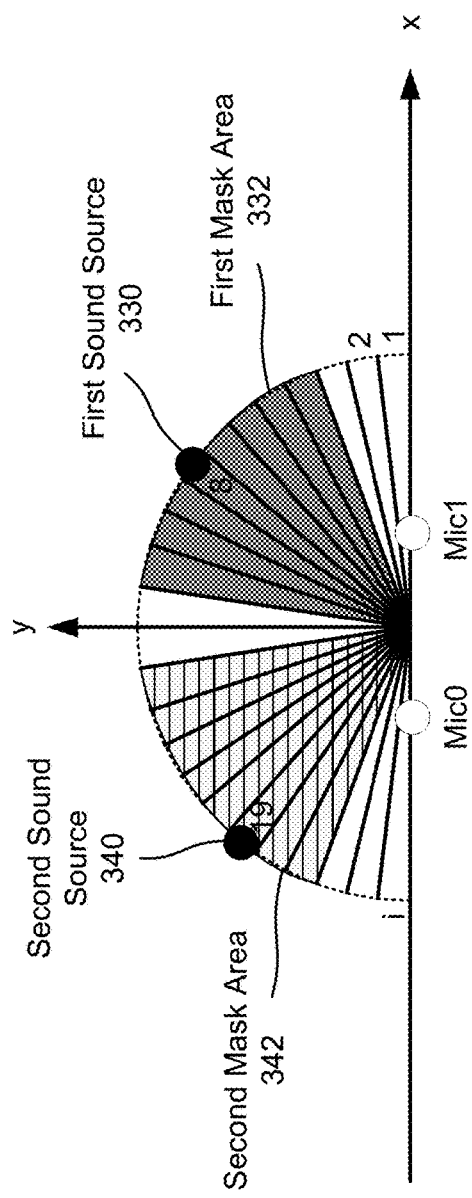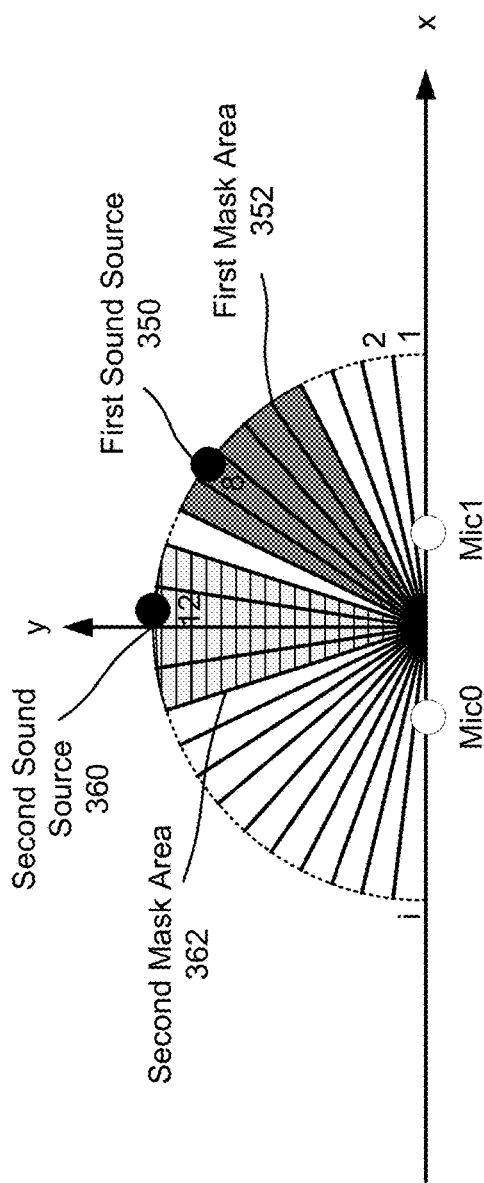

FIG. 4
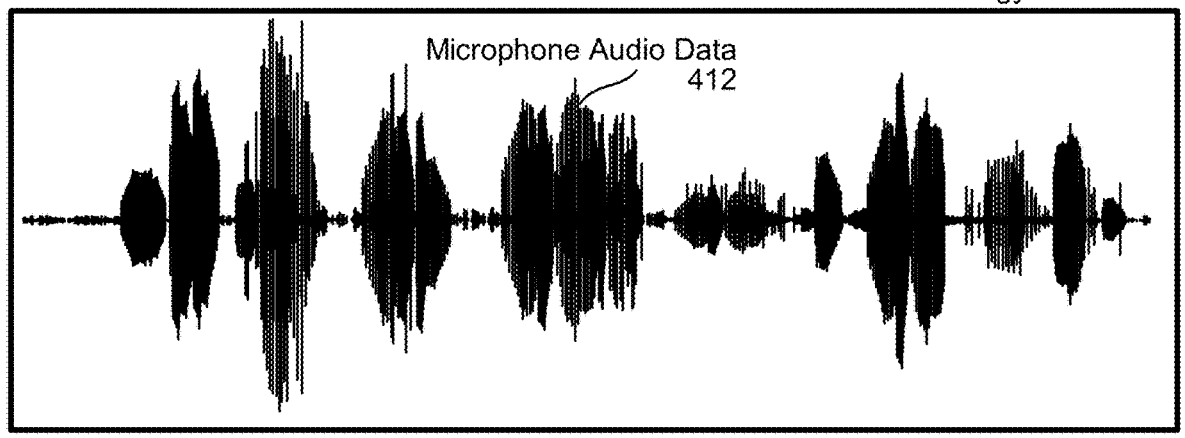
Energy Chart 410
Microphone Audio Data 412
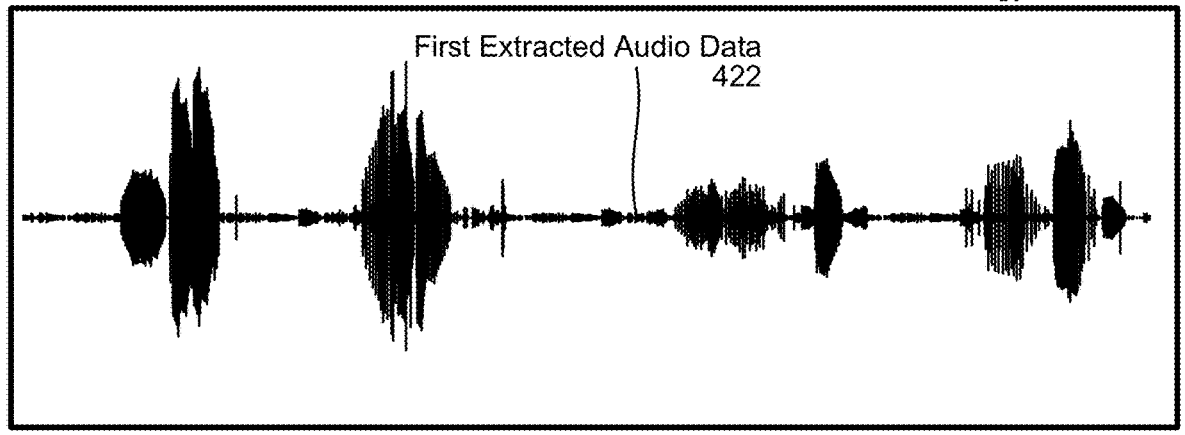
Energy Chart 420
First Extracted Audio Data 422
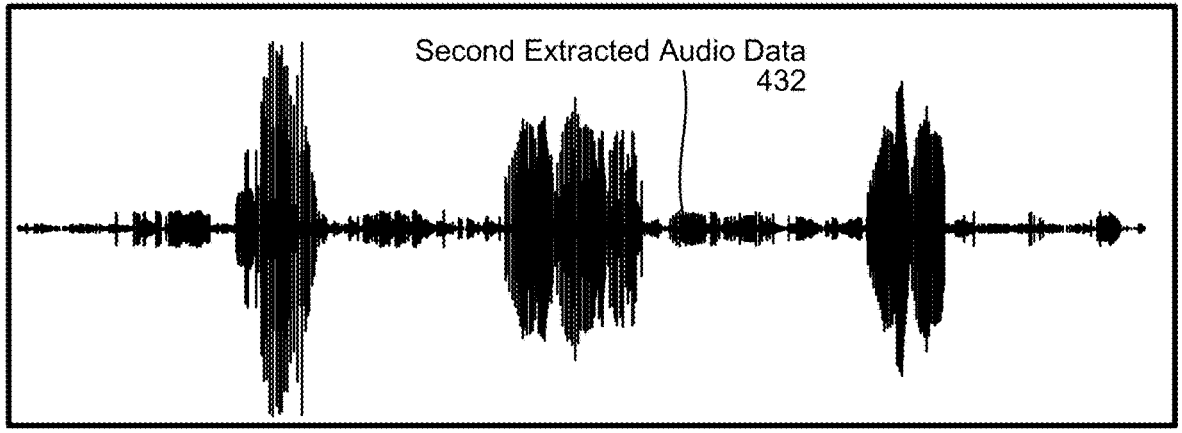
Energy Chart 430
Second Extracted Audio Data 432

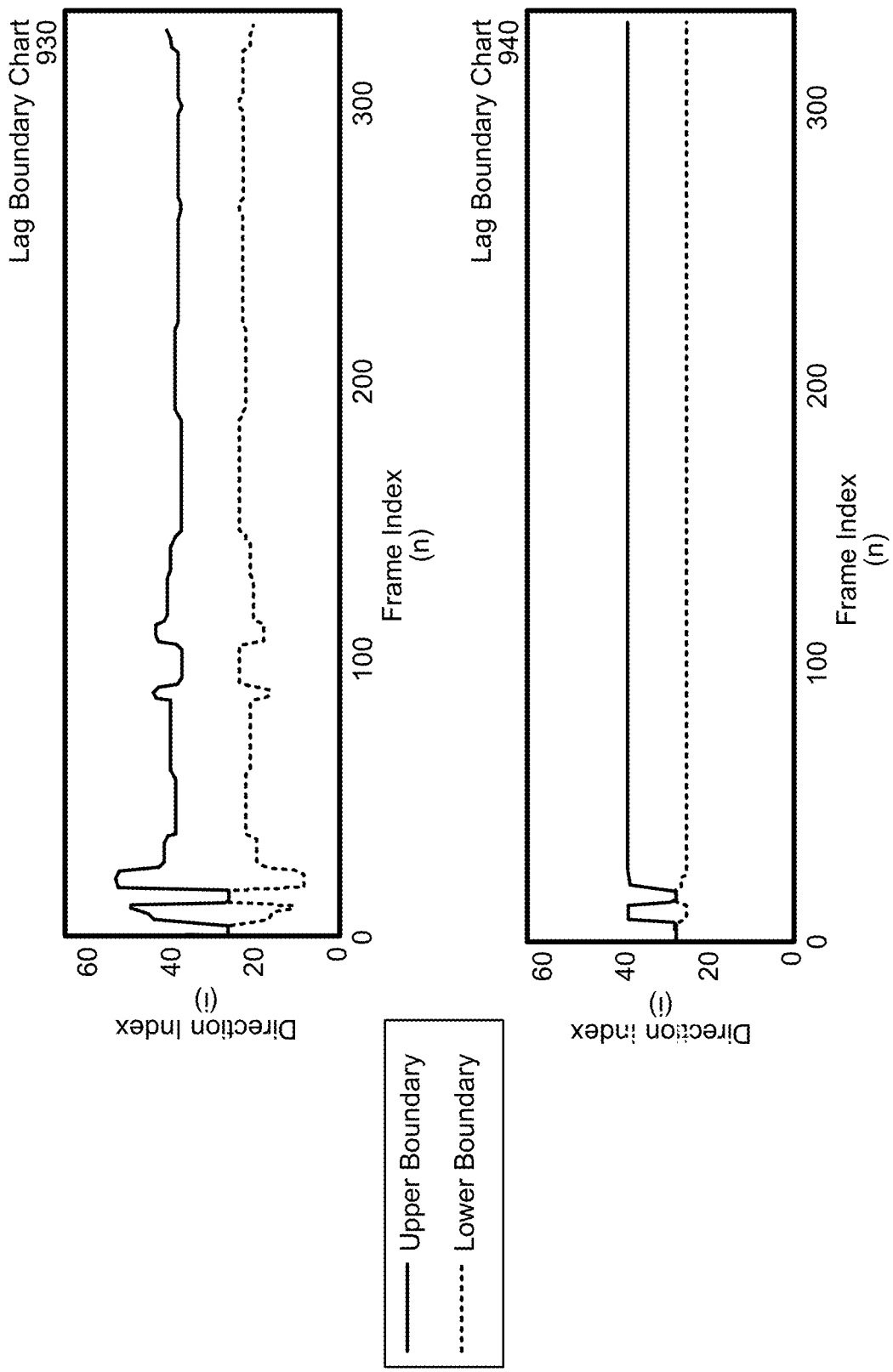

FIG. 17
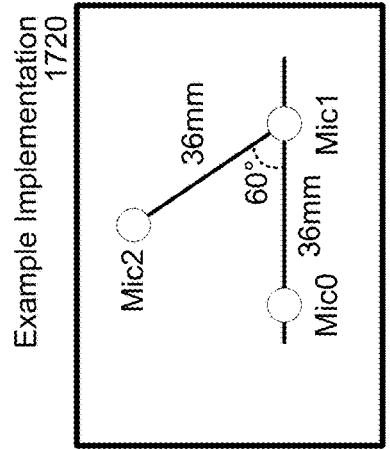
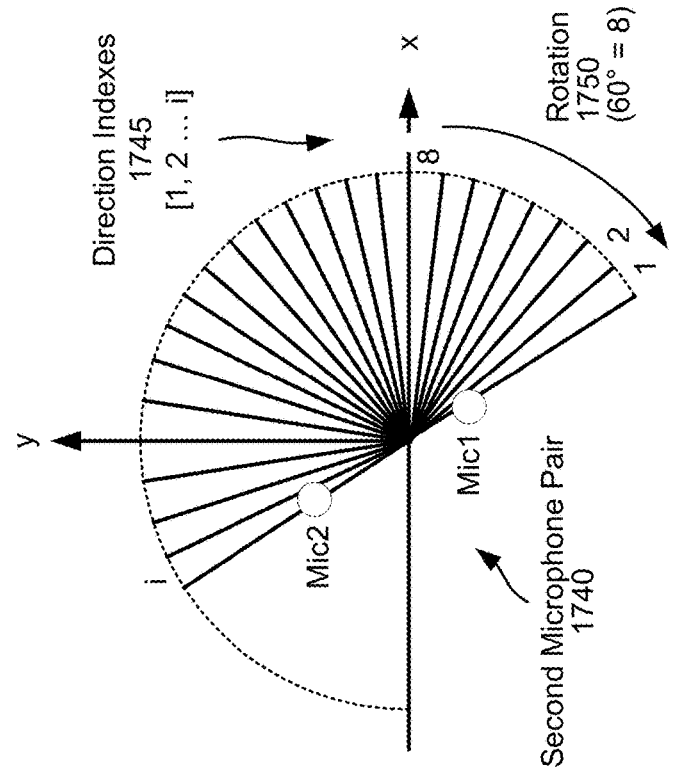
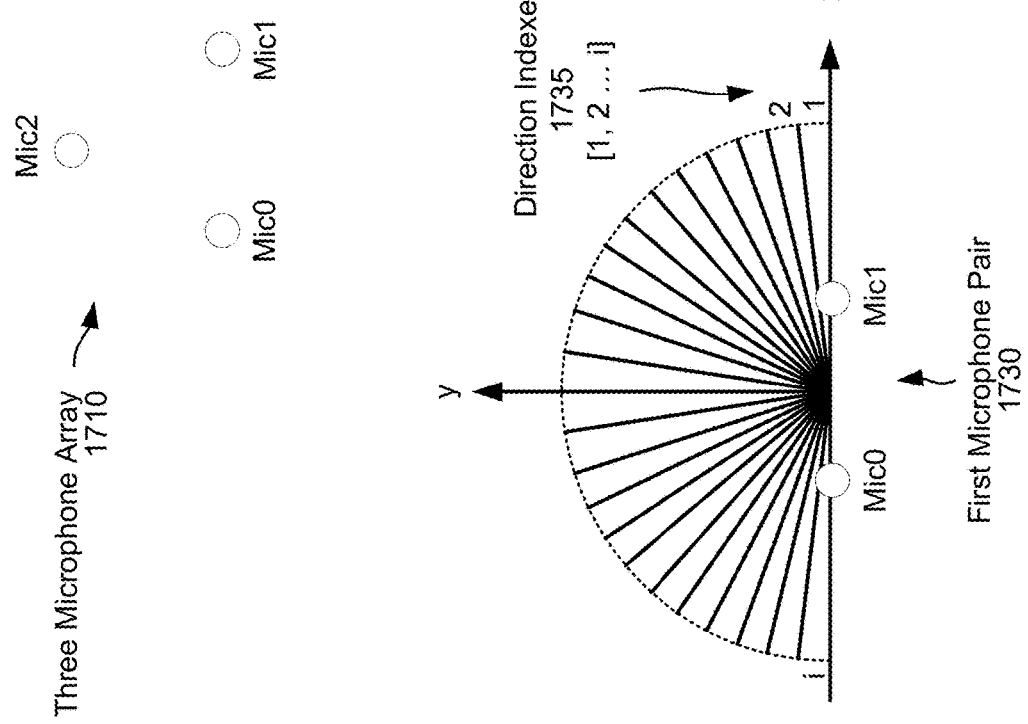

FIG. 18
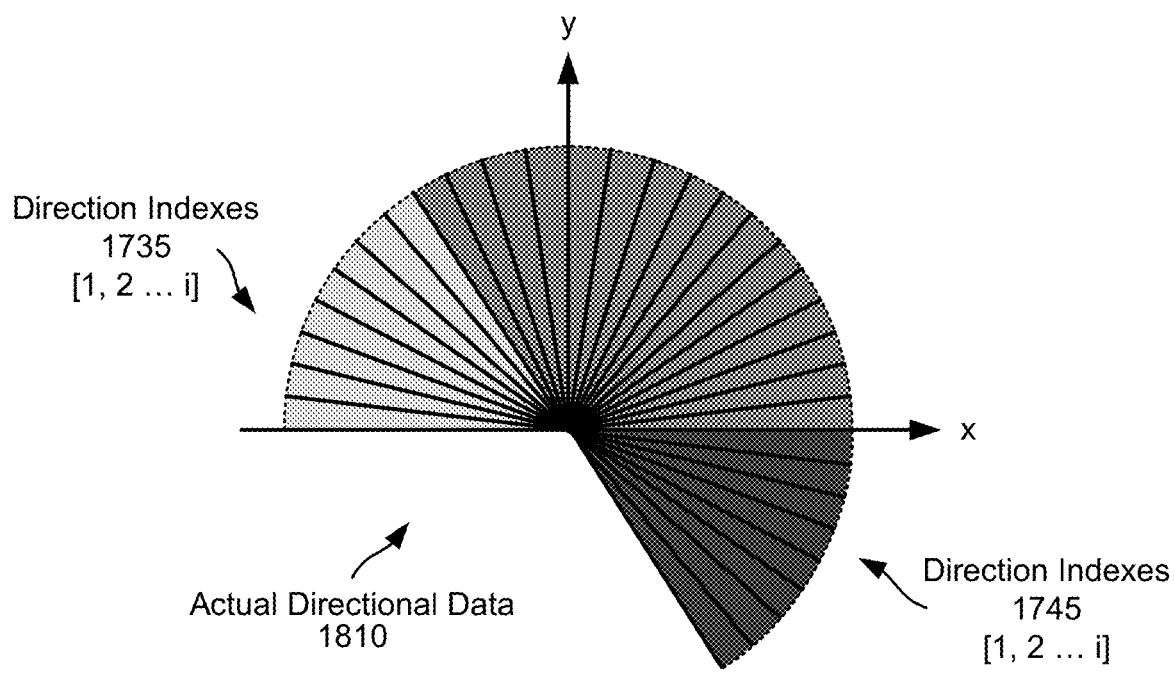
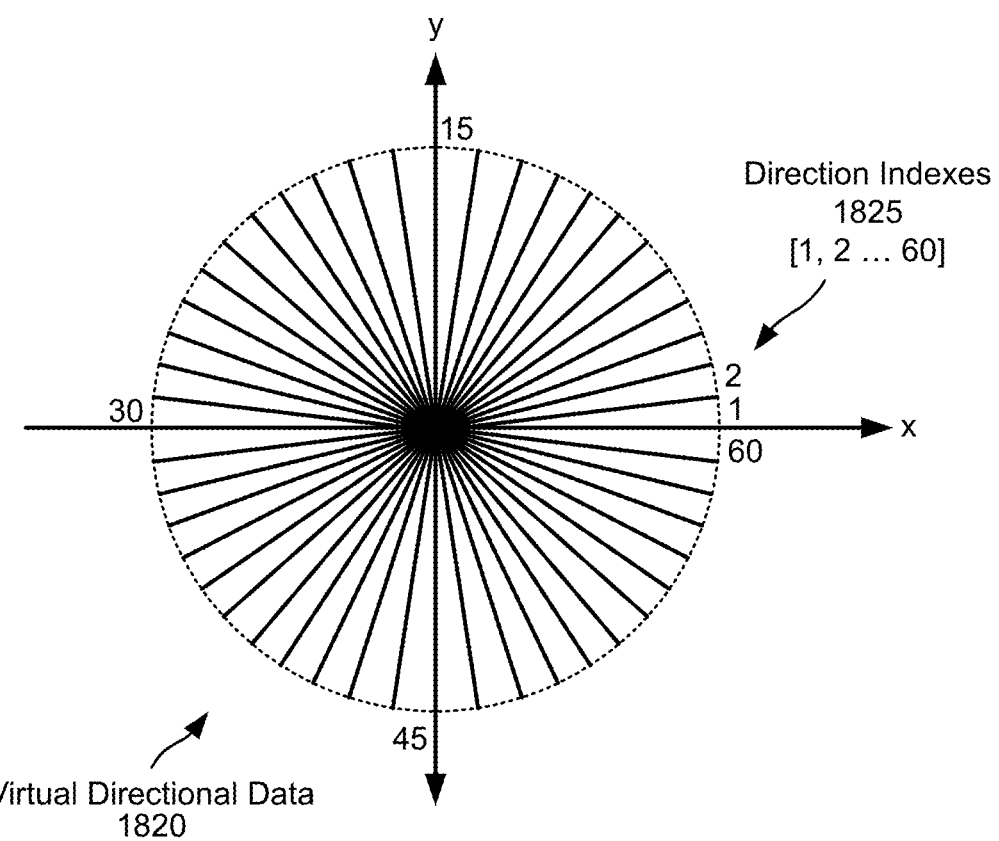

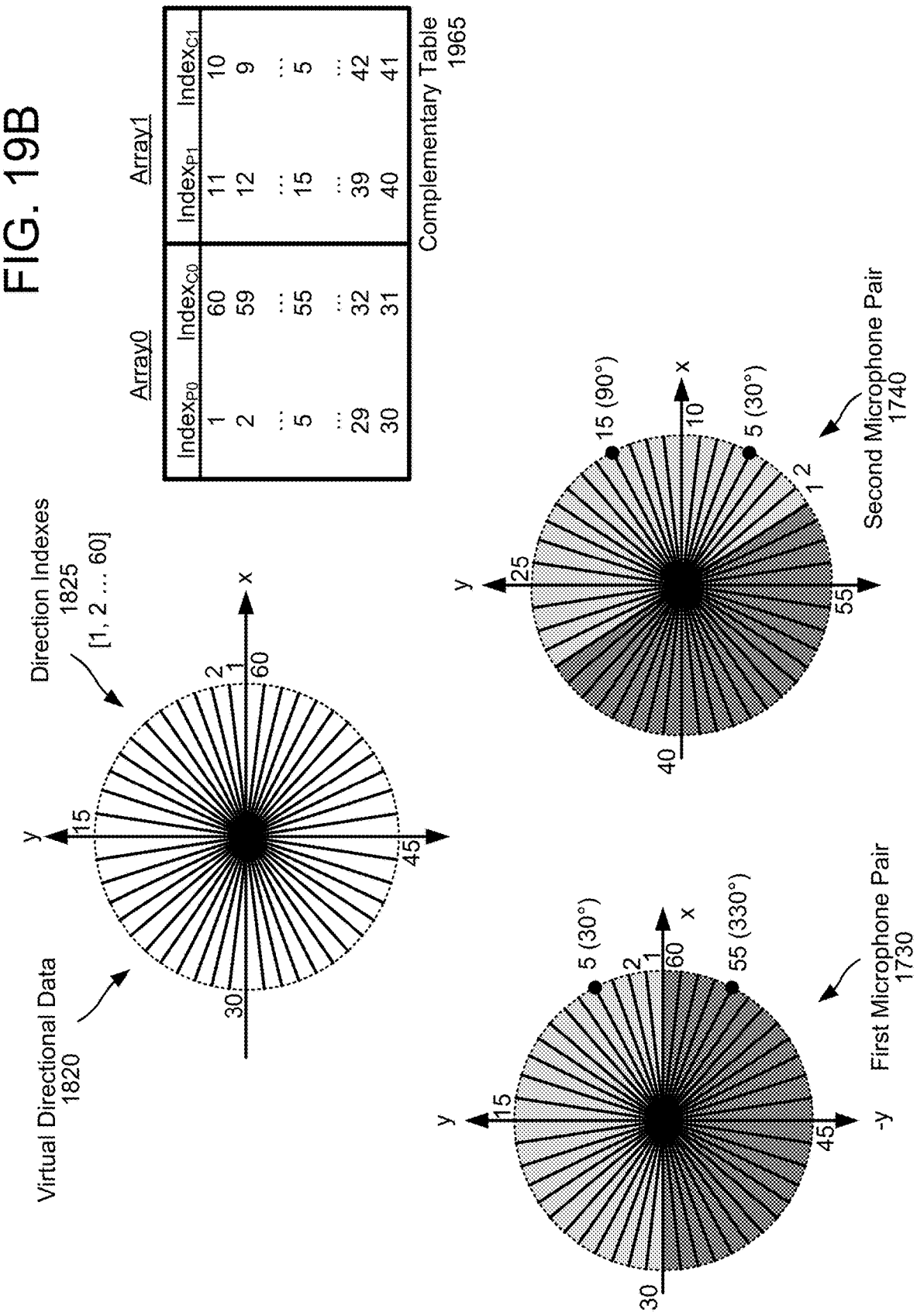

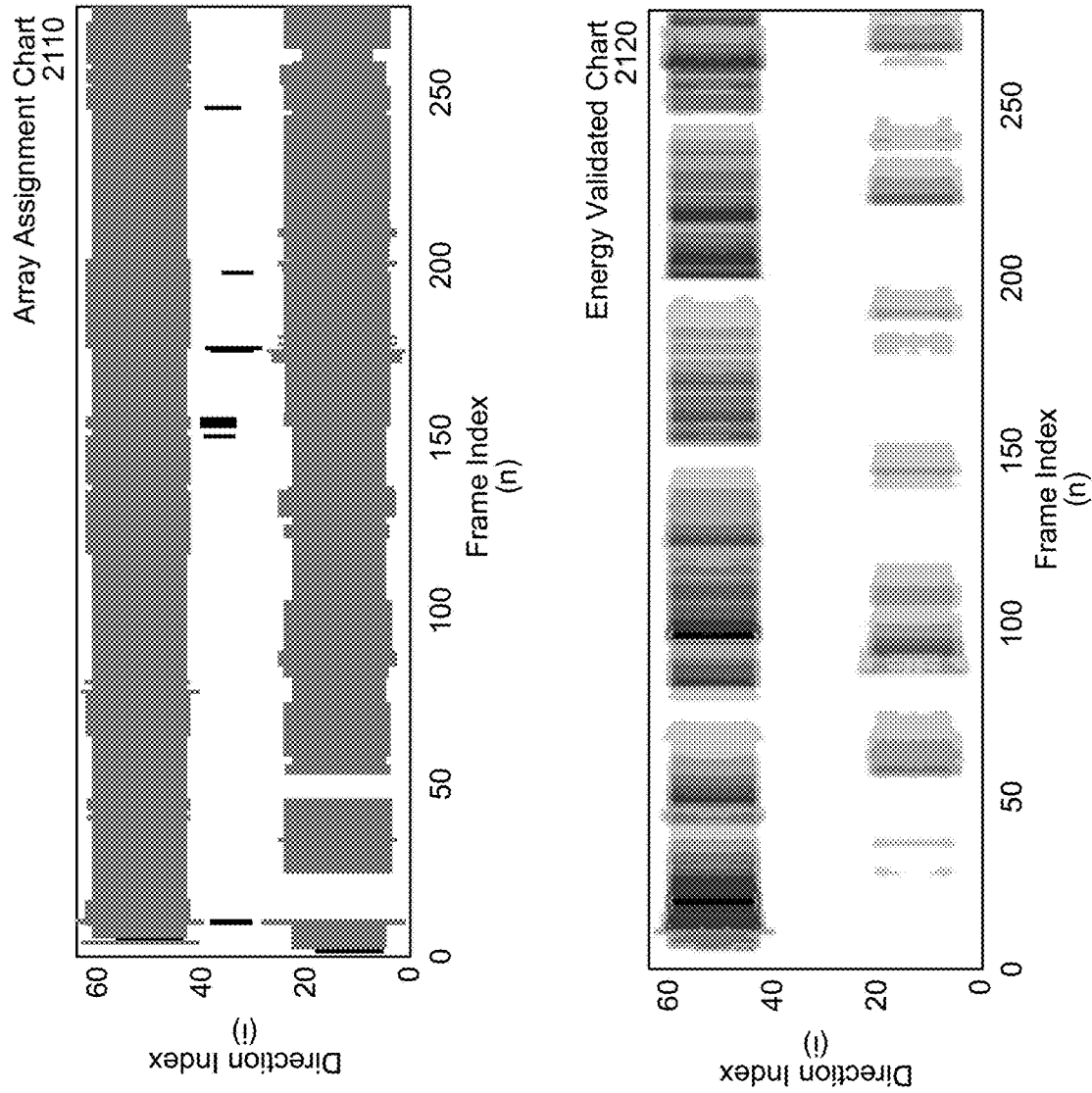

OMNI-DIRECTIONAL SPEECH SEPARATION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 1 illustrates a system according to embodiments of the present disclosure.

FIGS. 3A-3D illustrate examples of separating sound sources based on an angle of arrival according to examples of the present disclosure.

FIG. 4 illustrates an example of extracting audio data corresponding to different directions according to examples of the present disclosure.

FIGS. 9A-9B illustrate examples of deriving lag boundaries based on the cross-correlation data according to examples of the present disclosure.

FIG. 17 illustrates an example of separating sound sources based on an angle of arrival using three microphones according to examples of the present disclosure.

FIG. 18 illustrates an example of combining direction indexes from two microphone pairs to generate direction indexes covering 360 degrees according to examples of the present disclosure.

FIGS. 19A-19B illustrate examples of identifying primary and complementary direction indexes for both microphone pairs according to examples of the present disclosure.

FIG. 21 illustrates an example of an array assignment chart and an energy validation chart according to examples of the present disclosure.

DETAILED DESCRIPTION

Figure 2A:
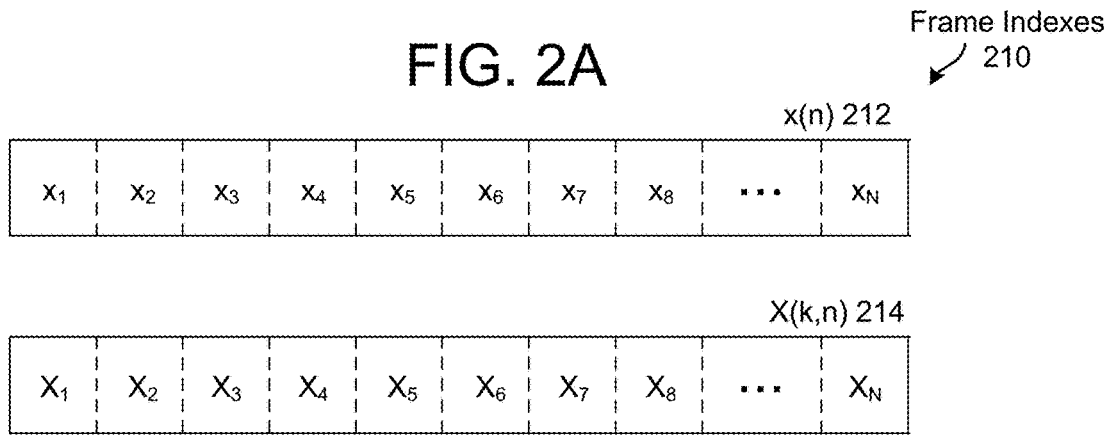
FIGS. 2A-2C illustrate examples of frame indexes, tone indexes, and channel indexes.

Electronic devices may be used to capture audio and process audio data. The audio data may be used for voice commands and/or sent to a remote device as part of a communication session. To process voice commands from a particular user or to send audio data that only corresponds to the particular user, the device may attempt to isolate desired speech associated with the user from undesired speech associated with other users and/or other sources of noise, such as audio generated by loudspeaker(s) or ambient noise in an environment around the device.

To isolate the desired speech, some techniques perform acoustic echo cancellation to remove, from the audio data, an "echo" signal corresponding to the audio generated by the loudspeaker(s), thus isolating the desired speech to be used for voice commands and/or the communication session from whatever other audio may exist in the environment of the user. Other techniques solve this problem by estimating the noise (e.g., undesired speech, echo signal from the loudspeaker, and/or ambient noise) based on the audio data captured by a microphone array. For example, these techniques may include fixed beamformers that beamform the audio data (e.g., separate the audio data into portions that corresponds to individual directions) and then perform acoustic echo cancellation using a target signal associated with one direction and a reference signal associated with a different direction (or all remaining directions). However, beamforming corresponds to linear filtering, which combines (linearly, through multiplication and addition) signals from different microphones. Thus, beamforming separates the audio data into uniform portions, which may not correspond to locations of audio sources.

To improve directional speech separation, devices, systems and methods are disclosed that dynamically determine directions of interest associated with individual audio sources. For example, the system can identify a target direction associated with an audio source and dynamically determine other directions of interest that are correlated with audio data from the target direction. The system may associate individual frequency bands with specific directions of interest based on a time delay (e.g., lag) between input audio data generated by two microphones. Using two microphone pairs, the system may identify the specific directions within the range of interest. For example, as the two microphone pairs are rotated relative to each other, the system may determine a time delay associated with an audio source using a first microphone pair and then validate whether the time delay corresponds to a first direction of interest or a second direction of interest using the second microphone pair.

After separating the input audio data into different directions of interest, the system may generate energy data indicating an amount of energy associated with a direction at a certain time. The system may determine a cross-correlation between energy data associated with each direction and energy data associated with the target direction and may select directions that are correlated above a threshold. The system may generate time-frequency mask data that indicates individual frequency bands that correspond to the directions of interest associated with a particular audio source. Using this mask data, the device can generate output audio data that is specific to the audio source, resulting in directional speech separation between different audio sources.

FIG. 1 illustrates a high-level conceptual block diagram of a system 100 configured to perform directional speech separation. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include a device 110 that may be communicatively coupled to network(s) 199 and that may include microphone(s) 112 and loudspeaker(s) 114. Using the microphone(s) 112, the device 110 may capture audio data that includes a representation of first speech from a first user 5, a representation of second speech from a second user 7, a representation of audible sound output by loudspeaker(s) 114 and/or wireless loudspeaker(s) (not shown), and/or a representation of ambient noise in an environment around the device 110.

The device 110 may be an electronic device configured to capture, process and send audio data to remote devices. For ease of illustration, some audio data may be referred to as a signal, such as a playback signal x(t), an echo signal y(t), an echo estimate signal y'(t), a microphone signal z(t), an error signal m(t), or the like. However, the signals may be comprised of audio data and may be referred to as audio data (e.g., playback audio data x(t), echo audio data y(t), echo estimate audio data y'(t), microphone audio data z(t), error audio data m(t), etc.) without departing from the disclosure. As used herein, audio data (e.g., playback audio data, microphone audio data, or the like) may correspond to a specific range of frequency bands. For example, the playback audio data and/or the microphone audio data may correspond to a human hearing range (e.g., 20 Hz-20 kHz), although the disclosure is not limited thereto.

The device 110 may include two or more microphone(s) 112 and/or one or more loudspeaker(s) 114, although the disclosure is not limited thereto and the device 110 may include additional components without departing from the disclosure. The microphone(s) 112 may be included in a microphone array without departing from the disclosure. For ease of explanation, however, individual microphones included in a microphone array will be referred to as microphone(s) 112.

The techniques described herein are configured to perform directional source separation to separate audio data generated at a distance from the device 110. In some examples, the device 110 may send audio data to the loudspeaker(s) 114 and/or to wireless loudspeaker(s) (not shown) for playback. When the loudspeaker(s) 114 generate playback audio based on the audio data, the device 110 may perform additional audio processing prior to and/or subsequent to performing directional source separation. For example, the device 110 may perform acoustic echo cancellation on input audio data captured by the microphone(s) 112 prior to performing directional source separation (e.g., to remove echo from audio generated by the loudspeaker(s) 114) without departing from the disclosure. Additionally or alternatively, the device 110 may perform acoustic noise cancellation, acoustic interference cancellation, residual echo suppression, and/or the like on the output audio data generated after performing directional source separation. However, the disclosure is not limited thereto and the device 110 may not send audio data to the loudspeaker(s) 114 without departing from the disclosure.

While FIG. 1 illustrates that the microphone(s) 112 may capture audible sound from the loudspeaker(s) 114, this is intended for illustrative purposes only and the techniques disclosed herein may be applied to any source of audible sound without departing from the disclosure. For example, the microphone(s) 112 may capture audible sound generated by a device that includes external loudspeaker(s) (not shown) (e.g., a television) or from other sources of noise (e.g., mechanical devices such as a washing machine, microwave, vacuum, etc.). Additionally or alternatively, while FIG. 1 only illustrates the loudspeaker(s) 114, the disclosure is not limited thereto and the microphone(s) 112 may capture audio data from multiple loudspeakers and/or multiple sources of noise without departing from the disclosure.

The first user 5 may control the device 110 using voice commands and/or may use the device 110 for a communication session with a remote device (not shown). In some examples, the device 110 may send microphone audio data to the remote device as part of a Voice over Internet Protocol (VoIP) communication session. For example, the device 110 may send the microphone audio data to the remote device either directly or via remote server(s) (not shown). However, the disclosure is not limited thereto and in some examples, the device 110 may send the microphone audio data to the remote server(s) in order for the remote server(s) to determine a voice command. For example, the microphone audio data may include a voice command to control the device 110 and the device 110 may send the microphone audio data to the remote server(s), the remote server(s) 120 may determine the voice command represented in the microphone audio data and perform an action corresponding to the voice command (e.g., execute a command, send an instruction to the device 110 and/or other devices to execute the command, etc.). In some examples, to determine the voice command the remote server(s) may perform Automatic Speech Recognition (ASR) processing, Natural Language Understanding (NLU) processing and/or command processing. The voice commands may control the device 110, audio devices (e.g., play music over loudspeakers, capture audio using microphones, or the like), multimedia devices (e.g., play videos using a display, such as a television, computer, tablet or the like), smart home devices (e.g., change temperature controls, turn on/off lights, lock/unlock doors, etc.) or the like without departing from the disclosure.

The device 110 may perform directional speech separation in order to isolate audio data associated with each audio source. For example, the device 110 may generate first output audio data corresponding to a first audio source (e.g., isolate first speech generated by the first user 5), may generate second output audio data corresponding to a second audio source (e.g., isolate second speech generated by the second user 7), and/or generate third output audio data corresponding to a third audio source (e.g., isolate audible sounds associated with a wireless loudspeaker or other localized sources of sound). By separating the audio data according to each audio source, the device 110 may suppress undesired speech, echo signals, noise signals, and/or the like.

To illustrate an example, the device 110 may send playback audio data x(t) to wireless loudspeaker(s) and the loudspeaker(s) may generate playback audio (e.g., audible sound) based on the playback audio data x(t). A portion of the playback audio captured by the microphone(s) 112 may be referred to as an "echo," and therefore a representation of at least the portion of the playback audio may be referred to as echo audio data y(t). Using the microphone(s) 112, the device 110 may capture input audio as microphone audio data z(t), which may include a representation of the first speech from the first user 5 (e.g., first speech $s_1(t)$, which may be referred to as target speech), a representation of the second speech from the second user 7 (e.g., second speech $s_2(t)$, which may be referred to as distractor speech or non-target speech), a representation of the ambient noise in the environment around the device 110 (e.g., noise n(t)), and a representation of at least the portion of the playback audio (e.g., echo audio data y(t)). Thus, the microphone audio data may correspond to $z(t)=s_1(t))+s_2(t))+y(t)+n(t)$.

Conventional techniques perform acoustic echo cancellation to remove the echo audio data y(t) from the microphone audio data z(t) and isolate the first speech $s_1(t)$ (e.g., target speech). However, as the device cannot determine the echo audio data y(t) itself, the device instead generates echo estimate audio data y'(t) that corresponds to the echo audio data y(t). Thus, when the device removes the echo estimate signal y'(t) from the microphone signal z(t), the device is removing at least a portion of the echo signal y(t). The device 110 may remove the echo estimate audio data y'(t), the second speech $s_2(t)$, and/or the noise n(t) from the microphone audio data z(t) to generate an error signal m(t), which roughly corresponds to the first speech $s_1(t)$.

A typical Acoustic Echo Canceller (AEC) estimates the echo estimate audio data y'(t) based on the playback audio data x(t), and may not be configured to remove the second speech $s_2(t)$ (e.g., distractor speech) and/or the noise n(t). In addition, if the device does not send the playback audio data x(t) to the loudspeaker(s) 114 and/or the wireless loudspeaker(s), the typical AEC may not be configured to estimate or remove the echo estimate audio data y'(t).

To improve performance of the typical AEC, and to remove the echo when the loudspeaker(s) 114 is not controlled by the device, an AEC may be implemented using a fixed beamformer and may generate the echo estimate audio data y'(t) based on a portion of the microphone audio data z(t). For example, the fixed beamformer may separate the microphone audio data z(t) into distinct beamformed audio data associated with fixed directions (e.g., first beamformed audio data corresponding to a first direction, second beamformed audio data corresponding to a second direction, etc.), and the AEC may use a first portion (e.g., first beamformed audio data, which correspond to the first direction associated with the first user 5) as a target signal and a second portion (e.g., second beamformed audio data, third beamformed audio data, and/or remaining portions) as a reference signal. Thus, the AEC may generate the echo estimate audio data y'(t) from the reference signal and remove the echo estimate audio data y'(t) from the target signal. As this technique is capable of removing portions of the echo estimate audio data y'(t), the second speech $s_2(t)$, and/or the noise n(t), this may be referred to as an Acoustic Interference Canceller (AIC) instead of an AEC.

While the AIC implemented with beamforming is capable of removing acoustic interference associated with a distributed source (e.g., ambient environmental noise, reflections of the echo, etc., for which directionality is lost), performance suffers when attempting to remove acoustic interference associated with a localized source such as a wireless loudspeaker(s).

To improve output audio data, the device 110 illustrated in FIG. 1 may use two or more microphones 112 to perform speech signal separation. Based on a time delay between audio generated by an audio source being received by each of the microphones 112, the device 110 may determine an azimuth or direction-of-arrival (DOA) associated with the audio source. Using the azimuth or DOA information, the device 110 may distinguish between audio sources and generate output audio data associated with each of the audio sources. For example, the device 110 may generate first output audio data associated with a first audio source at a first azimuth and generate second output audio data associated with a second audio source at a second azimuth.

In contrast to linear filtering such as beamforming, the device 110 may dynamically determine which directions to associate with each audio source. For example, if the first audio source is well-separated from the second audio source, the device 110 may generate the first output audio data including first audio data associated with a first number of directions (e.g., direction-of-arrivals within 45 degrees of the audio source). However, if the second audio source is not well-separated from the second audio source, the device 110 may generate the first output audio data including second audio data associated with a second number of directions (e.g., direction-of-arrivals within 20 degrees of the audio source).

The device 110 may determine which directions to associate with an audio source based on a cross-correlation between energy values associated with each direction of interest over time and energy values associated with a target direction over time. Thus, the device 110 is selecting directions of interest by determining whether energy values of corresponding audio data is strongly correlated to energy values of audio data associated with the target direction (e.g., cross-correlation value exceeds a threshold value and/or satisfies a condition). In order to improve the output audio data generated for each audio source, the device 110 may determine a direction-of-arrival for individual frequency bands of the input audio data.

Figure 2B:
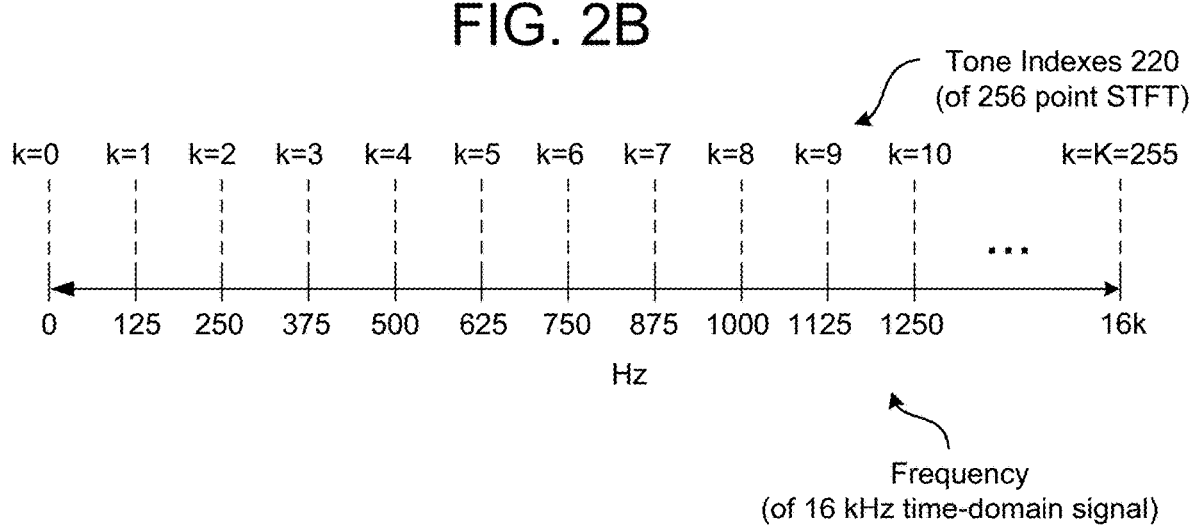
Figure 2C:
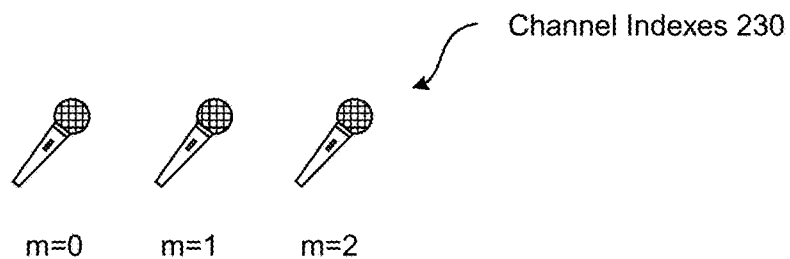

FIGS. 2A-2C illustrate examples of frame indexes, tone indexes, and channel indexes. The device 110 may generate input audio data using microphone(s) 112. For example, the microphone(s) 112 may generate first input audio data in a time domain. For computational efficiency, however, the system 100 may convert the first input audio data to second input audio data in a frequency domain prior to processing the input audio data. Thus, the first input audio data (e.g., time-discrete signal) is transformed into the second input audio data in the frequency domain or subband domain. To convert from the time domain to the frequency or subband domain, the system 100 may use Discrete Fourier Transforms (DFTs), such as Fast Fourier transforms (FFTs), short-time Fourier Transforms (STFTs), and/or the like.

The following high level description of converting from the time domain to the frequency domain refers to microphone audio data x(n), which is a time-domain signal comprising output from the microphone(s) 112. As used herein, variable x(n) corresponds to the time-domain signal, whereas variable X(n) corresponds to a frequency-domain signal (e.g., after performing FFT on the microphone audio data x(n)). A Fast Fourier Transform (FFT) is a Fourier-related transform used to determine the sinusoidal frequency and phase content of a signal, and performing FFT produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data X(n). However, the disclosure is not limited thereto and the system 100 may instead perform STFT without departing from the disclosure. A short-time Fourier transform (STFT) is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency domain representation of that same waveform comprises a plurality of discrete amplitude values, where each amplitude value is for a different tone or "bin." So, for example, if the sound wave consisted solely of a pure sinusoidal 1 kHz tone, then the frequency domain representation would consist of a discrete amplitude spike in the bin containing 1 kHz, with the other bins at zero. In other words, each tone "k" is a frequency index (e.g., frequency bin).

FIG. 2A illustrates an example of frame indexes 210 including microphone audio data x(n) 212 in the time domain and microphone audio data X(k,n) 214 in the frequency domain. For example, the system 100 may apply a FFT to the time-domain microphone audio data x(n) 212, producing the frequency-domain microphone audio data X(k,n) 214, where the tone index "k" ranges from 0 to K and "n" is a frame index ranging from 0 to N. As illustrated in FIG. 2A, the history of the values across iterations is provided by the frame index "n", which ranges from 1 to N and represents a series of samples over time.

FIG. 2B illustrates an example of performing a K-point FFT on a time-domain signal. As illustrated in FIG. 2B, if a 256-point FFT is performed on a 16 kHz time-domain signal, the output is 256 complex numbers, where each complex number corresponds to a value at a frequency in increments of 16 kHz/256, such that there is 125 Hz between points, with point 0 corresponding to 0 Hz and point 255 corresponding to 16 kHz. As illustrated in FIG. 2B, each tone index 220 in the 256-point FFT corresponds to a frequency range (e.g., subband) in the 16 kHz time-domain signal. While FIG. 2B illustrates the frequency range being divided into 256 different subbands (e.g., tone indexes), the disclosure is not limited thereto and the system 100 may divide the frequency range into K different subbands. While FIG. 2B illustrates the tone index 220 being generated using a Fast Fourier Transform (FFT), the disclosure is not limited thereto. Instead, the tone index 220 may be generated using Short-Time Fourier Transform (STFT), generalized Discrete Fourier Transform (DFT) and/or other transforms known to one of skill in the art (e.g., discrete cosine transform, non-uniform filter bank, etc.).

Given a signal x(j, n), the FFT X(k,n) of x(j, n) is defined by $$X(k,n) = \Sigma_{j=0}^{K-1} x(j,n) e^{-i2\pi k j/K} \quad [1]$$

where k is a frequency index, n is a frame index, j is a time index, and K is an FFT size. Hence, for each block (at frame index n) of K samples, the FFT is performed which produces K complex tones X(k,n) corresponding to frequency index k and frame index n.

The system 100 may include multiple microphone(s) 112, with a first channel (m=0) corresponding to a first microphone 112a, a second channel (m=1) corresponding to a second microphone 112b, and so on until a final channel (M) that corresponds to microphone 112M. FIG. 2C illustrates channel indexes 230 including two microphones (e.g., two channels), Mic0 (m=0) and Mic1 (m=1). While many drawings illustrate two channels (e.g., two microphones 112), the disclosure is not limited thereto and the number of channels may vary. For example, the device 110 may include three or more microphones without departing from the disclosure. For the purposes of discussion, an example of system 100 includes "M" microphones 112 (M>1) for hands free near-end/far-end distant speech recognition applications.

Using at least two microphones 112 (e.g., Mic0 and Mic1), the device 110 may separate audio data based on a direction of arrival. For example, audio (e.g., an audible noise) generated by a single sound source may be received by the two microphones at different times, resulting in a time delay (e.g., lag), and the device 110 may determine the direction of arrival based on this time delay. For ease of illustration, the disclosure may refer to determining a time delay (e.g., time lag) to identify the direction of arrival. However, the disclosure is not limited thereto, and the system may determine a phase difference between a frequency component pair and derive the time lag from the phase difference without departing from the disclosure. Thus, reference to determining the time delay or a lag estimate may inherently include determining a phase difference without departing from the disclosure.

Knowing the direction of arrival enables the device 110 to distinguish between multiple sources of audio. Thus, the device 110 may receive input audio data from the two microphones 112 and may generate first audio data associated with a first sound source (e.g., first direction) and second audio data associated with a second sound source.

Figure 3A:
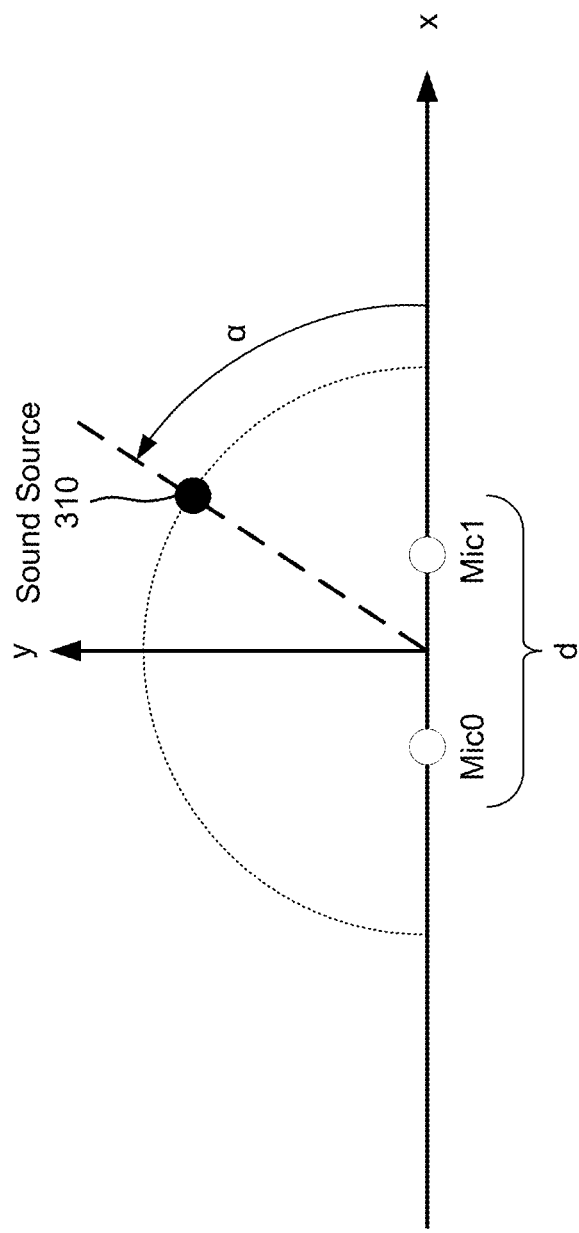

FIGS. 3A-3D illustrate examples of separating sound sources based on an angle of arrival according to examples of the present disclosure. As illustrated in FIG. 3A, the two microphones Mic0 and Mic1 may be separated by a known distance d. This distance may be selected to improve sound source separation and avoid spatial aliasing. As illustrated in FIG. 3A, the device 110 may identify a sound source 310 and may determine an azimuth α associated with the sound source 310. Based on the azimuth α, the device 110 may identify audio data associated with the sound source 310.

Figure 3B:
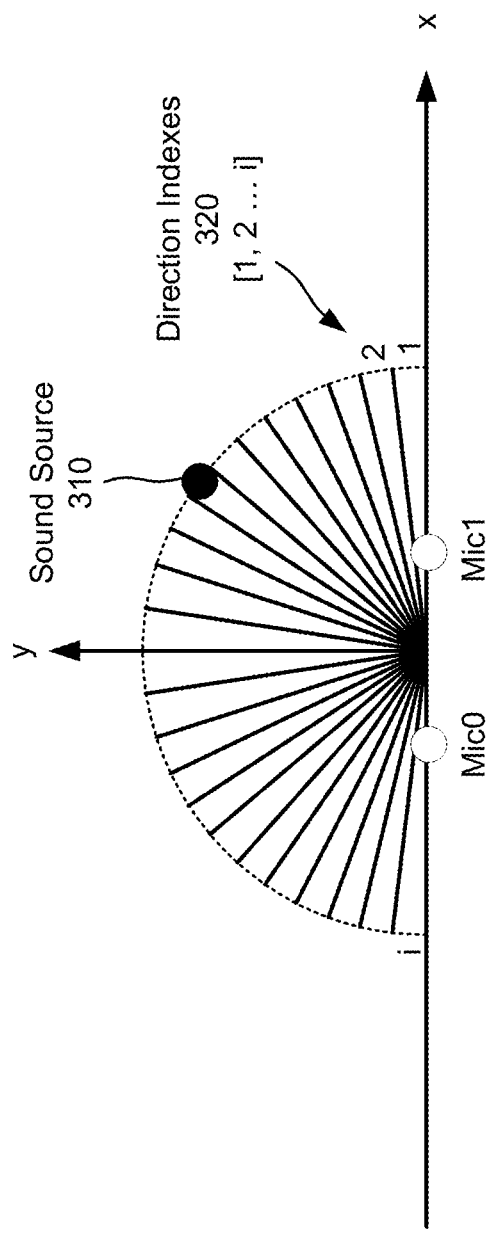

FIG. 3B illustrates that the device 110 may generate uniformly divided azimuth intervals, which may be referred to as direction indexes 320. FIG. 3B illustrates the device 110 generating i intervals, such that the direction indexes 320 range from 1 to i. For example, FIG. 3B illustrates 24 intervals, corresponding to 24 direction indexes, with the sound source 310 located in direction index 8. However, the disclosure is not limited thereto and the device 110 may generate any number of intervals without departing from the disclosure.

When the device 110 only uses two microphones (e.g., Mic0 and Mic1) to perform sound source separation, such as in the example shown in FIG. 3B, the device 110 can determine an angle of arrival along a single axis (e.g., x axis). Thus, the device 110 can generate azimuth intervals for 180 degrees, but not 360 degrees. For example, if a second sound source was located at the same position as the sound source 310 but flipped along the y axis (e.g., sound source 310 at coordinates [x,y], second sound source at coordinates [x, −y]), the device 110 would not be able to separate the two sound sources as the audio signals would have the same time delay. However, the disclosure is not limited thereto and if the device 110 includes three or more microphones 112 the device 110 may separate sound sources along the y-axis as well as the x-axis.

In some examples, the device 110 may use two microphones (e.g., Mic0 and Mic1, with Mic1 separated from Mic0 along the x-axis) to generate first uniformly divided azimuth intervals for 180 degrees along the x-axis, as illustrated in FIG. 3B, and also use two microphones (e.g., Mic1 and Mic2, with Mic2 separated from Mic1 along the y-axis) to generate second uniformly divided azimuth intervals for 180 degrees along the y-axis. Based on a combination of the first azimuth intervals and the second azimuth intervals, the device 110 may determine whether multiple sound sources have the same time delay and may separate the sound sources along both the x-axis and the y-axis. Additionally or alternatively, the device 110 may perform more complicated processing using the three or more microphones (e.g., Mic0, Mic1, and Mic2, with Mic1 separated from Mic0 along the x-axis and Mic2 separated from either Mic0 or Mic1 along the y-axis) to generate uniformly divided azimuth intervals for 360 degrees along both the x-axis and the y-axis without departing from the disclosure. For example, the device 110 may determine a first time delay between the first microphone (Mic0) and the second microphone (Mic1) and a second time delay between the second microphone (Mic1) and the third microphone (Mic2) and may determine an angle of arrival with 360 degree precision. For ease of illustration, the disclosure will describe the two-microphone solution. However, the techniques disclosed herein are applicable to the three or more microphone solution without departing from the disclosure.

While the example illustrated in FIG. 3B shows the sound source 310 being within direction index 8, the device 110 does not simply isolate first audio data that is associated with direction index 8. Instead, the device 110 may identify neighboring direction indexes that include second audio data that is also associated with the sound source 310 and may isolate combined audio data (first audio data and second audio data) from a range of direction indexes including direction index 8. For example, the device 110 may identify a target direction (e.g., direction index 8, target azimuth θ, etc.), may determine first audio data that is associated with the target direction, and may dynamically determine which direction indexes include second audio data that is correlated with the first audio data.

FIG. 3C illustrates an example in which there are two sound sources separated by a relatively large distance. As illustrated in FIG. 3C, a first sound source 330 is located at a first position (e.g., direction index 8) and a second sound source 340 is located at a second position (e.g., direction index 19). Due to the relatively large separation between the two sound sources, the device 110 may isolate first audio data within a first mask area 332 (e.g., from direction index 4 to direction index 11) and associate the first audio data with the first sound source 330, while also isolating second audio data within a second mask area 342 (e.g., from direction index 14 to direction index 21) and associating the second audio data with the second sound source 340.

In contrast, FIG. 3D illustrates an example in which there are two sound sources separated by a relatively small distance. As illustrated in FIG. 3D, a first sound source 350 is located at a first position (e.g., direction index 8) and a second sound source 360 is located at a second position (e.g., direction index 12). Due to the relatively small separation between the two sound sources, the device 110 may isolate first audio data within a first mask area 352 (e.g., from direction index 5 to direction index 9) and associate the first audio data with the first sound source 350, while also isolating second audio data within a second mask area 362 (e.g., from direction index 11 to direction index 14) and associating the second audio data with the second sound source 360.

In some examples, the device 110 may determine the target direction regardless of a location of a sound source. For example, the device 110 may select each of the direction indexes 320 as a target direction and repeat the steps for each of the target directions. In other examples, the device 110 may determine the target direction based on a location of a sound source. For example, the device 110 may identify the sound source, determine a location of the sound source (e.g., the direction index associated with the sound source, a target azimuth α corresponding to the sound source, etc.), and select a target direction based on the location of the sound source. Additionally or alternatively, the device 110 may track a sound source over time. For example, the sound source may correspond to a user walking around the device, and the device 110 may select a first direction index as a target direction at a first time and select a second direction index as a target direction at a second time, based on movement of the user.

FIG. 4 illustrates an example of extracting audio data corresponding to different directions according to examples of the present disclosure. As illustrated in FIG. 4, energy chart 410 includes a representation of microphone audio data 412. The microphone audio data 412 includes first speech from a first user and second speech from a second user. Based on a time delay between when the microphones 112 receive the first speech and the second speech, the device 110 may determine that the first speech corresponds to a first direction index and that the second speech corresponds to a second direction index. Based on this information, the device 110 may extract first extracted audio data 422, shown in energy chart 420, which includes audio data associated with the first speech and the first direction index. Similarly, the device 110 may extract second extracted audio data 432, shown in energy chart 430, which includes audio data associated with the second speech and the second direction index. Thus, the device 110 may separate audio data generated by different sound sources based on the direction of arrival, but may include additional audio data that is strongly correlated to the sound source.

As used herein, a sound source corresponds to a distinct source of audible sound, typically located at a distance from the device 110. Thus, a sound source may correspond to localized sources such as a user, a loudspeaker, mechanical noise, pets/animals, and/or the like, but does not correspond to diffuse sources such as ambient noise or background noise in the environment. In some examples, the device 110 may isolate first audio data associated with a desired sound source, such as desired speech generated by a first user. The device 110 may output the first audio data without performing additional audio processing, but the disclosure is not limited thereto. Instead, the device 110 may perform additional audio processing such as acoustic echo cancellation, acoustic interference cancellation, residual echo suppression, and/or the like to further remove echo signals, undesired speech, and/or other noise signals. For example, the device 110 may isolate second audio data associated with undesired sound source(s), such as undesired speech, playback audio generated by a loudspeaker, distracting noises in the environment, etc. Using the first audio data as a target signal and the second audio data as a reference signal, the device 110 may perform acoustic interference cancellation to subtract or remove at least a portion of the second audio data from the first audio data.

As illustrated in FIG. 1, the device 110 may determine (130) a target direction index. In order to associate direction indexes with an audio source, the device 110 first needs to determine a target direction index associated with the audio source. The device 110 may determine the target direction index using multiple techniques, including receiving a target azimuth value and determining a target direction index corresponding to the target azimuth value, tracking a location of the audio source and determining a target direction index corresponding to the location, determining a target direction index based on peaks in magnitudes of energy values of the input audio data, and/or the like. Note that if the device 110 determines the target direction index based on peaks in magnitude of the energy values, this step may be performed after steps 134-138, as described in greater detail below with regard to FIGS. 5 and 7.

As discussed above, the device 110 may generate output audio data for multiple audio sources. Thus, the device 110 will need to perform the steps described below using multiple target direction indexes, with a unique target direction index corresponding to each audio source.

The device 110 may receive (132) microphone audio data from at least two microphones 112 and may determine (134) lag estimate vector data (e.g., lag estimate data) based on the microphone audio data. For example, the microphone audio data may include first audio data generated by a first microphone 112a and second audio data generated by a second microphone 112b. To determine the lag estimate vector data, the device 110 may convert the microphone audio data from the time domain to the frequency domain and determine a time delay (e.g., lag estimate value) between the first audio data and the second audio data for each frequency index k.

The lag estimate values correspond to a direction-of-arrival or azimuth associated with the audio source that generated the audio data. Thus, the device 110 may identify a direction index i that corresponds to the lag estimate value for an individual frequency index k, as will be discussed in greater detail below with regard to FIG. 5. For example, each direction index i corresponds to a range of time delays (e.g., lag values). Therefore, the device 110 may generate (136) raw directional vector data by identifying the direction index i corresponding to the lag estimate value for each frequency index k in the lag estimate vector data.

In some examples, the raw directional vector data may indicate the specific direction index associated with each of the frequency indexes k. For example, the raw directional vector data may include direction mask data that identifies the frequency indexes associated with a particular direction index i. Using the direction mask data, the device 110 may extract audio data for each direction index i and/or may determine an energy value associated with audio data corresponding to each direction index i. Additionally or alternatively, the raw directional vector data may include the energy values associated with each direction index i with or without the direction mask data.

The device 110 may use the raw directional vector data to generate (138) validated directional vector data, as discussed in greater detail below with regard to FIGS. 19A-19B. For example, the raw directional vector data may include a first portion corresponding to a first microphone pair (e.g., Mic0 and Mic1) and a second portion corresponding to a second microphone pair (e.g., Mic1 and Mic2) and may correspond to a first plurality of directions (e.g., 180 degrees for each microphone pair). Due to an offset (e.g., rotation) between the first microphone pair and the second microphone pair, the device 110 may generate validated directional vector data corresponding to a second plurality of directions (e.g., 360 degrees).

As a result of using three microphones (e.g., two microphone pairs), the validated directional vector data may isolate an audio source in any direction around the device 110, separating audio sources at complementary angles to the first microphone pair. For example, using only the first microphone pair, the device 110 cannot distinguish between a first audio source at 30 degrees and a second audio source at 330 degrees, as these complementary angles result in the same direction of arrival estimation. Similarly, using only the first microphone pair, the device 110 cannot distinguish between a first audio source at 90 degrees and a second audio source at 270 degrees, as every angle outside of 0 degrees and 180 degrees corresponds to two potential directions. Using the second audio pair, however, the device 110 may distinguish between the two potential directions and separate the first audio source from the second audio source and/or identify that the first audio source is at 90 degrees instead of 270 degrees.

The device 110 may determine (140) cross-correlation data based on the validated directional vector data. For example, the device 110 may perform a cross-correlation between each direction index i and a target direction index $i_t$ to determine cross-correlation values, as will be described in greater detail below with regard to FIGS. 5 and 8. The validated directional vector data may include energy values for each frequency index over a period of time. For example, the validated directional vector data may include a current energy value for a specific frequency index, as well as energy values associated with the specific frequency index over m previous frames. As part of determining the cross-correlation data, the device 110 may smooth the energy values over time, may smooth the cross-correlation values over time, and/or may normalize the cross-correlation values so that the cross-correlation data comprises values between 0.0 and 1.0, with cross-correlation values closer to 1.0 indicating a strong correlation between the direction index i and the target direction index $i_t$.

Based on the cross-correlation data, the device 110 may derive (142) lag boundaries associated with the audio source. For example, the device 110 may determine a lower bound (e.g., direction index i below the target direction index $i_t$) and an upper bound (e.g., direction index I above the target direction index $i_t$) that indicates a range of direction indexes that are strongly correlated to the target direction index $i_t$. As will be described in greater detail below with regard to FIGS. 5 and 9, the device 110 may determine the lower bound and the upper bound based on a cross-correlation threshold value. For example, if the cross-correlation threshold value is equal to 0.8, the device 110 may identify the lower bound and the upper bound based on where the cross-correlation data intersects 0.8 (e.g., drops below 0.8).

The lag boundaries identify the direction indexes that correspond to the audio source. Thus, the lag boundaries may vary over time based on which direction indexes are strongly correlated with the target direction index $i_t$. To generate output audio data corresponding to the audio source, the device 110 may generate (144) mask data based on the lag boundaries. The mask data corresponds to a time-frequency map or vector that indicates the frequency indexes k that are associated with the audio source over time. For example, the device 110 may identify frequency indexes k that are associated with each of the direction indexes i included within the lag boundaries (e.g., between the lower boundary and the upper boundary).

In some examples, the mask data may correspond to binary masks, which may include binary flags for each of the time-frequency units. Thus, a first binary value (e.g., digital high or a value of 1) indicates that the time-frequency unit corresponds to the audio source and a second binary value (e.g., digital low or a value of 0) indicates that the time-frequency unit does not correspond to the audio source.

The device 110 may generate a binary mask for each audio source. Thus, a first binary mask may classify each time-frequency unit as either being associated with a first audio source or not associated with the first audio source. Similarly, a second binary mask may classify each time-frequency unit as either being associated with a second audio source or not associated with the second audio source, and so on for each audio source detected by the device 110.

The device 110 may generate (146) output audio data based on the microphone audio data and the mask data and may send (148) the output audio data for further processing and/or to the remove device. For example, the device 110 may generate combined audio data based on the first audio data and the second audio data, such as by averaging the first audio data and the second audio data. The device 110 may then apply the mask data to the combined audio data to generate the output audio data. Thus, the output audio data corresponds to the frequency indexes k that are associated with the audio source. As discussed above, the device 110 may generate multiple output audio signals, with each output audio signal corresponding to a unique audio source. For example, the device 110 may determine that there are two or more audio sources based on the lag estimate vector data and/or the directional vector data and may perform steps 138-142 separately for each audio source.

Figure 5:
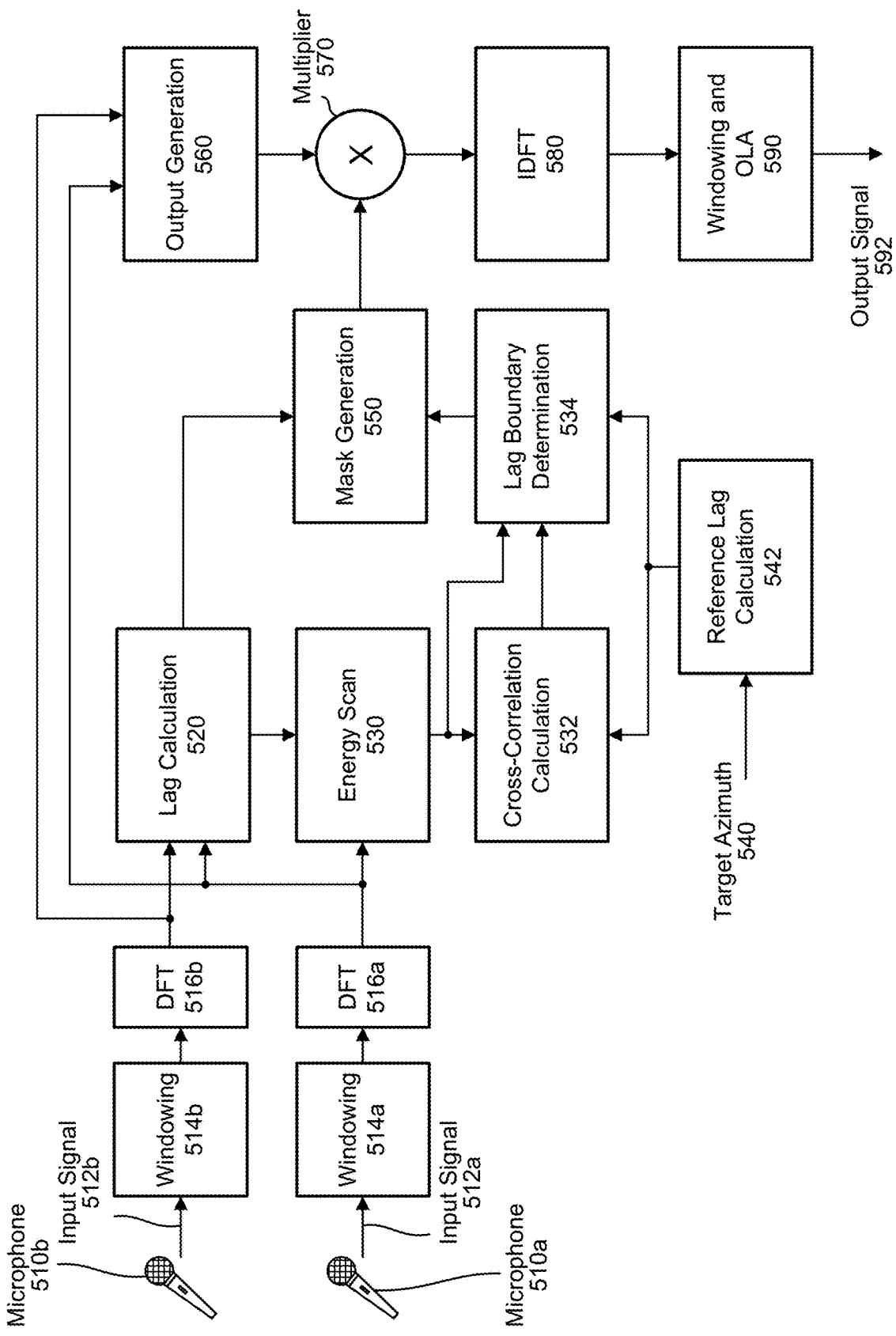
FIG. 5 illustrates an example component diagram for performing directional speech separation according to examples of the present disclosure.

FIG. 5 illustrates an example component diagram for performing directional speech separation according to examples of the present disclosure. As illustrated in FIG. 5, microphones 510 may capture audio as input signals 512 in a time domain and the device 110 may send the input signals 512 to a windowing component 514 and a Discrete Fourier Transforms (DFTs) component 516 to convert the input signals 512 to a frequency domain. For example, a first microphone 510a may generate a first input signal 512a and the device 110 may process the first input signal 512a using a first windowing component 514a and a first DFT component 516a to convert the first input signal 512a to a first modified input signal in the frequency domain. Similarly, a second microphone 510b may generate a second input signal 512b and the device 110 may process the second input signal 512b using a second windowing component 514b and a second DFT component 516b to convert the second input signal 512b to a second modified input signal in the frequency domain.

To illustrate an example, the input signals 512 at the present frame index may be denoted by:

$$x_0[n], x_1[n], n=0 \text{ to } N-1 \quad [2.1]$$

where $x_0[n]$ is the first input signal 512a, $x_1[n]$ is the second input signal 512b, n is a current frame index, and N is a length of the window (e.g., number of frames included). The input frames are mapped to the frequency domain via DFT:

$$x_0[n]w[n] \overset{DFT}{\longleftrightarrow} X_0[k], k = 0 \text{ to } N_f - 1 \quad [2.2]$$

$$x_1[n]w[n] \overset{DFT}{\longleftrightarrow} X_1[k], k = 0 \text{ to } N_f - 1 \quad [2.3]$$

where $x_0[n]$ is the first input signal 512a, $x_1[n]$ is the second input signal 512b, n is a current frame index, $X_0[k]$ is the first modified input signal, $X_1[k]$ is the second modified input signal, k is a frequency band from 0 to $N_f$, and $N_f$ corresponds to the number of DFT/FFT coefficients (e.g., $N_f=N_{FFT}/2+1$).

The first modified input signal and the second modified input signal are output to two components—a lag calculation component 520 and an output generation component 560. The lag calculation component 520, which will be discussed in greater detail below, determines a time delay (e.g., lag) between the first modified input signal and the second modified input signal for individual frequency bands (e.g., frequency ranges, frequency bins, etc.) to generate estimated lag vector data. The output generation component 560 generates an output signal based on a combination of the first modified input signal and the second modified input signal. For example, the output generation component 560 may generate the output signal using an averaging function to determine a mean of the first modified input signal and the second modified input signal, although the disclosure is not limited thereto.

As mentioned above, the lag calculation component 520 receives the first modified input signal and the second modified input signal and determines a lag estimate value for each frequency band k (e.g., tone index). Thus, the lag calculation component 520 generates lag estimate vector data including k number of lag estimate values.

The lag calculation component 520 may generate the estimated lag values based on phase information (e.g., phase difference) between the input signals 512. For example, the phase at frequency index k between the two channels is calculated with:

$$\text{phase}[k]=\arg(X_0[k]X_1^*[k]), k=0 \text{ to } N_f-1 \quad [3.1]$$

where k is a frequency band from 0 to $N_f-1$, phase[k] corresponds to a phase between the input signals 512 within the frequency band k, $X_0[k]$ is the first modified input signal, $X_1[k]$ is the second modified input signal, and $N_f$ corresponds to the number of DFT/FFT coefficients (e.g., $N_f=N_{FFT}/2+1$).

The lag values of the signals are found with:

$$\text{lag}[k] = \begin{cases} 0, \text{ if } k = 0 \\ \dfrac{N_{FFT}}{2\pi k} \text{phase}[k], \text{otherwise} \end{cases}, k = 0 \text{ to } N_f - 1 \quad [3.2]$$

Using the equations described above, the device 110 may determine an estimated lag value for each frequency band k (e.g., lag[k]).

As mentioned above with regard to FIG. 3B, the estimated lag values correspond to direction indexes, such that the device 110 may associate a particular estimated lag value with a particular direction index (e.g., direction of arrival). In some examples, the device 110 may associate the estimated lag value with a corresponding direction index based on lag value ranges associated with the direction indexes. For example, a first direction index (e.g., between $\alpha_0$ and $\alpha_1$) may correspond to estimated lag values between $t_0$ and $t_1$, a second direction index (e.g., between $\alpha_1$ and $\alpha_{10}$) may correspond to estimated lag values between $t_1$ and $t_2$, and so on. Thus, the device 110 may store the lag value ranges for each of the direction indexes and use these lag value ranges to associate each frequency band with an individual direction of arrival. For example, after determining which direction index corresponds to the estimated lag value for a particular frequency band k, the device 110 may associate the frequency band k with the corresponding direction index.

Additionally or alternatively, the device 110 may associate the estimated lag values with a corresponding direction index based on a target azimuth (e.g., azimuth associated with a center point of the direction index) using a lag threshold. For example, instead of associating a range of lag values (e.g., between $t_0$ and $t_1$) with a first direction index that corresponds to a range between a lower azimuth $\alpha_0$ and an upper azimuth $\alpha_1$, the device 110 may associate a target azimuth aa with the first direction index, may determine a target lag value $t_a$ corresponding to the target azimuth aa, and may determine whether the estimated lag value is within a lag threshold value of the target lag value $t_a$ (e.g., $t_a-\text{LAG\_TH} \leq \text{Lag}[k] \leq t_a+\text{LAG\_TH}$). Thus, the target lag value $t_a$ (corresponding to the target azimuth $\alpha_a$) and the lag threshold value may roughly correspond to the range of lag values described above.

To illustrate an example, given targetAzimuth $\in [0, \pi]$, which is a parameter passed to the algorithm with the intention to extract signal at that particular direction (e.g., azimuth θ associated with a particular direction index), then:

$$targetLag = \cos(targetAzimuth)\frac{d \cdot f_s}{c}\langle Sampling\ period\rangle \quad [4.1]$$

where targetLag is the time lag of interest, targetAzimuth is the azimuth α associated with a direction of interest (e.g., individual direction index), d is the distance between the microphones 112 in meters (m) (e.g., distance d between Mic0 and Mic1, as illustrated in FIG. 3A), $f_s$ is the sampling frequency in Hertz (Hz), c is the speed of sound (e.g., c=342 m/s), and Sampling period is the duration of the sampling.

The wavelength is given by:

$$\lambda = c/f \langle m \rangle \quad [4.2]$$

with frequency:

$$f = k \cdot f_s/N_{FTT} \langle Hz \rangle,\ k=0\ \text{to}\ N_f-1 \quad [4.3]$$

and period:

$$T = N_{FF1}/(k \cdot f_s) \langle s \rangle,\ k=0\ \text{to}\ N_f-1 \quad [4.4]$$

Using the estimated lag value (e.g., lag[k]) associated with an individual frequency band, the device 110 may determine an absolute difference between the estimated lag value and the target lag value for the frequency band. The device 110 may use the absolute difference and the lag threshold value to generate a mask associated with the frequency band:

$$\text{mask}[k] = \begin{cases} 1, & \text{if } |\text{lag}[k] - targetLag| < \text{LAG\_TH} \\ 0, & \text{otherwise} \end{cases} \quad [5]$$

where mask[k] corresponds to a mask value associated with the frequency band k, lag[k] is a lag value for the frequency band k, targetLag is the target lag calculated based on the target azimuth a using Equation [3.2], and LAG_TH is a selected lag threshold. The lag threshold may be fixed or may vary without departing from the disclosure.

Spatial aliasing occurs when multiple valid lags exist within a range. However, spatial aliasing may be avoided by selecting the distance d between the microphones 112 appropriately. While not disclosed herein, one of skill in the art may modify Equation [5] to take into account spatial aliasing without departing from the disclosure. For example, instead of using a single target lag value (e.g., targetLag[k]), Equation [5] may be modified to include a two-dimensional array of target lags (e.g., targetLag[k, 1], selecting the target lag closest to the lag value lag[k] (e.g., min|lag[k]−[targetLag[k, 1]|).

To summarize, the lag calculation component 520 may determine an estimated lag value for each frequency band using Equations [3.1]-[3.2] to generate the estimated lag vector data. After generating the estimated lag vector data, the device 110 may generate direction mask data for each direction index, with the direction mask data indicating whether a particular frequency band corresponds to the direction index. In some examples, the direction mask data may be a two-dimensional vector, with k number of frequency bands and i number of direction indexes (e.g., k-by-i matrix or i-by-k matrix).

In some examples, the lag calculation component 520 may output the direction mask data to an energy scan component 530. However, the disclosure is not limited thereto and in other examples, the lag calculation component 520 may output the estimated lag vector data and the energy scan component 530 may generate the direction mask data without departing from the disclosure.

In some examples, the energy scan component 530 may apply the direction mask data to the first modified input signal in order to extract audio data corresponding to each of the direction indexes. For example, as the direction mask data indicates which frequency band corresponds to a particular direction index, applying the direction mask data to the first modified input signal generates an audio signal for each of the direction indexes. The energy scan component 530 may then determine an amount of energy associated with the audio signal for each direction index. For example, the energy scan component 530 may determine a first energy value indicating an amount of energy associated with a first direction index, a second energy value indicating an amount of energy associated with a second direction index, and so on for each of the direction indexes. While the above example refers to determining an amount of energy associated with an individual direction index, the disclosure is not limited thereto and the energy scan component 530 may use any technique known to one of skill in the art without departing from the disclosure. For example, the energy scan component 530 may determine a square of the energy (e.g., energy squared), an absolute value, and/or the like without departing from the disclosure. Additionally or alternatively, the device 110 may smooth the magnitude over time without departing from the disclosure.

In other examples, the energy scan component 530 may determine the amount of energy associated with each direction index without first extracting audio data corresponding to each of the direction indexes. For example, the energy scan component 530 may apply the direction mask data to identify a first portion of the first modified input audio data, which is associated with the first direction index, and may determine a first energy value indicating an amount of energy associated with the first portion of the first modified input audio data. Similarly, the energy scan component 530 may apply the direction mask data to identify a second portion of the first modified input audio data, which is associated with the second direction index, and may determine a second energy value indicating an amount of energy associated with the second portion of the first modified input audio data, and so on for each of the direction indexes.

Figure 6:
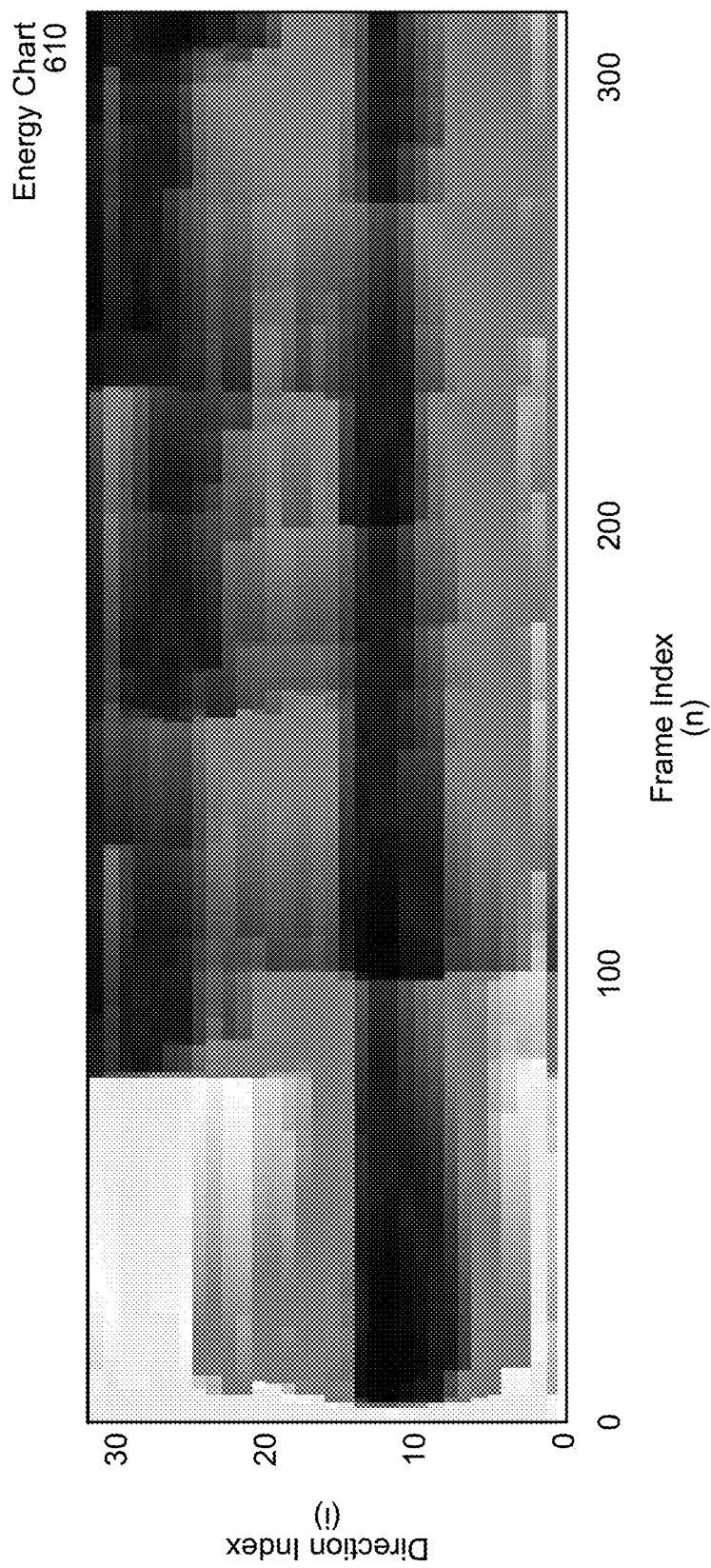
FIG. 6 illustrates an example of an energy chart representing energy associated with different direction indexes according to examples of the present disclosure.

FIG. 6 illustrates an example of an energy chart representing energy associated with different direction indexes according to examples of the present disclosure. As illustrated in FIG. 6, an energy chart 610 may represent time (e.g., via frame index n) along the horizontal axis (e.g., x-axis) and may represent a direction of arrival (e.g., via direction index i) along the vertical axis (e.g., y-axis), with a magnitude represented by a color between white (e.g., low magnitude) and black (e.g., high magnitude).

The energy chart 610 illustrated in FIG. 6 includes 32 unique direction indexes (e.g., i=0, 1, . . . , 31), such that each direction index corresponds to a range of 5.6 degrees. Thus, the direction indexes correspond to incoming direction of arrivals (e.g., azimuths) from 0 degrees to 180 degrees, with direction index 1 including azimuths between 0 degrees and 5.6 degrees (e.g., center point of 2.8 degrees with a threshold value of +/−2.8 degrees), direction index 2 including azimuths between 5.6 degrees and 11.2 degrees (e.g., center point of 8.4 degrees with a threshold value of +/−2.8 degrees), and direction index 32 including azimuths between 174.4 degrees and 180 degrees (e.g., center point of 177.2 degrees with a threshold value of +/−2.8 degrees).

A horizontal row within the energy chart 610 corresponds to a single direction index i, with each frame index n corresponding to an energy value associated with the direction index i. Similarly, a vertical column within the energy chart 610 corresponds to a single frame index n, with each direction index i corresponding to an energy value associated with the frame index n. Thus, the energy chart 610 illustrates that the device 110 may determine magnitude values associated with one or more direction indexes i and/or one or more frame indexes n.

As illustrated in the energy chart 610 shown in FIG. 6, audio sources may be represented as bands of high magnitude values (e.g., regions of black) associated with a range of direction indexes, and unique audio sources may be separated by bands of low magnitude values (e.g., regions of white or gray). For example, the energy chart 610 includes a single audio source centered roughly on direction index 10 (e.g., direction indexes 8-14) at a first time (e.g., frame index 50), but at a second time (e.g., frame index 100) the energy chart 610 includes a first audio source centered roughly on direction index 10 (e.g., direction indexes 9-15) and a second audio source centered roughly on direction index 28 (e.g., direction indexes 25-32). As illustrated in FIG. 6, the specific direction indexes associated with an audio source may vary over time, with the first audio source corresponding to a first range (e.g., direction indexes 8-14) at the first time and a second range (e.g., direction indexes 9-15) at the second time.

Referring back to FIG. 5, the energy scan component 530 may output directional vector data (e.g., vector including a magnitude of energy values corresponding to each direction index for a series of frame indexes) to cross-correlation calculation component 532, which may perform a cross-correlation between each of the direction indexes and a target direction index. For example, if direction index 11 is selected as the target direction index, the cross-correlation calculation component 532 may perform a first cross-correlation between direction index 1 and direction index 11, a second cross-correlation between direction index 2 and direction index 11, and so on for each of the 32 direction indexes. As mentioned above, the directional vector data may include a time sequence for each of the direction indexes, such as m frames of energy values for each direction index i.

In some examples, the device 110 may determine the target direction index by detecting one or more peaks within the energy curves (e.g., directional vector data). A single peak corresponds to a single audio source, and therefore the device 110 may select the target direction index based on this peak. For example, a reference lag calculation component 542 may receive a target azimuth 540 corresponding to the peak and may determine the target direction index that includes the target azimuth 540. Additionally or alternatively, the reference lag calculation component 542 may receive the target direction index associated with the peak instead of receiving the target azimuth 540.

If the device 110 detects multiple peaks in the directional vector data, this may correspond to two or more audio sources. In this case, the device 110 may select multiple target direction indexes and generate output audio data associated with each of the target direction indexes (e.g., individual output audio data for each audio source). In some examples, the device 110 may remove shallow (e.g., broad) peaks in the energy chart in order to generate output audio data associated with only the strongest audio sources.

Figure 7:
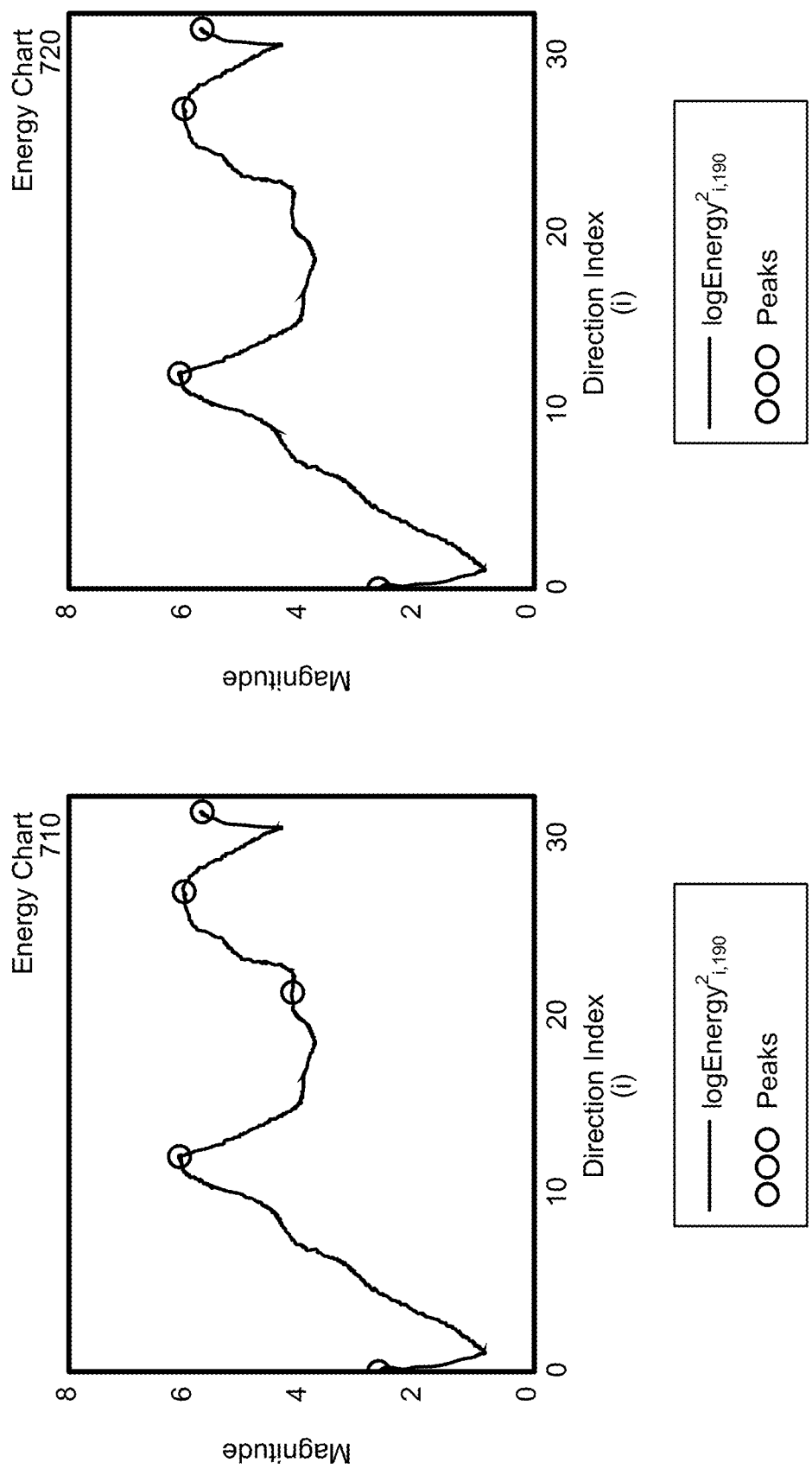
FIG. 7 illustrates an example of identifying peaks in the energy chart and removing shallow peaks according to examples of the present disclosure.

FIG. 7 illustrates an example of identifying peaks in the energy chart and removing shallow peaks according to examples of the present disclosure. As illustrated in FIG. 7, energy chart 710 corresponds to a single frame index n (e.g., frame index 190 illustrated in energy chart 610), with direction index i represented along the horizontal axis (e.g., x-axis) and a magnitude of the energy (e.g., $\log(\text{Energy}^2)$) represented along the vertical axis (e.g., y-axis). For frame index 190, the device 110 may initially detect 5 distinct peaks, with a first peak corresponding to direction index 0, a second peak corresponding to direction index 11, a third peak corresponding to direction index 21, a fourth peak corresponding to direction index 27, and a fifth peak corresponding to direction index 32.

If the device 110 detects five peaks, the device 110 may determine that there are five unique audio sources and may therefore generate output audio data for each of the audio sources. For example, the device 110 may perform the techniques disclosed herein five separate times (e.g., using direction indexes 0, 11, 21, 27 and 32 as target direction indexes) to determine a lower boundary and an upper boundary associated with each of the peaks.

In some examples, multiple peaks may correspond to a single audio source (e.g., both direction index 21 and direction index 27 may correspond to a single audio source) and/or a peak may correspond to a weak audio source (e.g., direction index 21 may correspond to a weak audio source). Therefore, to improve the output audio data, the device 110 may remove shallow peaks. For example, the device 110 may apply a two-step process that includes a first step of identifying all potential peaks in the energy chart 710 and then a second step of removing any peaks that are determined to be too shallow based on a threshold value.

FIG. 7 illustrates an example of removing a shallow peak. As illustrated in FIG. 7, energy chart 710 includes the five peaks mentioned above (e.g., five peaks corresponding to direction index 0, direction index 11, direction index 21, direction index 27, and direction index 32, respectively). The device 110 may detect all five peaks during the first step of the two-step process. However, during the second step, the device 110 may determine that the third peak corresponding to direction index 21 is too shallow and may remove this peak. Therefore, energy chart 720 illustrates that the device 110 selects only four peaks (e.g., four peaks corresponding to direction index 0, direction index 11, direction index 27, and direction index 32, respectively).

To illustrate an example of a technique used to remove shallow peaks, the device 110 may determine a maximum magnitude (e.g., peak value) for each peak and may determine a left bound and a right bound for each peak based on the maximum magnitude. For example, the device 110 may multiply the maximum magnitude by a first parameter (e.g., value between 0 and 1 or a percentage) to determine a threshold value and may identify the left bound and the right bound based on the threshold value. Thus, for the second peak corresponding to direction index 11, the device 110 may determine a first maximum magnitude (e.g., 6) associated with the second peak, may multiply the first maximum magnitude by a first parameter (e.g., 80%) to determine a first threshold value (e.g., 4.8), may search to the left of the second peak to determine the lower bound (e.g., direction index 10 roughly corresponds to the first threshold value of 4.8), and may search to the right of the second peak to determine the upper bound (e.g., direction index 13 roughly corresponds to the first threshold value of 4.8).

The device 110 may then determine whether the peak is too broad (e.g., too shallow) based on the lower bound and the upper bound. For example, the device 110 may determine a width of the peak using the left bound and the right bound and determine if the width exceeds a maximum peak width threshold. Thus, the device 110 may determine that the second peak has a width of 3 direction indexes (e.g., difference between direction index 13 and direction index 10), which is below a maximum peak width threshold (e.g., 10, to illustrate an arbitrary example). As a result, the device 110 may determine that the second peak satisfies a condition and therefore corresponds to an audio source.

Similarly, for the third peak corresponding to direction index 21, the device 110 may determine a second maximum magnitude (e.g., 4) associated with the third peak, may multiply the second maximum magnitude by the first parameter (e.g., 80%) to determine a second threshold value (e.g., 3.2), may search to the left of the third peak to determine the lower bound (e.g., direction index 6 roughly corresponds to the second threshold value of 3.2), and may search to the right of the third peak to determine the upper bound (e.g., there isn't a direction index below the second threshold value of 3.2 to the right of the third peak). The device 110 may then determine that the third peak has a width of 26+ direction indexes (e.g., difference between direction index 32 and direction index 6), which is above a maximum peak width threshold (e.g., 10). As a result, the device 110 may determine that the third peak does not satisfy the condition and therefore does not correspond to an audio source, as illustrated by the third peak being removed from energy chart 720.

For ease of explanation, the above examples illustrated specific parameters and threshold values to provide a visual illustration of removing shallow peaks. However, these parameters are not limited thereto and may vary without departing from the disclosure. For example, the first parameter may be any value between 0 and 1 (or a percentage) without departing from the disclosure. Additionally or alternatively, the maximum peak width threshold may depend on the number of direction indexes and may vary without departing from the disclosure. Additionally or alternatively, while the examples above refer to the maximum peak width threshold corresponding to a number of direction indexes, the disclosure is not limited thereto and the maximum peak width threshold may correspond to an azimuth value or the like without departing from the disclosure.

While FIG. 7 illustrates an example of determining the target direction index based on peaks within the directional vector data, the disclosure is not limited thereto and the device 110 may determine the target direction index using any technique known to one of skill in the art without departing from the disclosure.

In some examples, the target direction index may correspond to an audio source. For example, the device 110 may identify a location of an audio source relative to the device and may determine a target azimuth 540 based on the location. Thus, the reference lag calculation component 542 may receive the target azimuth 540 and may determine the target direction index that includes the target azimuth 540. For example, a target azimuth 540 corresponding to 60 degrees would be associated with direction index 11, which ranges from roughly 56 degrees to roughly 62 degrees (e.g., center point of roughly 59 degrees+/−a threshold value of 2.8 degrees).

If there are multiple audio sources, the device 110 may determine multiple target azimuths and/or multiple target direction indexes. For example, the device 110 may isolate audio data correlated with each audio source and generate unique output audio data for each audio source. Thus, the device 110 would perform first audio processing, using a first target azimuth 540a corresponding to the first audio source, to generate first output audio data associated with the first audio source, and perform second audio processing, using a second target azimuth 540b corresponding to a second audio source, to generate second output audio data associated with the second audio source. To illustrate an example using the energy chart 610, frame index 100 corresponds to a first audio source at roughly 60 degrees and a second audio source at roughly 150 degrees. Therefore, the device 110 may generate first output audio data using a first target azimuth 540a (e.g., 60 degrees, which corresponds to selecting direction index 11 as a first target direction index) and second output audio data using a second target azimuth 540b (e.g., 150 degrees, which corresponds to selecting direction index 27 as a second target direction index).

In some examples, the device 110 may track the location of the audio source over time, such that the target azimuth 540 may vary based on an exact location of the audio source relative to the device 110. Variations in the target azimuth 540 may correspond to movement of the audio source and/or the device 110, as well as changes in an orientation of the device 110. However, the disclosure is not limited thereto and the device 110 may determine a fixed location associated with the audio source (e.g., the target azimuth 540 remains constant over time) without departing from the disclosure.

Additionally or alternatively, while the examples described above refer to the target azimuth 540 corresponding to an audio source, the disclosure is not limited thereto. Instead, the device 110 may select one or more fixed target azimuths without regard to a location of an audio source. Thus, the device 110 may generate output audio data that isolates audio data corresponding to fixed target azimuths without departing from the disclosure. For example, the device 110 may generate four output signals, with a first output signal corresponding to a first target azimuth (e.g., roughly 23 degrees, which corresponds to selecting direction index 5 as a first target direction index), a second output signal corresponding to a second target azimuth (e.g., roughly 68 degrees, which corresponds to selecting direction index 13 as a second target direction index), a third output signal corresponding to a third target azimuth (e.g., roughly 113 degrees, which corresponds to selecting direction index 21 as a third target direction index), and a fourth output signal corresponding to a fourth target azimuth (e.g., roughly 158 degrees, which corresponds to selecting direction index 29 as a fourth target direction index). Using this approach, the device 110 effectively separates a range of 180 degrees into four separate sections. However, instead of generating uniform sections using linear techniques (e.g., a first section ranging from 0-45 degrees, a second section ranging from 45-90 degrees, a third section ranging from 90-135 degrees, and a fourth section ranging from 135-180 degrees), the techniques disclosed herein result in non-uniform sections that are selected based on a correlation with audio data corresponding to the target azimuth. Thus, a first section could be twice the size of the second section or vice versa, depending on which direction indexes are strongly correlated to the first target direction index and the second target direction index.

For ease of illustration, the following description will refer to selecting a single target azimuth 540 associated with a single audio source. However, as discussed above, the device 110 may generate output audio data for multiple audio sources without departing from the disclosure.

Referring back to FIG. 5, the cross-correlation calculation component 532 may receive the directional vector data (e.g., vector including a magnitude of energy values corresponding to each direction index for a series of frame indexes) from the energy scan component 530 and the target azimuth 540 and/or the target direction index from the reference lag calculation component 542 and may generate cross-correlation data by performing a cross-correlation between each of the direction indexes and the target direction index. For example, if direction index 11 is selected as the target direction index, the cross-correlation calculation component 532 may perform a first cross-correlation between direction index 1 and direction index 11, a second cross-correlation between direction index 2 and direction index 11, and so on for each of the 32 direction indexes.

Figure 8:
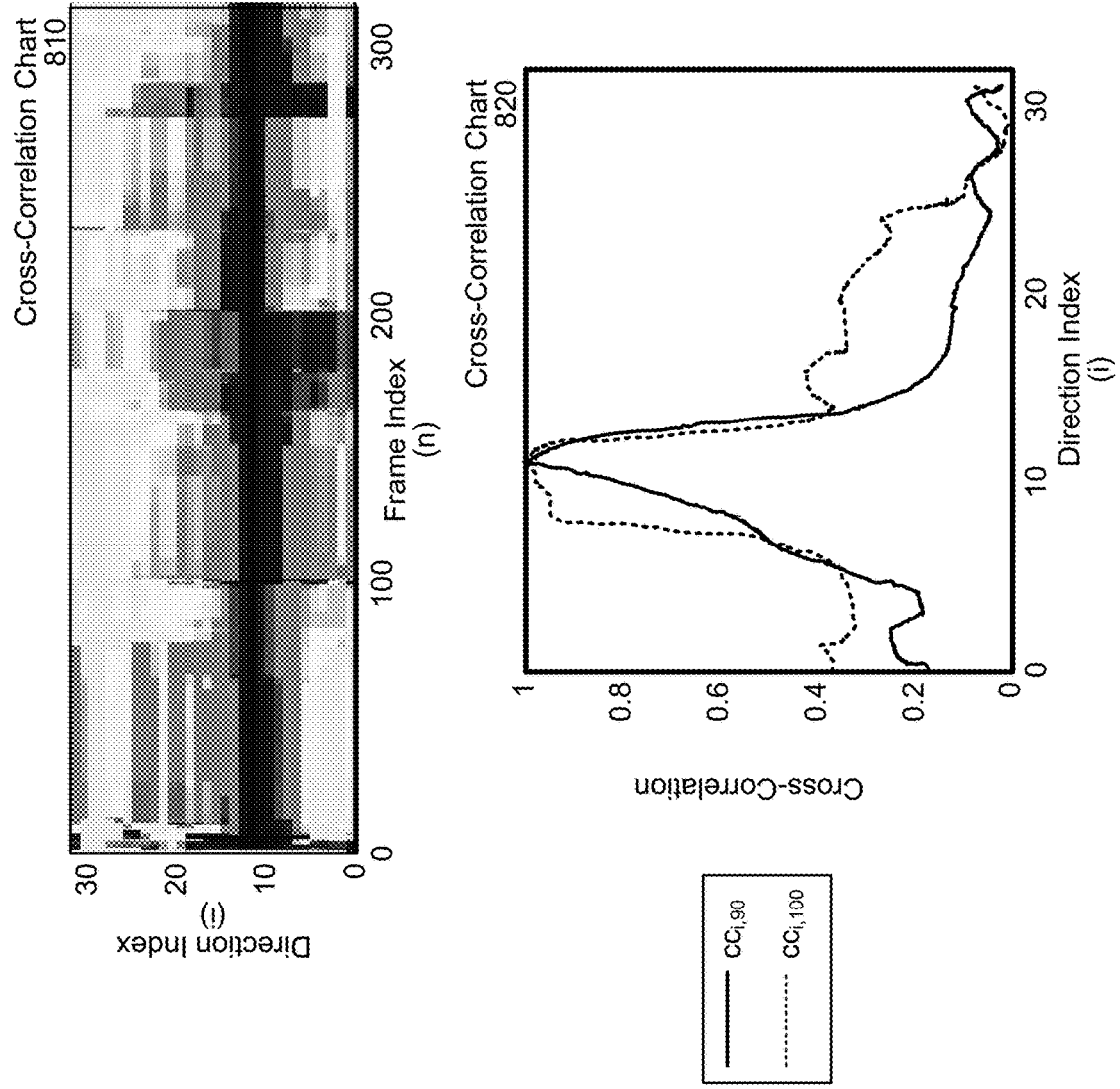
FIG. 8 illustrates an example of a cross-correlation chart representing cross-correlations between direction indexes and a target direction according to examples of the present disclosure.

FIG. 8 illustrates an example of a cross-correlation chart representing cross-correlations between direction indexes and a target direction according to examples of the present disclosure. As illustrated in FIG. 8, a cross-correlation chart 810 may represent time (e.g., via frame index n) along the horizontal axis (e.g., x-axis) and may represent a direction of arrival (e.g., via direction index i) along the vertical axis (e.g., y-axis), with a magnitude of the cross-correlation represented by a color between white (e.g., low magnitude) and black (e.g., high magnitude). As discussed above, the cross-correlation chart 810 includes 32 unique direction indexes (e.g., i=1, 2, . . . 32), such that each direction index corresponds to a range of 5.6 degrees.

To illustrate an example, energy values (e.g., energy squared values) may be smoothed in time and then the device 110 may calculate cross-correlation values between the target direction index and a given direction index. For example, the device 110 may determine a first energy value (e.g., Energy[i,n]) associated with direction index 1 (e.g., given direction index) at a current frame index n. Given a first existing smoothed energy squared value (e.g., a smoothed energy squared value associated with a previous frame index n−1, which can be represented as $\text{Energy}_s^2[i,n-1]$) associated with direction index 1, the device 110 may generate a first product by applying a first smoothing parameter $\lambda_1$ (e.g., first weight given to previous smoothed energy squared values) to the first existing smoothed energy squared value (e.g., $\text{Energy}_s^2[i,n-1]$), may generate a second product by multiplying a second smoothing parameter $\lambda_2$ (e.g., second weight given to current energy values) by a square of the first energy value (e.g., $\text{Energy}_s^2[i,n]$), and may determine a first current smoothed energy squared value (e.g., $\text{Energy}_s^2[i,n]$) by summing the first product and the second product.

Thus, in some examples the first current smoothed energy value may be determined using the following equations:

$$\text{Energy}_s^2[i,n]=\lambda_1*\text{Energy}_s^2[i,n-1]+\lambda_2*\text{Energy}[i,n]^2 \qquad [6.1]$$

$$\lambda_2=1.0-\lambda_1 \qquad [6.2]$$

where $\text{Energy}_s^2[i,n]$ corresponds to a smoothed energy squared value (e.g., first current smoothed energy squared value) associated with a specific direction index i (e.g., direction index 1) and frame index n (e.g., current frame index), $\lambda_1$ corresponds to the first smoothing parameter that indicates a first weight given to previous smoothed energy values, $\text{Energy}_s^2[i,n-1]$ corresponds to a smoothed energy squared value (e.g., first existing smoothed energy squared value) associated with the specific direction index i (e.g., direction index 1) and frame index n−1 (e.g., previous frame index), $\lambda_2$ corresponds to the second smoothing parameter that indicates a second weight given to current energy values, and Energy[i,n] corresponds to a current energy value (e.g., first energy value) associated with the specific direction index i (e.g., direction index 1) and the frame index n (e.g., current frame index).

The first smoothing parameter $\lambda_1$ and the second smoothing parameter $\lambda_2$ may be complements of each other, such that a sum of the first smoothing parameter and the second smoothing parameter is equal to one. The first smoothing parameter is a coefficient representing the degree of weighting decrease, a constant smoothing factor between 0 and 1. Increasing the first smoothing parameter $\lambda_1$ decreases the second smoothing parameter $\lambda_2$ and discounts older observations slower, whereas decreasing the first smoothing parameter $\lambda_1$ increases the second smoothing parameter $\lambda_2$ and discounts older observations faster. Thus, the device 110 may determine an amount of smoothing to apply based on a value selected for the first smoothing parameter $\lambda_1$. For example, selecting a value of 0.9 for the first smoothing parameter $\lambda_1$ results in a value of 0.1 for the second smoothing parameter $\lambda_2$, indicating that 90% of the first current smoothed energy squared value is based on the first existing smoothed energy squared value and 10% of the first current smoothed energy value is based on the first energy value.

Using Equation [6.1] or similar techniques known to one of skill in the art, the device 110 may apply smoothing over time to each of the direction indexes, including the target direction index, to generate smoothed energy squared values.

The device 110 may then calculate the cross-correlation data based on the energy values associated with each of the direction indexes over a period of time. For example, the device 110 may determine the cross-correlation between direction index i and target direction index $i_t$ using the following equation:

$$CC[i,n]=(Energy[i]*Energy[i_t])[n] \quad [7.1]$$

where CC[i, n] corresponds to a cross-correlation value that is associated with frame index n (e.g., current frame index) and corresponds to a cross-correlation between direction index i (e.g., direction index 1) and the target direction index $i_t$ (e.g., direction index 11), Energy[i] corresponds to a first series of energy values associated with the direction index i (e.g., direction index 1) and the frame index n (e.g., Energy[i] includes a series of m frame indexes, ending with a current frame index n), Energy[$i_t$] corresponds to a second series of energy values associated with the target direction index $i_t$ (e.g., direction index 11) and the frame index n (e.g., Energy[$i_t$] includes a series of m frame indexes, ending with the current frame index n), and * is the cross-correlation operation.

After determining the cross-correlation values, in some examples the device 110 may also apply smoothing to the cross-correlation values, similar to Equation [6.1] above. For example, the device 110 may apply the first smoothing parameter $\lambda_1$ and the second smoothing parameter $\lambda_2$ to generate a weighted sum of the previous smoothed cross-correlation values (e.g., associated with the previous frame index n−1) and a current cross-correlation value (e.g., associated with frame index n). However, the disclosure is not limited thereto and the device 110 may instead apply smoothing when generating the cross-correlation data itself, using the following equation:

$$CC_s[i,n]=\lambda_1*CC_S[i,n-1]+\lambda_2*(Energy[i]*Energy[i_t])[n] \quad [7.2]$$

where $CC_s[i, n]$ corresponds to a smoothed cross-correlation value that is associated with frame index n (e.g., current frame index) and corresponds to a cross-correlation between the direction index i (e.g., direction index 1) and the target direction index $i_t$ (e.g., direction index 11), $\lambda_1$ corresponds to the first smoothing parameter that indicates a first weight given to previous smoothed cross-correlation values, $CC_s[i, n-1]$ corresponds to a smoothed cross-correlation value that is associated with frame index n−1 (e.g., previous frame index) and corresponds to a cross-correlation between the direction index i (e.g., direction index 1) and the target direction index $i_t$ (e.g., direction index 11), $\lambda_2$ corresponds to the second smoothing parameter that indicates a second weight given to current cross-correlation values, Energy[i] corresponds to a first energy value associated with the specific direction index i (e.g., direction index 1) and frame index n (e.g., current frame index), Energy [$i_t$] corresponds to a second energy value associated with the target direction index $i_t$ (e.g., direction index 11) and frame index n (e.g., current frame index), and * is the cross-correlation operation.

After generating the smoothed cross-correlation values, the device 110 may perform a normalization operation to normalize the smoothed cross-correlation values with the energies of the a direction index i and the target direction index $i_t$. For example, the device 110 may calculate the normalized cross-correlation values using the following equation:

$$CC_n[i, n] = \frac{CC_s[i, n]}{\sqrt{Energy_s^2[i, n] * Energy_s^2[i_t, n] + \delta}} \quad [7.3]$$

where $CC_n[i,n]$ corresponds to a normalized cross-correlation value that is associated with frame index n (e.g., current frame index) and corresponds to a normalized cross-correlation between the direction index i (e.g., direction index 1) and the target direction index $i_t$ (e.g., direction index 11), $CC_s[i,n]$ corresponds to a smoothed cross-correlation value that is associated with the frame index n and corresponds to a cross-correlation between the direction index i (e.g., direction index 1) and the target direction index $i_t$ (e.g., direction index 11), $Energy_s^2[i, n]$ corresponds to a smoothed energy squared value that is associated with frame index n and the direction index i (e.g., direction index 1), $Energy_s^2[i_t,n]$ corresponds to a smoothed energy squared value that is associated with frame index n and the target direction index $i_t$ (e.g., direction index 11), and $\delta$ is a small positive value to avoid dividing by zero.

Referring back to FIG. 5, the cross-correlation calculation component 532 may output the cross-correlation data to lag boundary determination component 534 to determine lag boundaries associated with an audio source. Thus, the lag boundary determination component 534 may determine a lower bound and an upper bound associated with the audio source based on the cross-correlation data (received from the cross-correlation calculation component 532), the directional vector data (received from the energy scan component 530), the target direction index and/or the target azimuth (received from the reference lag calculation component 542), and/or the like. For example, the device 110 may identify regions of strong correlation (e.g., regions of black in the cross-correlation chart 810) and may use a correlation threshold value to select direction indexes that are strongly correlated with the audio source (e.g., direction indexes for which a correlation value exceeds the correlation threshold value).

As illustrated in FIG. 8, cross-correlation chart 820 illustrates two cross-correlation signals. A first cross-correlation signal corresponds to cross-correlation values associated with frame index 90, and is represented by a solid line that reaches a peak roughly around direction index 11 and slopes downward on either side. If the device 110 uses a first correlation threshold value (e.g., 0.8), the device 110 may determine that a lower bound for the first cross-correlation signal corresponds to direction index 10 and an upper bound for the first cross-correlation signal corresponds to direction index 13. Thus, the device 110 may determine that direction indexes 10-13 are associated with a first audio source for frame index 90. However, if the device 110 uses a second correlation threshold value (e.g., 0.5), the device 110 may determine that a lower bound for the first cross-correlation signal corresponds to direction index 7 and an upper bound for the first cross-correlation signal corresponds to direction index 13. Thus, the device 110 may instead determine that direction indexes 7-13 are associated with the first audio source for frame index 90.

A second cross-correlation signal corresponds to cross-correlation values associated with frame index 100, and is represented by a dashed line that reaches a broader peak between direction indexes 8-12, sloping downward on either side. If the device 110 uses the first correlation threshold value (e.g., 0.8), the device 110 may determine that a lower bound for the second cross-correlation signal corresponds to direction index 8 and an upper bound for the second cross-correlation signal corresponds to direction index 12. Thus, the device 110 may determine that direction indexes 8-12 are associated with the first audio source for frame index 100. However, if the device 110 uses the second correlation threshold value (e.g., 0.5), the device 110 may determine that a lower bound for the second cross-correlation signal corresponds to direction index 7 and an upper bound for the second cross-correlation signal corresponds to direction index 13. Thus, the device 110 may instead determine that direction indexes 7-13 are associated with the second audio source for frame index 100.

The device 110 may select the correlation threshold value using any techniques known to one of skill in the art without departing from the disclosure. For example, the device 110 may select a fixed correlation threshold value (e.g., 0.8), which remains the same for all cross-correlation data. Additionally or alternatively, the device 110 may vary the correlation threshold value based on the cross-correlation data, a number of audio sources, and/or other variables without departing from the disclosure.

Figure 9A:
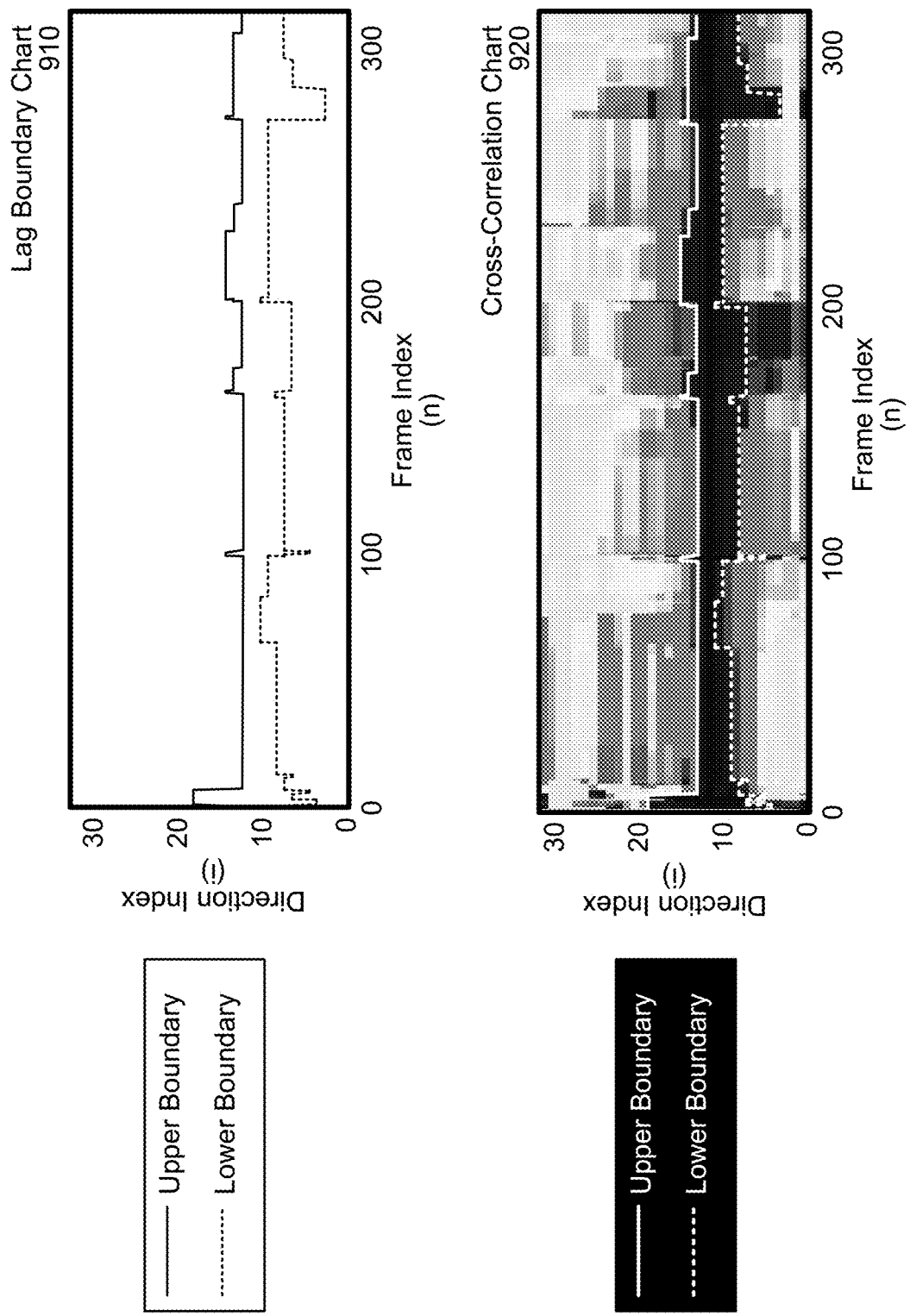

FIGS. 9A-9B illustrate examples of deriving lag boundaries based on the cross-correlation data according to examples of the present disclosure. As illustrated in FIG. 9A, lag boundary chart 910 may illustrate a lower boundary (represented by a dashed line) and an upper boundary (represented by a solid line) associated with an audio source. As discussed above, the lag boundary determination component 534 may determine the lower boundary and the upper boundary based on where the cross-correlation signals intersect the cross-correlation threshold. For example, the lag boundary determination component 534 may start at the target direction index associated with the target azimuth 540, which in this example is direction index 11, and may detect where the cross-correlation values fall below the cross-correlation threshold value in direction indexes lower than the target direction index (e.g., lower boundary), and then start at the target direction index and detect where the cross-correlation values fall below the cross-correlation threshold value in direction indexes higher than the target direction index (e.g., upper boundary).

FIG. 9A illustrates cross-correlation chart 920 that represents the lower boundary and the upper boundary superimposed on the cross-correlation data. As illustrated in FIG. 9A, the lag boundaries correspond to where the cross-correlation values decrease from a high magnitude (represented by black) to a slightly lower magnitude (represented by gray).

As discussed above with regard to FIG. 7, the device 110 may control a width of the lag boundaries. In the examples described above, the device 110 discarded peaks that were too broad (e.g., too shallow). For example, the device 110 may determine a width of the peak using the left bound (e.g., lower boundary) and the right bound (e.g., upper boundary) and determine if the width exceeds a maximum peak width threshold. Thus, the second peak had a width of 3 direction indexes (e.g., difference between direction index 13 and direction index 10), below the maximum peak width threshold, whereas the third peak had a width of 26+ direction indexes (e.g., difference between direction index 32 and direction index 6), which was above the maximum peak width threshold (e.g., 10) and resulted in the third peak being removed.

In some examples, instead of removing a peak, the device 110 may determine that the peak is too broad and may simply limit the width to a maximum peak width threshold (e.g., 10 direction indexes). For example, the device 110 may vary the cross-correlation threshold to control the width of the lag boundaries. Thus, increasing the cross-correlation threshold corresponds to higher cross-correlation values (e.g., higher similarity) being associated with the lower boundary and the upper boundary, narrowing a width associated with the peak.

FIG. 9B illustrates an example of narrowing the width of a peak according to examples of the present disclosure. As illustrated in FIG. 9B, a first lag boundary chart 930 represents a lower boundary and an upper boundary determined using a first threshold value. As the first threshold value is relatively small and/or fixed, the lower boundary and the upper boundary vary drastically over time, with inconsistent widths as the boundaries fluctuate. In contrast, second lag boundary chart 940 represents a lower boundary and an upper boundary determined using second threshold value(s). The second threshold value(s) are higher than the first threshold value, resulting in the width of the peak being narrower.

In some examples, the device 110 may vary the second threshold value(s) over time in order to maintain the width of the peak consistently at the maximum peak width threshold. Thus, a threshold value at frame index 100 may be different than a threshold value at frame index 200, in order to select the 10 direction indexes having highest cross-correlation values. This corresponds to a uniform width that does not exceed the maximum peak width threshold, but remains consistent over time.

In some examples, the device 110 may use the peaks detected in the smoothed energy squared values when deriving the lag boundaries. For example, the device 110 may determine the lag boundaries, as discussed above, but may verify that the lag boundaries are valid if one of the peaks is located within the lag boundaries. Thus, the device 110 may include a verification step that compares the peaks detected in the smoothed energy squared values to the lag boundaries. If no peaks are detected within the lag boundaries, the device 110 will discard the lag boundaries. This may correspond to not detecting an audio source, although the disclosure is not limited thereto.

After generating the lag boundaries and verifying that peak(s) are detected within the lag boundaries, the lag boundary determination component 534 may output the lag boundaries to a mask generation component 550. The mask generation component 550 will also receive the lag estimate vector data and/or the direction mask data generated by the lag calculation component 520. Using the lag boundaries, the lag estimate vector data, and/or the direction mask data, the mask generation component 550 may generate a mask corresponding to the audio source. For example, the mask generation component 550 may generate mask data that combines the direction mask data for each direction index included within the lag boundaries.

As described in greater detail above, the direction mask data indicates whether a particular frequency band corresponds to a particular direction index. Thus, if the lag boundaries correspond to a lower bound of direction index 10 and an upper bound of direction index 13, the mask generation component 550 may generate mask data including each of the frequency bands associated with direction indexes 10-13 (e.g., each of the frequency bands that have an estimated lag value corresponding to the direction indexes 10-13). In some examples, the mask data may be smoothed using techniques known to one of skill in the art, such as by applying a triangular window or the like, although the disclosure is not limited thereto.

Figure 10A:
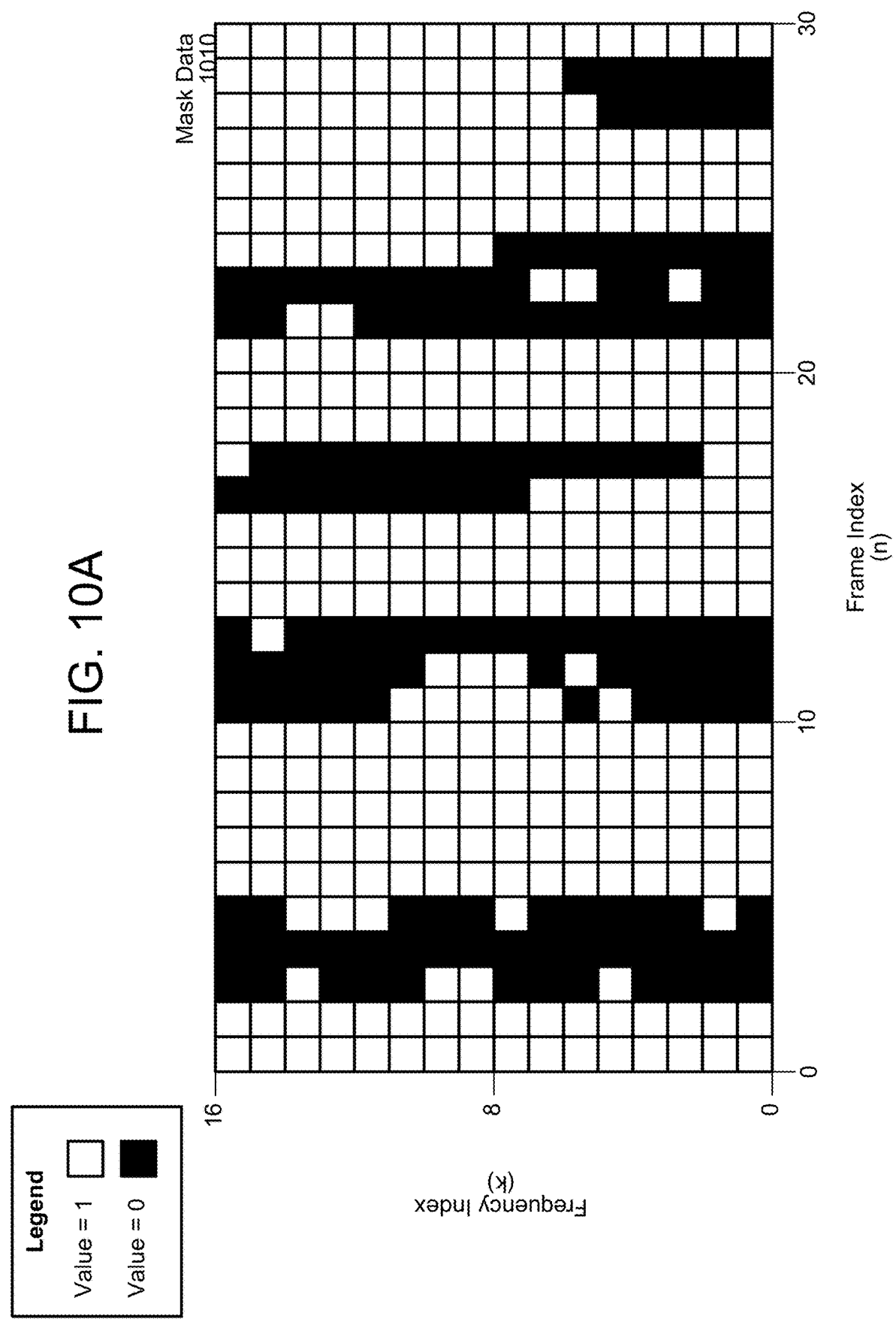
FIGS. 10A-10B illustrate examples of mask data generated according to examples of the present disclosure.
Figure 10B:
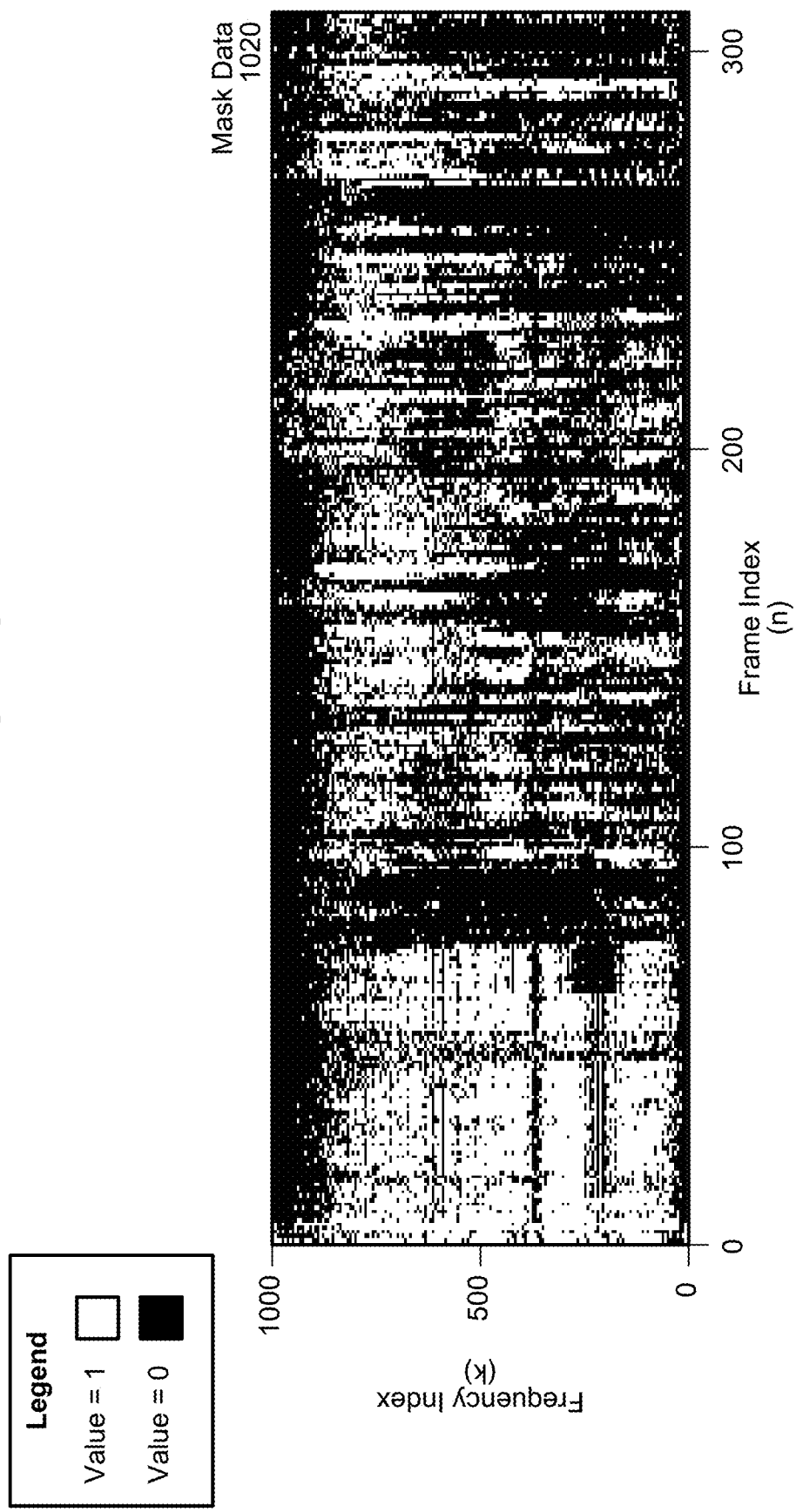

FIGS. 10A-10B illustrate examples of mask data generated according to examples of the present disclosure. As illustrated in FIG. 10A, the device 110 may generate mask data 1010 that indicates individual frequency indexes k and frame indexes n that are associated with an audio source. For example, the device 110 may determine lag boundaries indicating a range of direction indexes i that are associated with the audio source and the mask data may indicate a plurality of frequency indexes k that correspond to this range of direction indexes i. The mask data 1010 indicates frequency indexes k along the vertical axis and frame indexes n along the horizontal axis.

As illustrated in FIG. 10A, a value of one is represented in the mask data 1010 as a white cell, whereas a value of zero is represented in the mask data 1010 as a black cell. Thus, a white cell indicates that a particular frequency index k corresponds to the audio source at a particular frame index n, whereas a black cell indicates that the particular frequency index k does not correspond to the audio source at the particular frame index n.

For ease of illustration, the mask data 1010 illustrated in FIG. 10A only corresponds to a portion of the total mask data. For example, the mask data 1010 only includes a narrow range of frequency indexes k (e.g., 16 frequency bands) and frame indexes n (e.g., 30 frame indexes) in order to accurately represent individual cells corresponding to a specific frequency index k and frame index n. However, the disclosure is not limited thereto and the device 110 may determine mask values for any number of frequency indexes k and/or frame indexes n without departing from the disclosure. For example, FIG. 10B illustrates mask data 10J20 corresponding to 1000 frequency indexes and over 300 frame indexes, although the device 110 may generate mask data for any number of frequency indexes and/or frame indexes without departing from the disclosure.

While FIGS. 10A-10B illustrate the mask data as binary masks, the disclosure is not limited thereto and the mask data may correspond to continuous values without departing from the disclosure. For example, white may represent a mask value of one (e.g., strong correlation with the audio source), black may represent a mask value of zero (e.g., weak correlation with the audio source), and varying shades of gray representing intermediate mask values between zero and one (e.g., medium correlation with the audio source).

In the example illustrated in FIG. 5, the first modified audio signal and the second modified audio signal are input to output generation component 560, which generates a first output audio signal corresponding to an entire frequency range. The output generation component 560 may generate the first output audio signal using any technique known to one of skill in the art without departing from the disclosure. For example, the output generation component 560 may perform a mean operation to determine an average of the first modified input signal and the second modified input signal, although the disclosure is not limited thereto.

A multiplier component 570 may apply the mask data to the first output audio signal to generate second output audio signal that corresponds to a single audio source. For example, the multiplier component 570 may apply the mask data to the first output audio signal so that the second output audio data only includes a portion of the first output audio signal that corresponds to the frequency bands associated with direction indexes 10-13.

As discussed above, the device 110 may generate a unique output audio signal for each audio source. For example, mask generation component 550 may generate first mask data associated with a first audio source and may generate second mask data associated with a second audio source. Thus, the multiplier component 570 may apply the first mask data to the first output audio signal to generate the second output audio signal that is associated with the first audio source while also applying the second mask data to the first output audio signal to generate a third output audio signal that is associated with the second audio source. However, the number of audio sources and/or output audio signals is not limited thereto and may vary without departing from the disclosure.

The multiplier component 570 may output each of the output audio signals to an Inverse Discrete Fourier Transform (IDFT) component 580, which may perform IDFT to convert back from the frequency domain to the time domain. For example, the multiplier component 570 may output the second output audio signal to the IDFT component 580 and the IDFT component 580 may generate third output audio signal based on the second output audio signal. The IDFT component 580 may output the third output audio signal to windowing and overlap-add (OLA) component 590, which may combine the third output audio signal with previous output signals to generate output signal 592 as a final output. Thus, the output signal 592 corresponds to isolated audio data associated with an individual audio source. If the device 110 detects multiple audio sources, the device 110 may generate a unique output signal 592 for each audio source (e.g., first output signal 592a for a first audio source, second output signal 592b for a second audio source, etc.).

Figure 11:
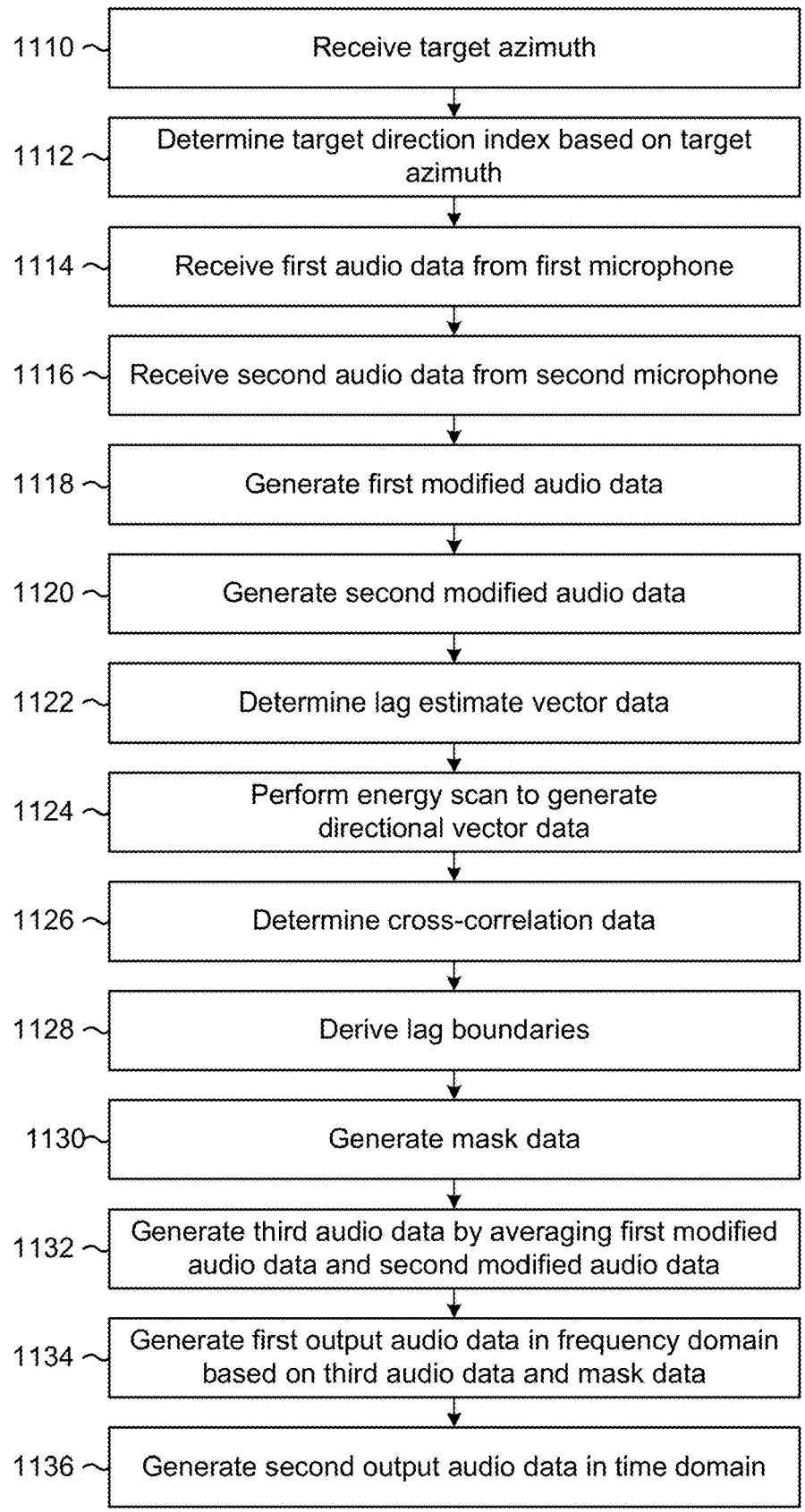
FIG. 11 is a flowchart conceptually illustrating a method for performing directional speech separation according to examples of the present disclosure.

FIG. 11 is a flowchart conceptually illustrating a method for performing directional speech separation according to examples of the present disclosure. As illustrated in FIG. 11, the device 110 may receive (1110) a target azimuth value and may determine (1112) a target direction index based on the target azimuth value.

The device 110 may receive (1114) first audio data from a first microphone, may receive (1116) second audio data from a second microphone, may generate (1118) first modified audio data from the first audio data and may generate (1120) second modified audio data from the second audio data. For example, the first audio data and the second audio data may be in a time domain, whereas the first modified audio data and the second modified audio data may be in a frequency domain.

The device 110 may determine (1122) lag estimate vector data (e.g., lag estimate data) based on the first modified audio data and the second modified audio data, may perform (1124) an energy scan to generate directional vector data, may determine (1126) cross-correlation data, may derive (1128) lag boundaries and may generate (1130) mask data based on the lag boundaries, as described above with regard to FIG. 5. For example, the lag estimate vector data may determine lag estimate values between the first modified audio data and the second modified audio data for each frequency band, and the directional vector data may associate individual frequency bands with a particular direction index based on the estimated lag values.

The device 110 may generate (1132) third audio data by averaging the first modified audio data and the second modified audio data, may generate (1134) first output audio data in a frequency domain based on the third audio data and the mask data, and may generate (1136) second output audio data in a time domain based on the first output audio data. For example, the third audio data may correspond to an output of the output generation component 560, the first output audio data may correspond to an output of the multiplier component 570, and the second output audio data may correspond to the output signal 592.

Figure 12:
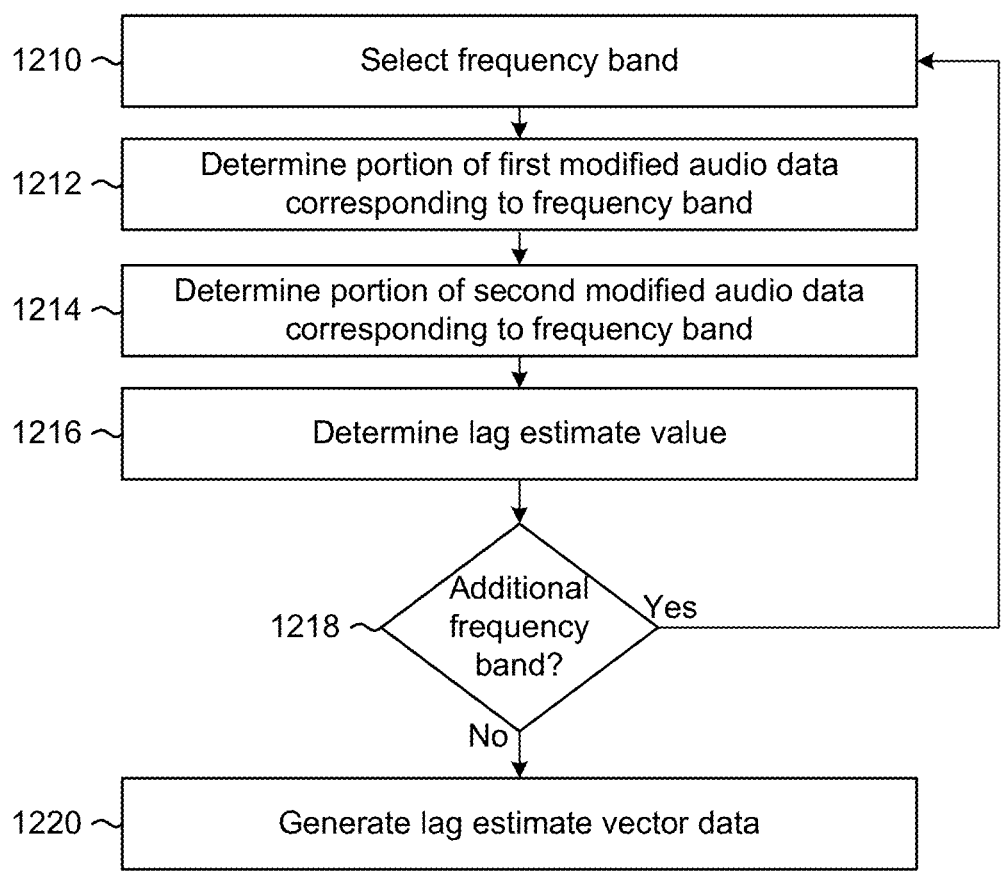
FIG. 12 is a flowchart conceptually illustrating a method for determining lag estimate values according to examples of the present disclosure.

FIG. 12 is a flowchart conceptually illustrating a method for determining lag estimate values according to examples of the present disclosure. As illustrated in FIG. 12, the device 110 may select (1210) a frequency band (e.g., frequency index k), may determine (1212) a first portion of the first modified audio data corresponding to the frequency band, may determine (1214) a second portion of the second modified audio data corresponding to the frequency band, and may determine (1216) a lag estimate value based on the first portion and the second portion. The device 110 may determine (1218) whether there is an additional frequency band to select, and if so, may loop to 1210 to repeat steps 1210-1218. If there are no additional frequency bands, the device 110 may generate (1220) lag estimate vector data including each of the lag estimate values calculated in step 1216.

Figure 13:
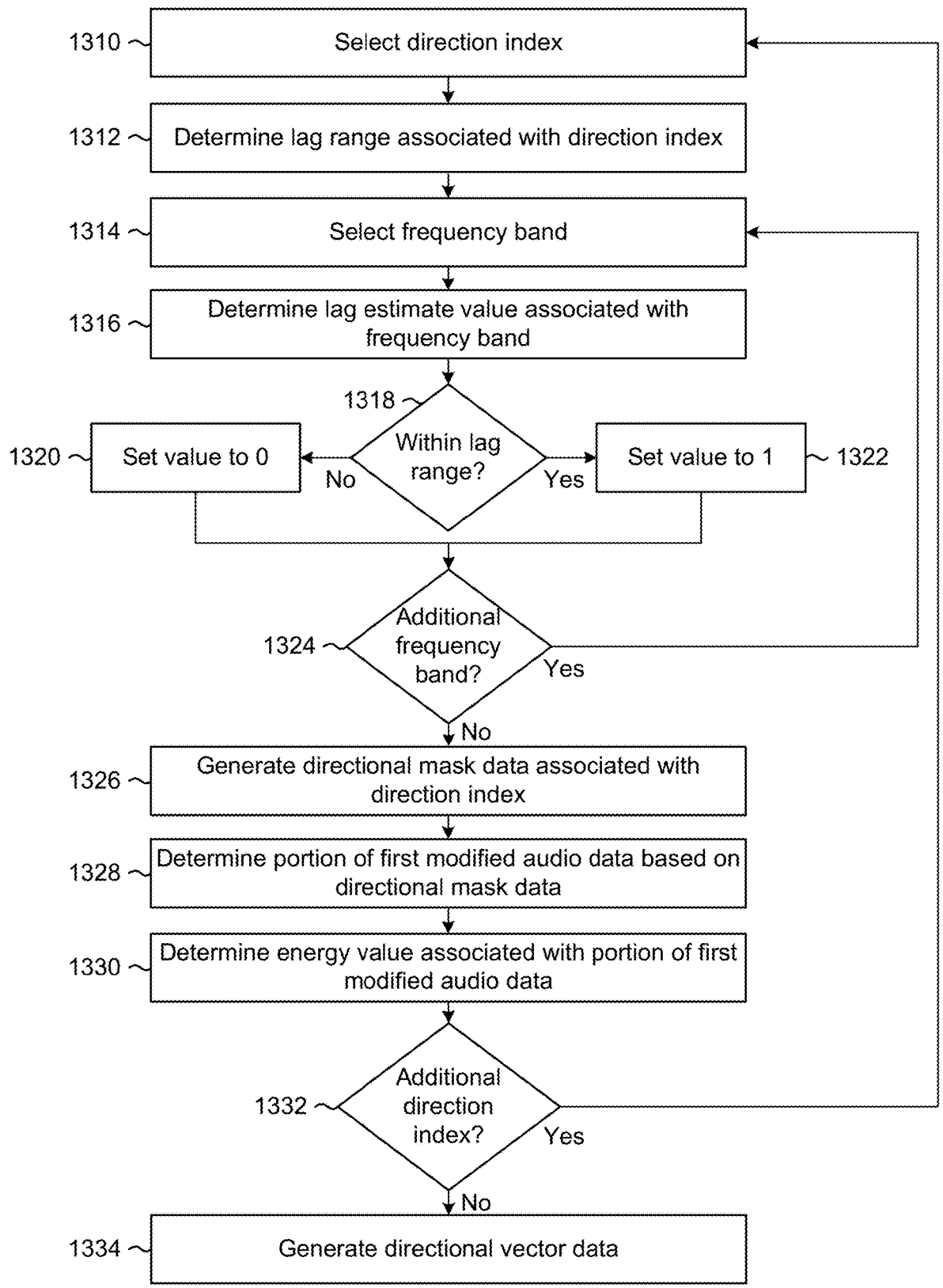
FIG. 13 is a flowchart conceptually illustrating a method for determining energy levels associated with directions according to examples of the present disclosure.

FIG. 13 is a flowchart conceptually illustrating a method for determining energy levels associated with directions according to examples of the present disclosure. As illustrated in FIG. 13, the device 110 may select (1310) a direction index i and may determine (1312) a lag range associated with the direction index. In some examples, the device 110 may determine a lower boundary and an upper boundary associated with the direction index i. However, the disclosure is not limited thereto and in other examples, the device 110 may determine a center point and a lag threshold value associated with the direction index i. Using the center point and the lag threshold value, the device 110 may determine the lower boundary and the upper boundary associated with the direction index i.

The device 110 may select (1314) a frequency band (e.g., frequency index k), may determine (1316) a lag estimate value associated with the frequency band, and may determine (1318) whether the lag estimate value is within the lag range associated with the direction index i. If the lag estimate value is not within the lag range, the device 110 may set (1320) a value within directional mask data to zero, whereas if the lag estimate value is within the lag range, the device 110 may set (1322) the value to one. The device 110 may determine (1324) whether there is an additional frequency band, and if so, may loop to step 1314 to repeat steps 1314-1324.

If there is not an additional frequency band, the device 110 may generate (1326) directional mask data associated with the direction index by combining each of the values determined in steps 1320 and 1322 for corresponding frequency bands. The device 110 may then determine (1328) a portion of the first modified audio data based on the directional mask data, and may determine (1330) an energy value associated with the portion of the first modified audio data. For example, the device 110 may determine the energy value for frequency bands associated with the direction index based on the directional mask data, as discussed above with regard to FIG. 5.

The device 110 may determine (1332) whether there is an additional direction index, and if so, may loop to step 1310 to repeat steps 1310-1332. If there are no additional direction indexes, the device 110 may generate (1334) directional vector data by combining the energy values determined in step 1330 for each of the direction indexes.

Figure 14:
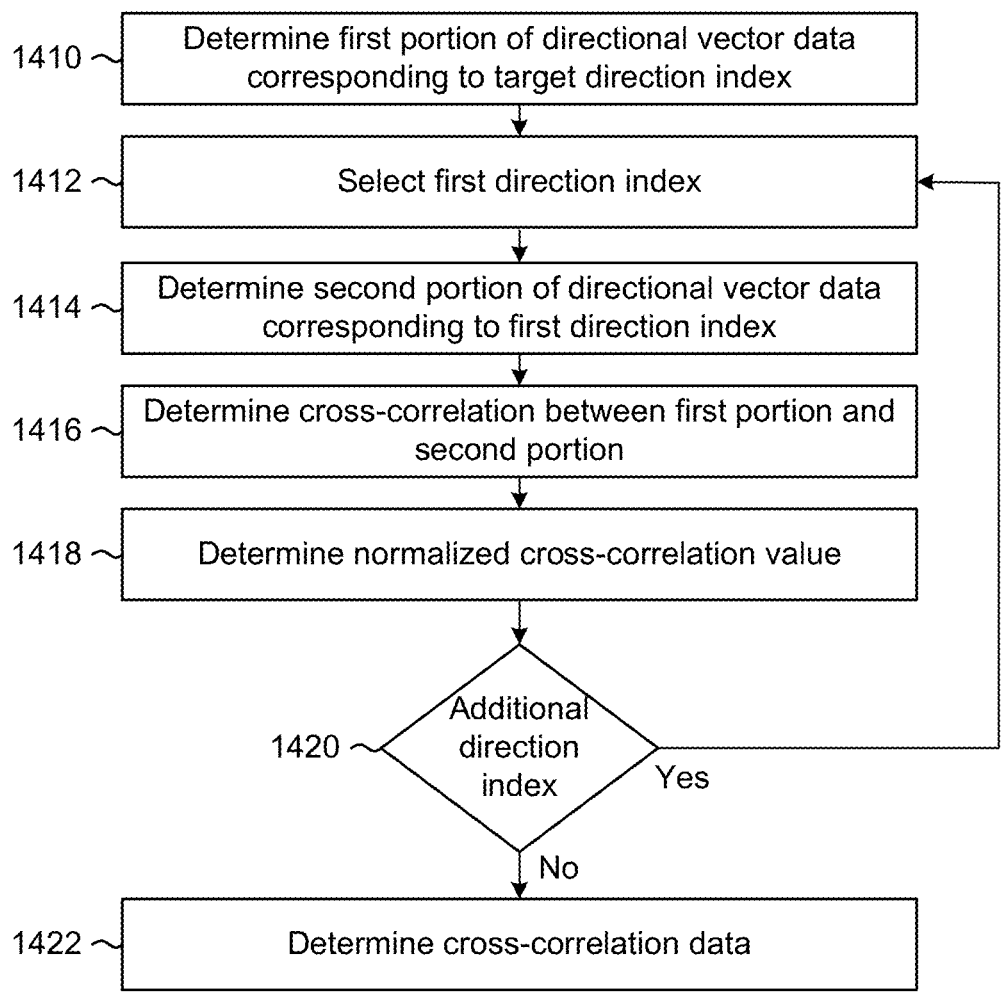
FIG. 14 is a flowchart conceptually illustrating a method for determining cross-correlation data according to examples of the present disclosure.

FIG. 14 is a flowchart conceptually illustrating a method for determining cross-correlation data according to examples of the present disclosure. As illustrated in FIG. 14, the device 110 may determine (1410) a first portion of the directional vector data corresponding to a target direction index. The device 110 may select (1412) a first direction index, may determine (1414) a second portion of the directional vector data corresponding to the first direction index, may determine (1416) a cross-correlation between the first portion and the second portion, and may determine (1418) a normalized cross-correlation value by normalizing the cross-correlation, as discussed in greater detail above with regard to FIG. 5. The directional vector data may include energy values for each frequency index over a period of time. For example, the directional vector data may include a current energy value for a specific frequency index, as well as energy values associated with the specific frequency index over m previous frames. Thus, the directional vector data may include a time sequence for each of the direction indexes, such as m frames of energy values for each direction index i.

The device 110 may determine (1420) whether there is an additional direction index, and if so, may loop to step 1412 to repeat steps 1412-1420. If there are no additional direction indexes, the device 110 may determine (1422) cross-correlation data based on the normalized cross-correlation values determined in step 1418 for each of the direction indexes.

Figure 15:
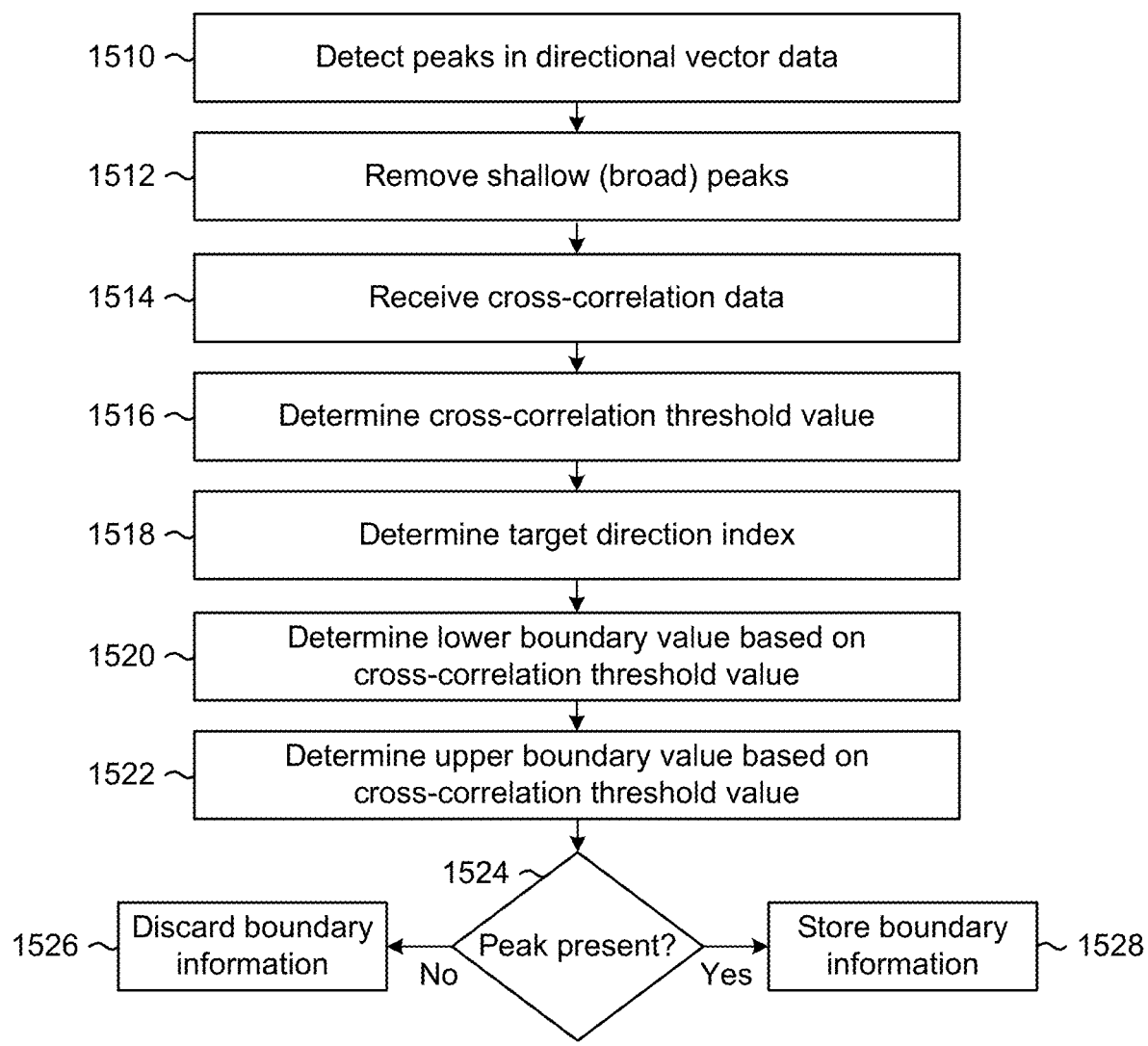
FIG. 15 is a flowchart conceptually illustrating a method for deriving lag boundaries according to examples of the present disclosure.

FIG. 15 is a flowchart conceptually illustrating a method for deriving lag boundaries according to examples of the present disclosure. As illustrated in FIG. 15, the device 110 may detect (1510) peaks in the directional vector data and may remove (1512) shallow (e.g., broad) peaks detected in the directional vector data.

The device 110 may receive (1514) the cross-correlation data, may determine (1516) a cross-correlation threshold value, may determine (1518) a target direction index, may determine (1520) a lower boundary value based on the cross-correlation threshold value and the target direction index, and may determine (1522) an upper boundary value based on the cross-correlation threshold value and the target direction index. For example, the device 110 may start at the target direction index and may detect where cross-correlation values decrease below the cross-correlation threshold value for direction indexes below the target direction index to determine the lower boundary value. Similarly, the device 110 may start at the target direction index and may detect where cross-correlation values decrease below the cross-correlation threshold value for direction indexes above the target direction index to determine the upper boundary value.

After determining the lower boundary value and the upper boundary value, the device 110 may determine (1524) whether a peak is present within the lag boundaries. If a peak is not present, the device 110 may discard (1526) the boundary information, whereas if a peak is present the device 110 may store (1528) the boundary information for a particular audio source and/or frame index n.

Figure 16:
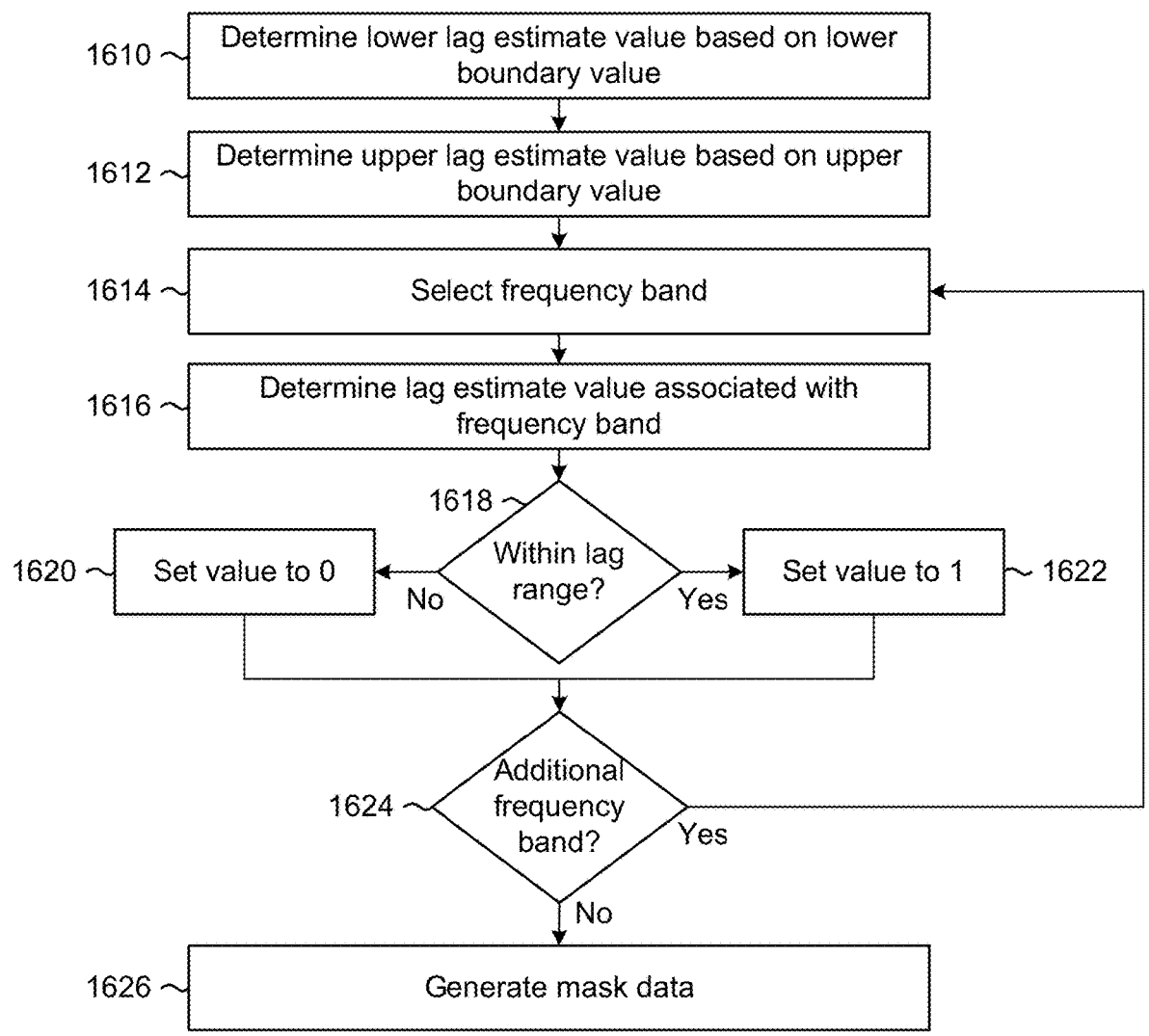
FIG. 16 is a flowchart conceptually illustrating a method for generating mask data according to examples of the present disclosure.

FIG. 16 is a flowchart conceptually illustrating a method for generating mask data according to examples of the present disclosure. As illustrated in FIG. 16, the device 110 may determine (1610) a lower lag estimate value based on the lower boundary value and may determine (1612) an upper lag estimate value based on the upper boundary value. For example, the lower lag estimate value may correspond to a minimum lag estimate value associated with the direction index corresponding to the lower boundary value, whereas the upper lag estimate value may correspond to a maximum lag estimate value associated with the direction index corresponding to the upper boundary value.

The device 110 may select (1614) a frequency band, may determine (1616) a lag estimate value associated with the frequency band, and may determine (1618) whether the lag estimate value is within the lag range determined in steps 1610-1612. If the lag estimate value is not within the lag range, the device 110 may set (1620) a value to zero in the mask data, whereas if the lag estimate value is within the lag range, the device 110 may set (1622) the value to one in the mask data. The device 110 may then determine (1624) whether there is an additional frequency band and, if so, may loop to step 1614 to repeat steps 1614-1624. If there is not an additional frequency band, the device 110 may generate (1626) mask data by combining the values determined in steps 1620-1622 for each of the frequency bands. Thus, the mask data may indicate individual frequency bands that are associated with the audio source based on the direction indexes indicated by the lag boundaries.

While FIG. 16 illustrates an example of generating the mask data, the disclosure is not limited thereto. Instead, the device 110 may combine the directional vector data associated with each of the direction indexes included between the lower boundary value and the upper boundary value without departing from the disclosure. Additionally or alternatively, the device 110 may generate the mask data using any technique known to one of skill in the art.

While the device 110 may generate the output audio data by applying binary mask data to the microphone audio data, using the binary mask data may result in transients and/or distortion in the output audio data due to abrupt transitions between values of 0 and values of 1. In some examples, the device 110 may smooth binary mask data to generate continuous mask data as part of generating the mask data in step 1626. For example, the binary mask data may correspond to values of 0 (e.g., logic low) or 1 (e.g., logic high), whereas the continuous mask data may correspond to values between 0 and 1 (e.g., 0.0, 0.1, 0.2, etc.). To illustrate an example of smoothing the binary mask data to generate continuous mask data, an abrupt transition in the binary mask data (e.g., [0, 0, 0, 0, 1, 1, 1]) may correspond to a more gradual transition in the continuous mask data (e.g., [0, 0, 0.1, 0.5, 0.9, 1, 1]. In some examples, the device 110 may apply a smoothing mask using a triangular filter bank to smooth the binary mask data across frequencies in order to generate a final representation of the mask data. However, the disclosure is not limited thereto and the device 110 may use any technique known to one of skill in the art without departing from the disclosure.

When the device 110 only uses two microphones (e.g., Mic0 and Mic1) to perform sound source separation, the device 110 can determine an angle of arrival with respect to the line intersecting both microphones—called the main axis. Thus, the device 110 can generate azimuth intervals for 180 degrees, but not 360 degrees. For example, if a first sound source was located at the same position as a second sound source but flipped along the main axis, the device 110 would not be able to separate the two sound sources as the audio signals would have the same time delay (e.g., direction of arrival). However, the disclosure is not limited thereto and if the device 110 includes three or more microphones 112 the device 110 may separate sound sources of arbitrary directions, as long as those directions are different.

FIG. 17 illustrates an example of separating sound sources based on an angle of arrival using three microphones according to examples of the present disclosure. As illustrated in FIG. 17, the device 110 may include a three microphone array 1710 that is configured to resolve ambiguities associated with the two microphone implementation described above. For example, while the two microphone implementation (e.g., Mic0 and Mic1) is ambiguous along the main axis of the microphones, meaning that there are two directions that have the same time delay, the three microphone array 1710 includes a second microphone pair (e.g., Mid 1 and Mic2) that is rotated relative to the main axis and can separate sound sources that are ambiguous to the first microphone pair.

As illustrated in FIG. 17, the three microphone array 1710 may include three microphones, a first microphone Mic0, a second microphone Mic1, and a third microphone Mic2, configured in a triangle orientation. However, this is intended for illustrative purposes only and the disclosure is not limited thereto. Instead, the three microphone array 1710 may vary in shape, orientation, distance(s), and/or the like without departing from the disclosure. Additionally or alternatively, the device 110 may include more than three microphones without departing from the disclosure. In some examples, a larger microphone array can apply the techniques described herein by selecting two microphone pairs out of the microphone array, although the disclosure is not limited thereto.

FIG. 17 illustrates an example implementation of the three microphone array 1710. As illustrated in FIG. 17, the first microphone Mic0 may be separated from the second microphone Mic1 along a first axis (e.g., x-axis) by a fixed distance (e.g., 36 mm), while the third microphone Mic2 may be separated from the second microphone Mic1 along a second axis by the fixed distance, although these distances may vary without departing from the disclosure. The example implementation 1720 illustrates that the second axis may be rotated by 60 degrees relative to the first axis, although the disclosure is not limited thereto. Rotating or offsetting the second axis from the first axis enables the device 110 to resolve ambiguities and separate sound sources in any direction.

Using the three microphone implementation 1710, the device 110 may select a first microphone pair 1730 (e.g., Mic0 and Mic1, with Mic1 separated from Mic0 along the x-axis) to generate first direction indexes 1735 [1, 2, . . . i] (e.g., i uniformly divided azimuth intervals for 180 degrees along the x-axis), and also select a second microphone pair 1740 (e.g., Mic1 and Mic2) to generate second direction indexes 1745 [1, 2, . . . i] (e.g., i second uniformly divided azimuth intervals for 180 degrees along the second axis). As illustrated in FIG. 17, the second direction indexes 1745 may have a rotation 1750 relative to the first direction indexes 1735 of 60 degrees (e.g., 8 direction indexes), although the disclosure is not limited thereto.

Based on a combination of the first direction indexes 1735 and the second direction indexes 1745, the device 110 may separate the sound sources and generate uniformly divided azimuth intervals for 360 degrees along both the x-axis and the y-axis without departing from the disclosure. For example, the device 110 may determine a first time delay between the first microphone (Mic0) and the second microphone (Mic1) and a second time delay between the second microphone (Mic1) and the third microphone (Mic2) and may determine an angle of arrival with 360 degree coverage.

FIG. 18 illustrates an example of combining direction indexes from two microphone pairs to generate direction indexes covering 360 degrees according to examples of the present disclosure. As illustrated in FIG. 18, the first direction indexes 1735 and the second direction indexes 1745 may correspond to actual directional data 1810. For example, the first direction indexes 1735 are represented using a light shade of gray, the second direction indexes 1745 are represented using a dark shade of gray, and an intersection of the two is represented using a medium shade of gray.

By processing the actual directional data 1810, the device 110 may generate virtual directional data 1820 comprising third directional indexes 1825 [1, 2, . . . 60]. To conceptually illustrate an example, FIG. 18 represents the third direction indexes 1825 corresponding to 60 indexes, with indexes 1-15 covering 0-90 degrees, indexes 16-30 covering 90-180 degrees, indexes 31-45 covering 180-270 degrees, and indexes 45-60 covering 270-360 degrees. However, the disclosure is not limited thereto and the number of indexes may vary without departing from the disclosure, although typically a first number of indexes in the third direction indexes 1825 is twice a second number of indexes in the first and second direction indexes 1735/1745 (e.g., i).

Figure 19A:
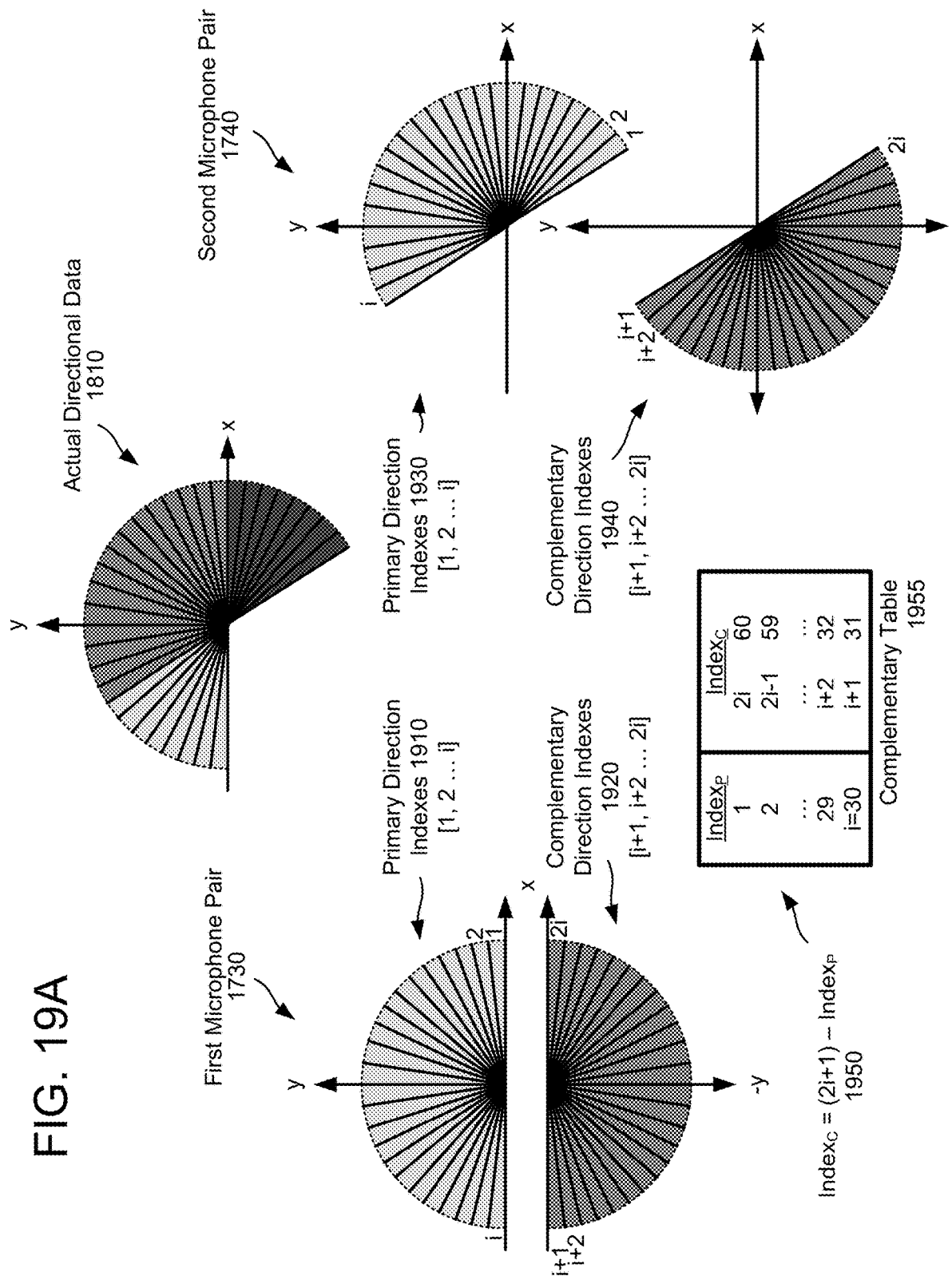

FIGS. 19A-19B illustrate examples of identifying primary and complementary direction indexes for both microphone pairs according to examples of the present disclosure. As illustrated in FIG. 19A, the actual directional data 1810 corresponds to first primary direction indexes 1910 [1, 2, . . . i] associated with the first microphone pair 1730 and second primary indexes 1930 [1, 2, . . . i] associated with the second microphone pair 1740.

The first primary direction indexes 1910 correspond to a first direction relative to the first axis (e.g., +y relative to the x-axis), while first complementary direction indexes 1920 [i+1, i+2, . . . 2i] correspond to a second direction relative to the first axis (e.g., −y relative to the x-axis). Thus, a first direction index (e.g., 30 degrees, or direction index 5) in the first primary direction indexes 1910 has the same time delay (e.g., direction of arrival) as a second direction index (e.g., 330 degrees, or direction index 55) in the first complementary direction indexes 1920. As illustrated in FIG. 19A, the first complementary direction indexes 1920 can be determined using equation 1950 (e.g., $Index_C = (2i+1) - Index_P$), and a complementary table 1955 illustrates examples of the primary direction index $Index_P$ (e.g., 1, 2, . . . 29, 30) along with a corresponding complementary direction index $Index_C$ as a function of a number of direction indexes i (e.g., 2i, 2i−1, i+2, i+1) or as an integer value (e.g., 60, 59, . . . 32, 31) when there are thirty direction indexes (e.g., i=30).

While the examples illustrated in FIG. 19A and other drawings illustrate the direction indexes ranging from a value of 1 to a value of i, the disclosure is not limited thereto. In some examples, the direction indexes may range from a value of 0 to a value of i−1, such that a first direction index (e.g., index 0) corresponds to a final direction index i (e.g., index 60). Using this implementation, the equation 1950 would be simplified by removing the +1 component (e.g., $Index_C = 2i - Index_P$), although the disclosure is not limited thereto.

The second primary direction indexes 1930 correspond to a third direction (e.g., (+x,+y)) relative to the second axis, while second complementary direction indexes 1940 [i+1, i+2, . . . 2i] correspond to a fourth direction (e.g., (−x, −y)) relative to the second axis. Thus, the first direction index (e.g., 30 degrees, or direction index 5) in the second primary direction indexes 1930 has the same time delay (e.g., direction of arrival) as the second direction index (e.g., 330 degrees, or direction index 55) in the second complementary direction indexes 1940. As the second primary direction indexes 1930 and the second complementary direction indexes 1940 are oriented relative to each other, the equation 1950 can be used to determine the second complementary direction indexes 1940.

While the second complementary direction indexes 1940 have the same orientation relative to the second primary direction indexes 1930, the actual index values are rotated by a fixed amount (e.g., 60 degrees or 10 index values). Thus, the first direction index in the first primary direction indexes 1910 is different than the first direction index in the second primary direction indexes 1930. In order to maintain consistency between the first microphone pair 1730 and the second microphone pair 1740, the device 110 may apply a fixed orientation for both the first microphone pair 1730 and the second microphone pair 1740. For example, the device 110 may track the second microphone pair 1740 using tilt-compensated values that have a one to one correspondence with the first microphone pair 1730.

As illustrated in FIG. 19B, the virtual directional data 1820 may correspond to direction indexes 1825 [1, 2, . . . 60] that mirror the first microphone pair 1730, with the second microphone pair 1740 offset or rotated by a fixed amount (e.g., 60° or 10 direction indexes). For example, FIG. 19B illustrates that a first direction (e.g., 30° or 5 direction indexes) is the same between the direction indexes 1825 and the first microphone pair 1730 and corresponds to a second direction (e.g., 90° or 15 direction indexes) for the second microphone pair 1740. Similarly, a third direction (e.g., 330° or 55 direction indexes) is the same between the direction indexes 1825 and the first microphone pair 1730 and corresponds to a fourth direction (e.g., 30° or 5 direction indexes) for the second microphone pair 1740. In this example, the first direction (e.g., 30°) and the third direction (e.g., 330°) are complementary or symmetrical using the first microphone pair 1730, meaning that the device 110 cannot distinguish between the two. Thus, the device 110 may refer to the second microphone pair 1740 to determine whether energy is detected in the second direction (e.g., 90°) or the fourth direction (e.g., 30°), which correspond to different time delays (e.g., direction of arrival).

The translation or mapping between the first microphone pair 1730 and the second microphone pair 1740 is represented in complementary table 1965. As illustrated in FIG. 19B, the complementary table 1965 includes a primary direction index ($Index_{P0}$) and a complementary direction index ($Index_{C0}$) for the first microphone pair 1730 (Array0), along with a primary direction index ($Index_{P1}$) and a complementary direction index ($Index_{C1}$) for the second microphone pair 1740 (Array1). Thus, the device 110 may select a primary direction index for the first microphone pair 1730 and determine a complementary direction index using the first microphone pair 1730 and/or the primary and complementary direction indexes for the second microphone pair 1740. Additionally or alternatively, the device 110 may select a primary direction index for the second microphone pair 1740 and determine a complementary direction index using the second microphone pair 1740 and/or the primary and complementary direction indexes for the first microphone pair 1730.

Figure 20A:
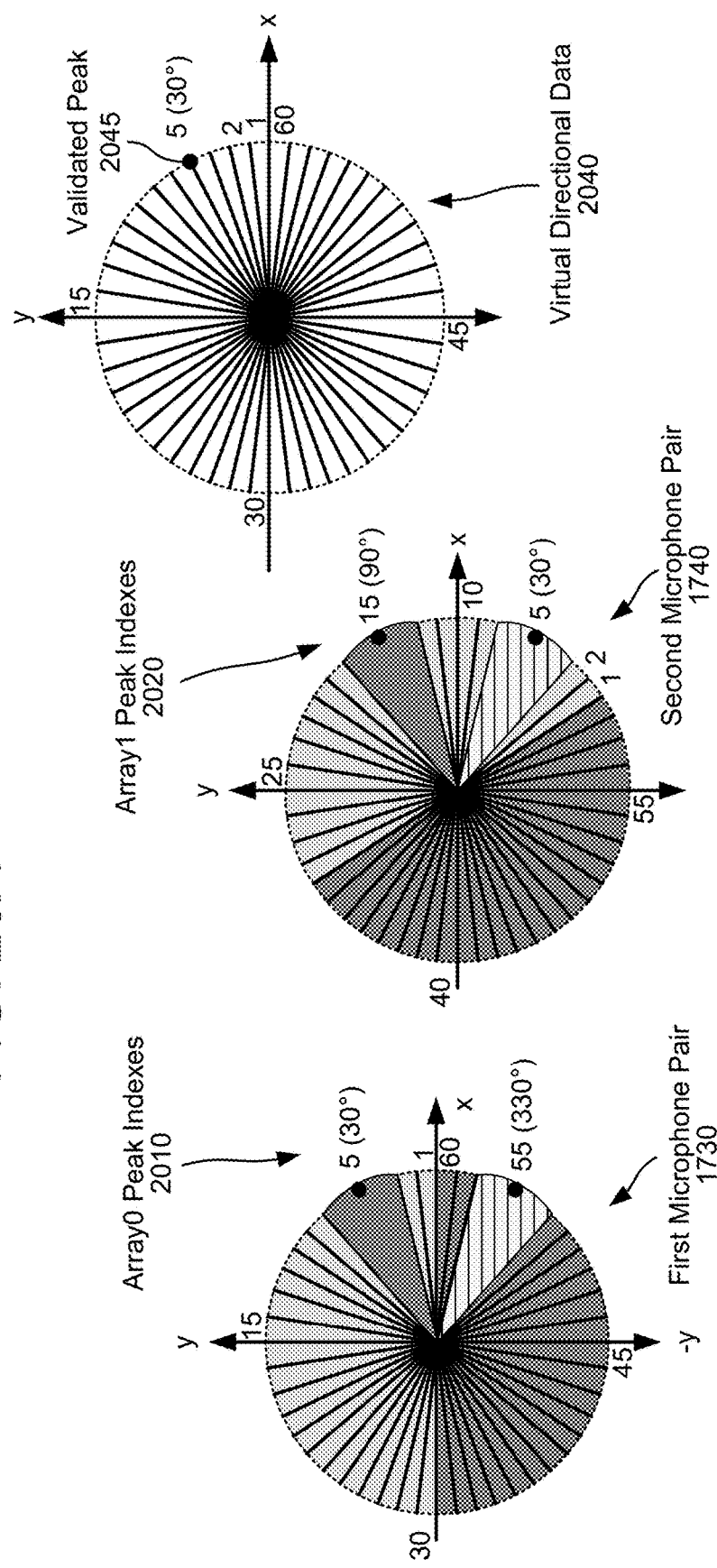
FIGS. 20A-20B illustrate examples of performing peak verification according to examples of the present disclosure.
Figure 20B:
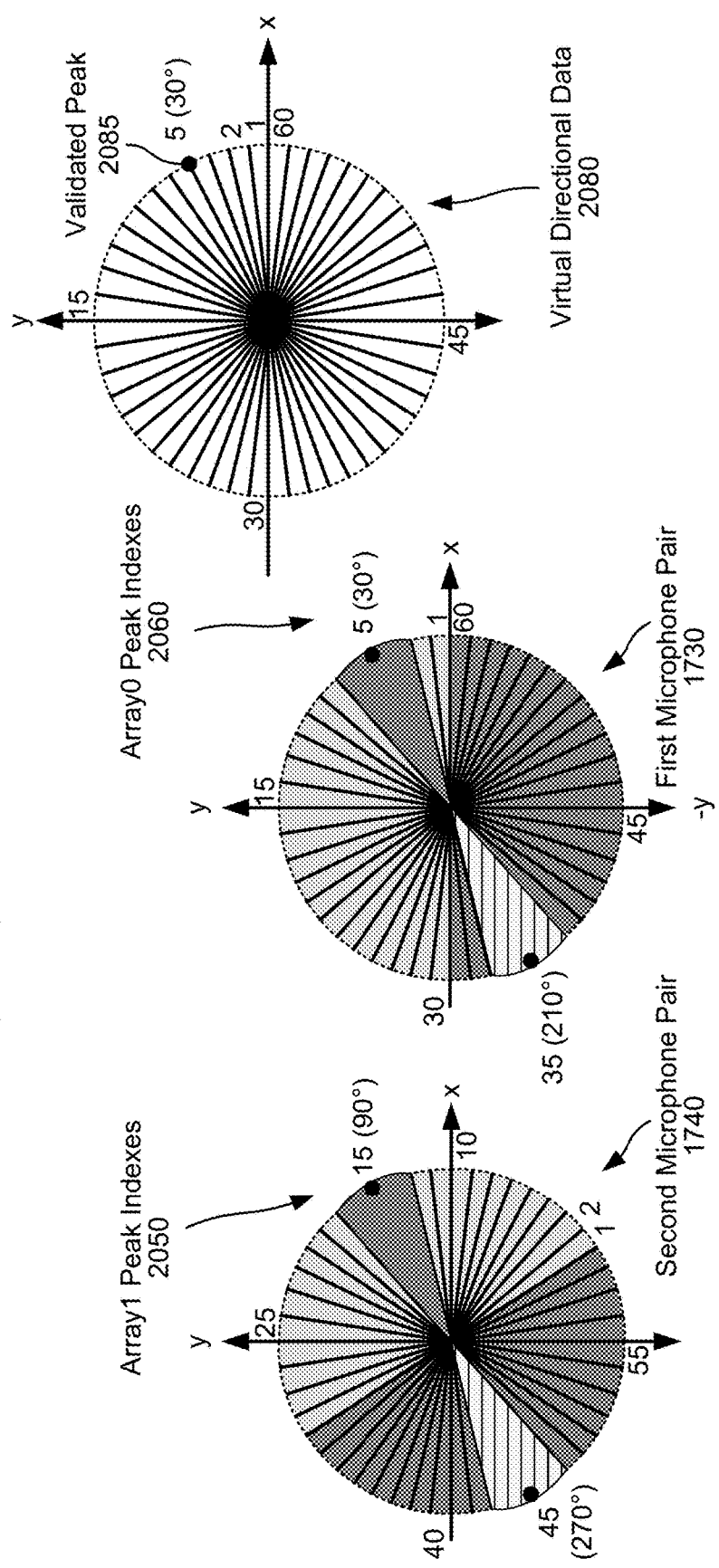

FIGS. 20A-20B illustrate examples of performing peak verification according to examples of the present disclosure. As described in greater detail above, the device 110 may perform energy scan processing to generate raw peak data that indicates energy values at different direction indexes. The device 110 may analyze the raw peak data to generate validated peak data that indicates whether a peak is valid (e.g., present) or not. For example, if the device 110 identifies a peak in the first direction (e.g., 30°) using the first microphone pair 1730, the device 110 may determine whether the peak is actually present in the first direction (e.g., 30°) or at a complementary angle in a second direction (e.g., 330°).

As illustrated in FIG. 20A, the device 110 may identify Array0 peak indexes 2010 using the first microphone pair 1730 and Array1 peak indexes 2020 using the second microphone pair 1740. The device 110 may generate an Array0 peak validation table 2030 corresponding to the Array0 peak indexes 2010. For example, the first microphone pair 1730 cannot distinguish between the first direction (e.g., 30°) or the second direction (e.g., 330°), so the device 110 may detect a peak at the first direction and include a primary direction index entry in the Array0 peak validation table 2030 for both the first direction and the second direction.

As represented in the Array0 peak validation table 2030, the first direction (e.g., 30°) corresponds to a first row for the first primary direction index $Index_{P0}$ (e.g., 5), with a first complementary direction index $Index_{C0}$ (e.g., 55), a left (e.g., lower) boundary index $Index_L$ (e.g., 2), a right (e.g., upper) boundary index $Index_R$ (e.g., 8), a width value (e.g., 6), and an energy value $Energy_{P0}$ (e.g., 7) associated with the first primary direction index $Index_{P0}$. In addition, the first row may include a second primary direction index $Index_{P1}$ (e.g., 15), an energy value $Energy_{P1}$ (e.g., 7) associated with the second primary direction index $Index_{P1}$, a second complementary direction index $Index_{C1}$ (e.g., 5), and an energy value $Energy_{C1}$ (e.g., 2) associated with the second complementary direction index $Index_{C1}$.

Similarly, the second direction (e.g., 330°) corresponds to a second row for the first primary direction index $Index_{P0}$ (e.g., 55), with a first complementary direction index $Index_{C0}$ (e.g., 5), a left (e.g., lower) boundary index $Index_L$ (e.g., 52), a right (e.g., upper) boundary index $Index_R$ (e.g., 58), a width value (e.g., 6), and an energy value $Energy_{P0}$ (e.g., 7) associated with the first primary direction index $Index_{P0}$. In addition, the second row may include a second primary direction index $Index_{P1}$ (e.g., 5), an energy value $Energy_{C1}$ (e.g., 2) associated with the second primary direction index $Index_{P1}$, a second complementary direction index $Index_{C1}$ (e.g., 15), and an energy value $Energy_{C1}$ (e.g., 7) associated with the second complementary direction index $Index_{C1}$.

Using the raw peak data described above, the device 110 may perform peak validation and determine whether the individual peaks are valid. For example, the device 110 may compare the energy value $Energy_{C1}$ (e.g., 7) associated with the second primary direction index $Index_{P1}$ to the energy value $Energy_{C1}$ (e.g., 2) associated with the second complementary direction index $Index_{C1}$ in the first row and determine that the first primary direction index $Index_{P0}$ (e.g., 5) is valid (e.g., $Energy_{C1} > Energy_{C1}$). Similarly, the device 110 may compare the energy value $Energy_{C1}$ (e.g., 2) associated with the second primary direction index $Index_{P1}$ to the energy value $Energy_{C1}$ (e.g., 7) associated with the second complementary direction index $Index_{C1}$ in the second row and determine that the first primary direction index $Index_{P0}$ (e.g., 55) is not valid (e.g., $Energy_{C1} < Energy_{C1}$). Thus, the actual peak corresponds to the first direction (e.g., 30°) and not the second direction (e.g., 330°), which is represented in the virtual directional data 2040 by validated peak 2045.

After performing peak validation for the first microphone pair 1730, the device 110 may perform the same peak validation steps for the second microphone pair 1740. As illustrated in FIG. 20B, the device 110 may identify Array1 peak indexes 2050 using the second microphone pair 1740 and Array0 peak indexes 2060 using the first microphone pair 1730. The device 110 may generate an Array1 peak validation table 2070 corresponding to the Array1 peak indexes 2050. For example, the second microphone pair 1740 cannot distinguish between a third direction (e.g., 90°) and a fourth direction (e.g., 270°), so the device 110 may detect a peak in the third direction and include a primary direction index entry in the Array1 peak validation table 2070 for both the third direction and the fourth direction.

As represented in the Array1 peak validation table 2070, the third direction (e.g., 90°) corresponds to a first row for the first primary direction index $Index_{P0}$ (e.g., 15), with a first complementary direction index $Index_{C0}$ (e.g., 45), a left (e.g., lower) boundary index $Index_L$ (e.g., 12), a right (e.g., upper) boundary index $Index_R$ (e.g., 18), a width value (e.g., 6), and an energy value $Energy_{P0}$ (e.g., 7) associated with the first primary direction index $Index_{P0}$. In addition, the first row may include a second primary direction index $Index_{P1}$ (e.g., 5), an energy value $Energy_{C1}$ (e.g., 7) associated with the second primary direction index $Index_{P1}$, a second complementary direction index $Index_{C1}$ (e.g., 35), and an energy value $Energy_{C1}$ (e.g., 2) associated with the second complementary direction index $Index_{C1}$.

Similarly, the fourth direction (e.g., 270°) corresponds to a second row for the first primary direction index $Index_{P0}$ (e.g., 45), with a first complementary direction index $Index_{C0}$ (e.g., 15), a left (e.g., lower) boundary index $Index_L$ (e.g., 42), a right (e.g., upper) boundary index $Index_R$ (e.g., 48), a width value (e.g., 6), and an energy value $Energy_{P0}$ (e.g., 7) associated with the first primary direction index $Index_{P0}$. In addition, the second row may include a second primary direction index $Index_{P1}$ (e.g., 35), an energy value $Energy_{C1}$ (e.g., 2) associated with the second primary direction index $Index_{P1}$, a second complementary direction index $Index_{C1}$ (e.g., 5), and an energy value $Energy_{C1}$ (e.g., 7) associated with the second complementary direction index $Index_{C1}$.

Using the raw peak data described above, the device 110 may perform peak validation and determine whether the individual peaks are valid. For example, the device 110 may compare the energy value $Energy_{C1}$ (e.g., 7) associated with the second primary direction index $Index_{P1}$ to the energy value $Energy_{C1}$ (e.g., 2) associated with the second complementary direction index $Index_{C1}$ in the first row and determine that the first primary direction index $Index_{P0}$ (e.g., 15) is valid (e.g., $Energy_{P1} > Energy_{C1}$). Similarly, the device 110 may compare the energy value $Energy_{P1}$ (e.g., 2) associated with the second primary direction index $Index_{C1}$ to the energy value $Energy_{C1}$ (e.g., 7) associated with the second complementary direction index $Index_{C1}$ in the second row and determine that the first primary direction index $Index_{P0}$ (e.g., 45) is not valid (e.g., $Energy_{P1} < Energy_{C1}$). Thus, the actual peak corresponds to the third direction (e.g., 90° for the second microphone pair 1740, which corresponds to 30° in the virtual directional data) and not the second direction (e.g., 270°), which is represented in virtual directional data 2080 by validated peak 2085.

The above examples are provided to conceptually illustrate several examples, but the disclosure is not limited thereto. For example, the widths may vary between the primary direction index and the complementary direction index, the peaks may be asymmetrical, the amount of energy may vary between the primary direction index and the complementary direction index, the amount of energy may vary between the first primary direction index and the second primary direction index, and/or the like without departing from the disclosure.

Additionally or alternatively, while FIGS. 20A-20B illustrate examples of entering two rows for each peak detected in the raw peak data and validating a single peak, the disclosure is not limited thereto. In some examples, the device 110 may perform additional processing to determine whether a peak in the raw peak data corresponds to the primary angle or the complementary angle without departing from the disclosure. For example, the device 110 may use the third microphone Mic2 as a reference to determine whether a peak is in the primary direction indexes (e.g., 0-180°) or in the complementary direction indexes (e.g., 180-360°).

After generating the validated peak data, the device 110 may process the validated peak data to generate array assignment data and energy validated data. For example, a first peak in the Array0 peak validation table 2030 may overlap a second peak in the Array1 peak validation table 2070 and the device 110 may determine whether to use the first microphone pair 1730 (e.g., Array0) or the second microphone pair 1740 (e.g., Array1) to process the audio source.

In some examples, multiple audio sources may overlap and have a similar direction of arrival for one microphone pair but not the other. For example, the first microphone pair 1730 may detect a combined peak that corresponds to a first audio source in a first direction (e.g., 30°) and a second audio source in a second direction (e.g., 330°), whereas the second microphone pair 1740 may detect an isolated peak that only corresponds to the first audio source in the first direction. To isolate the audio sources, the device 110 may associate or assign a peak to the microphone pair having a weaker peak (e.g., energy value associated with the peak). For example, the device 110 may assign the first audio source (e.g., peak associated with the first direction) to the second microphone pair 1740 as the second microphone pair 1740 is capable of isolating the first audio source from the second audio source, resulting in a lower energy value associated with the first audio source. Thus, the array assignment data may indicate that the first direction is assigned to the second microphone pair 1740.

FIG. 21 illustrates an example of an array assignment chart and an energy validation chart according to examples of the present disclosure. As illustrated in FIG. 21, an array assignment chart 2110 illustrates an example in which two audio sources are associated with a first microphone pair but not the other microphone pair. For example, the array assignment chart 2110 represents first time-frequency units assigned to a first microphone pair using a first color (e.g., gray), second time-frequency units assigned to a second microphone pair using a second color (e.g., black), and third time-frequency units that are not assigned to either microphone pair (e.g., no array) using a third color (e.g., white). Thus, the first audio source is located between direction index 0 and direction index 20 and is associated with the first microphone pair, while the second audio source is located between direction index 40 and direction index 60 and is also associated with the first microphone pair. While the array assignment chart 2110 only includes small segments associated with the second microphone pair, in some examples the array assignment chart may be split between the two and/or favor the second microphone pair without departing from the disclosure.

In addition to generating the array assignment data, the device 110 may determine energy validated data. For example, the device 110 may detect an isolated peak (e.g., peak that is only included in the Array0 peak validation table 2040 or the Array1 peak validation table 2070) and may store the validated peak data corresponding to the isolated peak in the energy validated data. Thus, if one microphone pair detects the peak and the other microphone pair does not, the energy validated data is updated to reflect the information associated with the microphone pair that detected the peak.

When two peaks overlap, the device 110 may process information from both the first microphone pair 1730 and the second microphone pair 1740 and generate the energy validated data using a combination of the two. For example, the device 110 may select the peak having a larger width to determine the lower boundary and the upper boundary, but may select the peak having a lower energy to determine the energy value stored in the energy validated data. To illustrate an example, if a first peak associated with the first microphone pair 1730 has a first width and first energy and a second peak associated with the second microphone pair 1740 has a second width lower than the first width and a second energy lower than the first energy, the device 110 may select the first width and the second energy to represent the combined peaks in the energy validated data. An example of energy validated data is illustrated in FIG. 21 as energy validated chart 2120.

Figure 22:
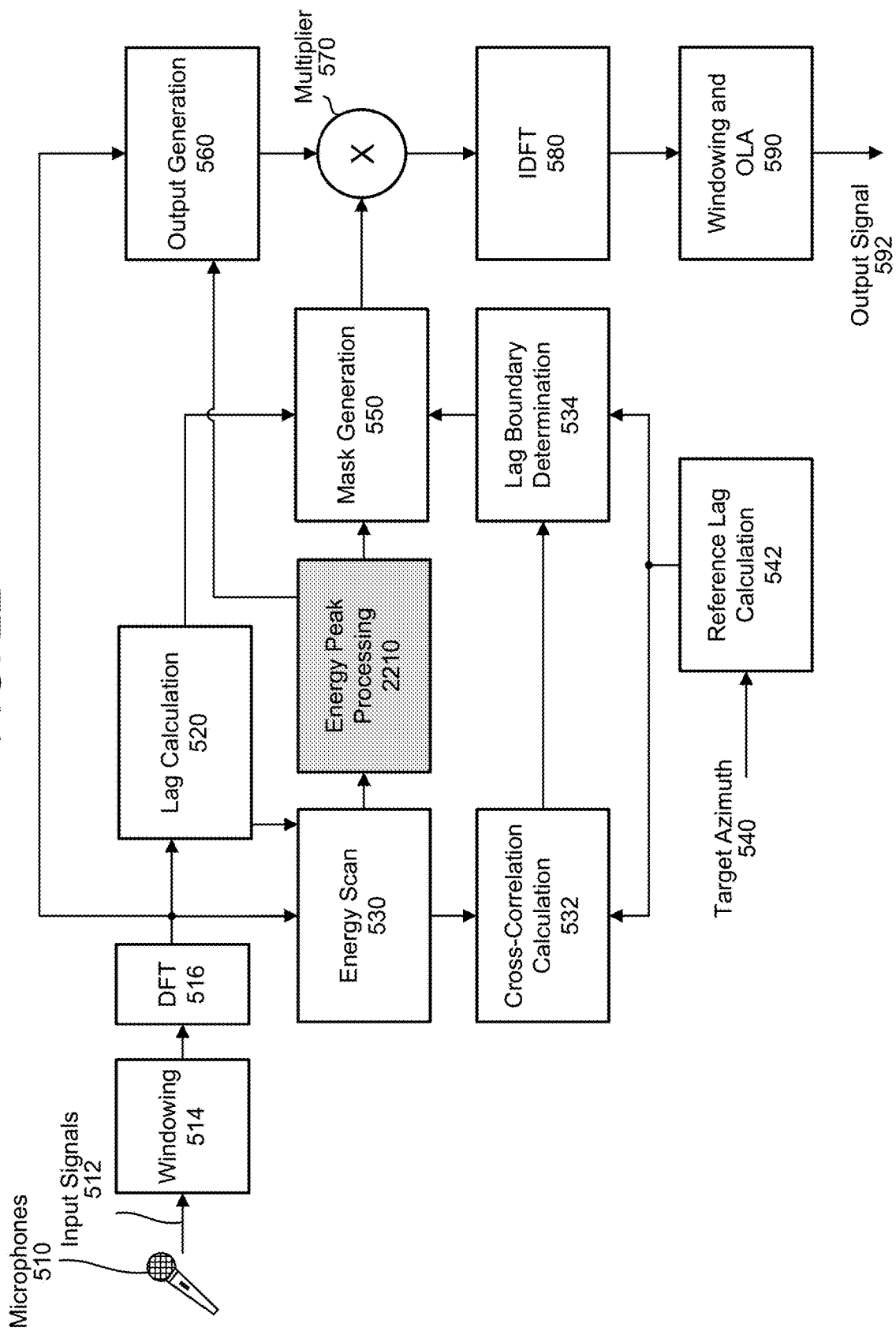
FIG. 22 illustrates an example component diagram for performing directional speech separation using three microphones according to examples of the present disclosure.

FIG. 22 illustrates an example component diagram for performing directional speech separation using three microphones according to examples of the present disclosure. Thus, FIG. 22 updates the example component diagram for performing directional speech separation using two microphones, described above with regard to FIG. 5, to perform directional speech separation using three microphones. As the components illustrated in FIG. 22 are described in greater detail above with regard to FIG. 5, a duplicate description is omitted.

As illustrated in FIG. 22, two or more microphones 510 may generate input signals 512 and the device 110 may process the input signals 512 using windowing component(s) 514 and Discrete Fourier Transforms (DFT) component(s) 516 on the individual input signals 512 to generate input audio data in the frequency domain. While FIG. 22 illustrates the windowing component 514 and the DFT component 516 as a single block (e.g., a single component performs all of the processing on the input signals 512), the disclosure is not limited thereto and each microphone 510 may correspond to a separate windowing component 514 and separate DFT component 516 without departing from the disclosure. The input audio data may be processed by the lag calculation component 520 and/or the energy scan component 530 to generate raw peak data. The raw peak data may be output by the energy scan component 530 to an energy peak processing component 2210, which processes the raw peak data and generates output data (e.g., validated peak data, array assignment data, and/or energy validated data). The energy peak processing component 2210 may generate the output data using the flowcharts described below and may send the output data to the mask generation component 550 and/or the output generation component 560.

Figure 23:
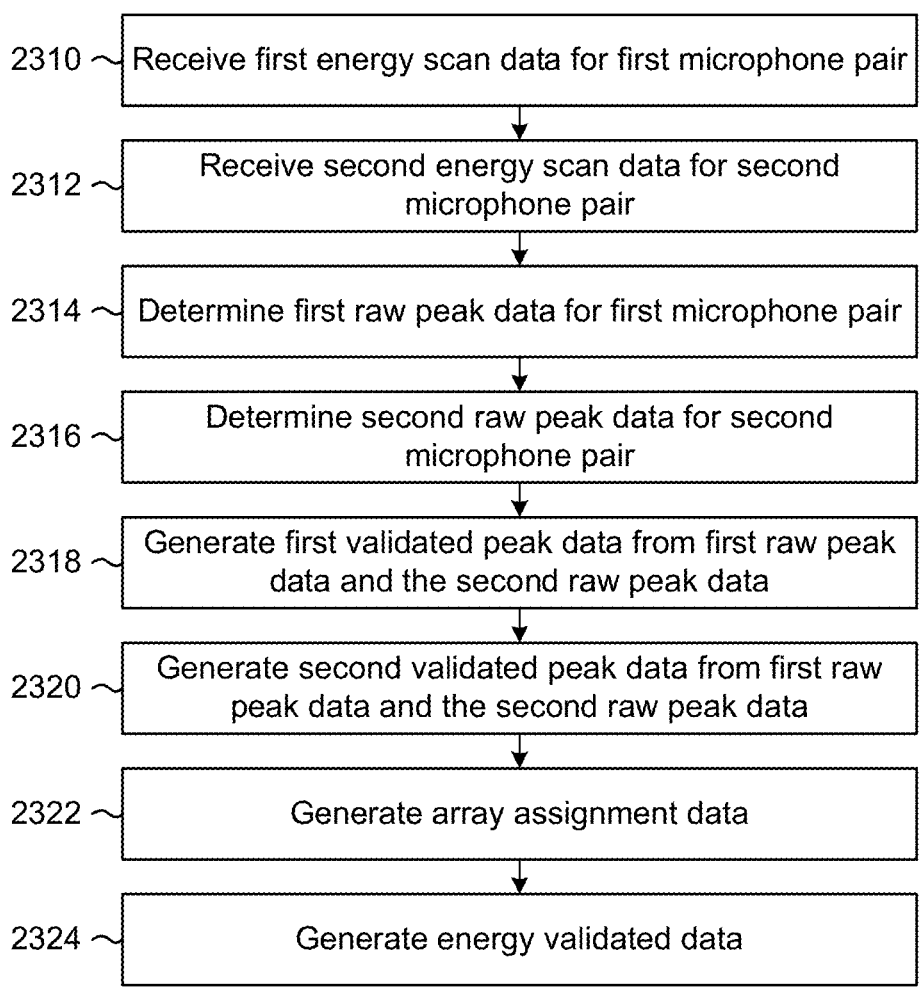
FIG. 23 is a flowchart conceptually illustrating a method for performing directional speech separation using three microphones according to examples of the present disclosure.

FIG. 23 is a flowchart conceptually illustrating a method for performing directional speech separation using three microphones according to examples of the present disclosure. As illustrated in FIG. 23, the device 110 may receive (2310) first energy scan data associated with a first microphone pair (e.g., Mic0 and Mic1i, may receive (2312) second energy scan data associated with a second microphone pair (e.g., Mic1 and Mic2), may determine (2314) first raw peak data associated with the first microphone pair (e.g., Array0), and may determine (2316) second raw peak data associated with the second microphone pair (e.g., Array1). In some examples, these steps may be performed by the energy scan component 530, although the disclosure is not limited thereto.

The device 110 may generate (2320) first validated peak data from the first raw peak data and the second raw peak data and may generate (2322) second validated peak data from the first raw peak data and the second raw peak data. For example, as described in greater detail above with regard to FIGS. 20A-20B, the device 110 may cross-reference the primary angles and the complementary angles associated with peaks represented in the first raw peak data and the second raw peak data and confirm a direction of an audio source (e.g., validate that the peak corresponds to the direction associated with the audio source).

Using the first validated peak data and the second validated peak data, the device 110 may generate (2322) array assignment data and may generate (2324) energy validated data. For example, the device 110 may generate the array assignment chart 2110 and the energy validated chart 2120 illustrated in FIG. 21 using techniques described below with regard to FIG. 25.

Figure 24A:
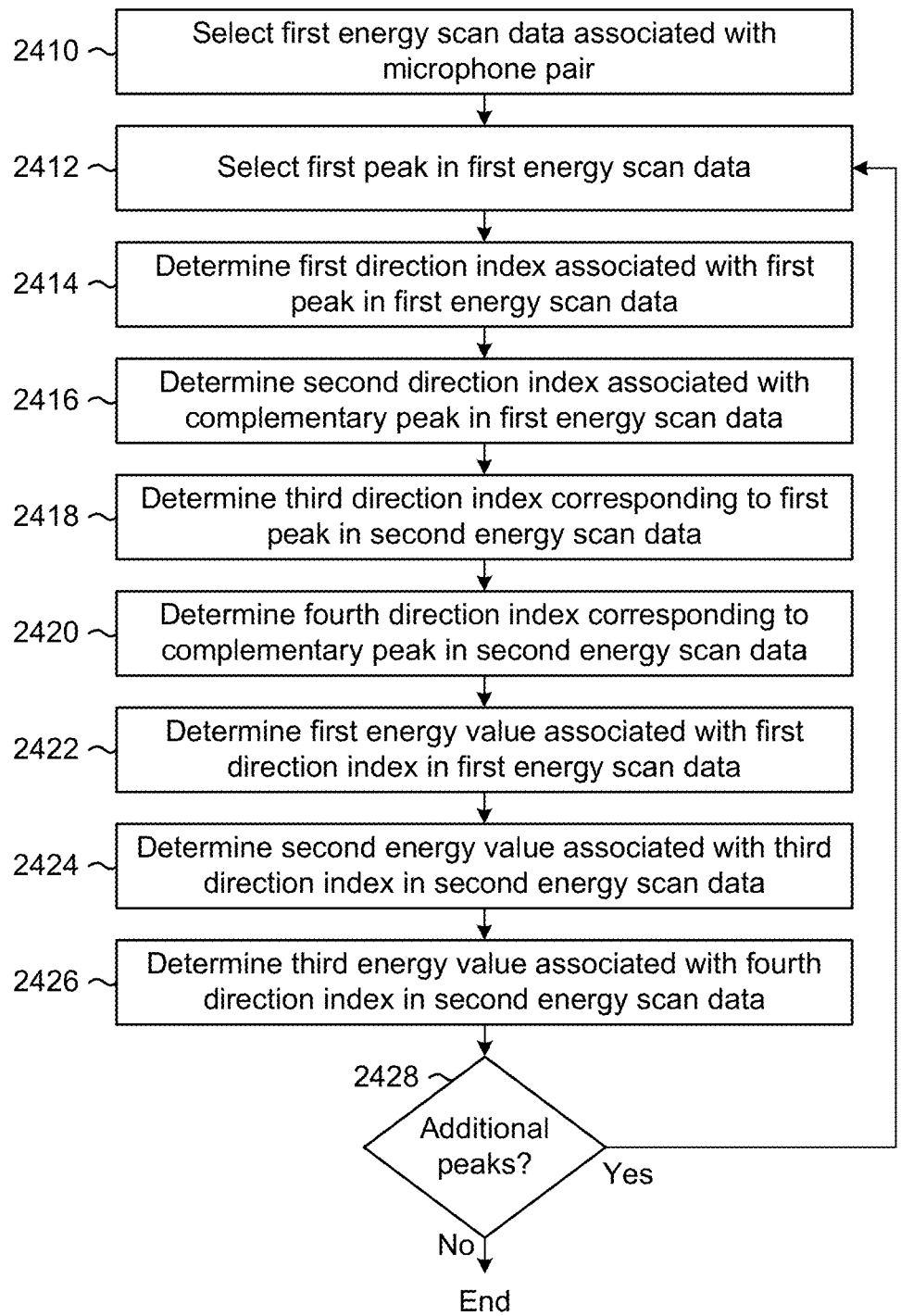
FIGS. 24A-24B are flowcharts conceptually illustrating methods for generating raw peak data and validated peak data according to examples of the present disclosure.
Figure 24B:
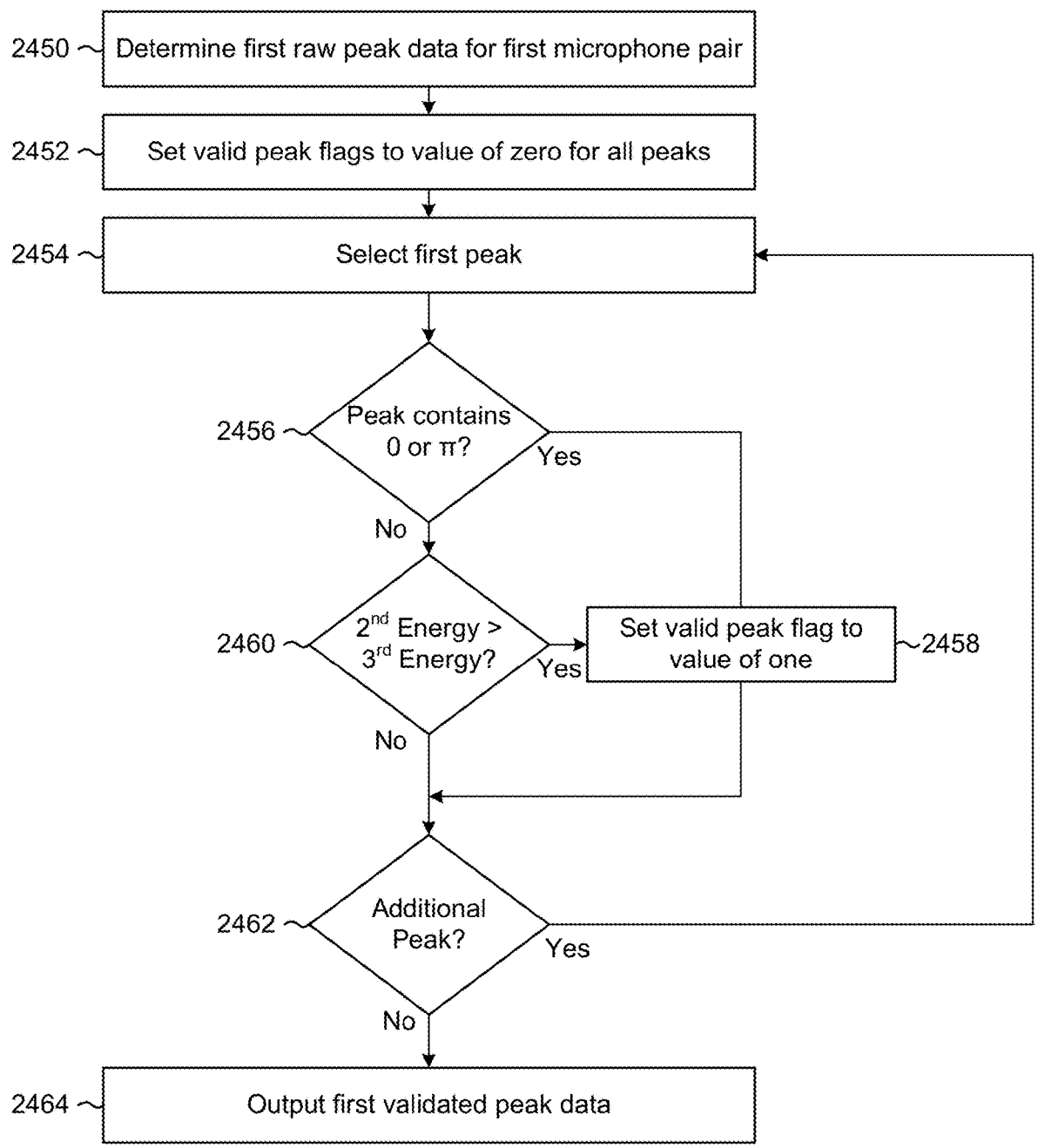

FIGS. 24A-24B are flowcharts conceptually illustrating methods for generating raw peak data and validated peak data according to examples of the present disclosure. As illustrated in FIG. 24A, the device 110 may select (2410) first energy scan data associated with a microphone pair and may select (2412) a first peak represented in the first energy scan data. The device 110 may determine (2414) a first direction index associated with the first peak in the first energy scan data (e.g., primary peak), may determine (2416) a second direction index associated with a complementary peak in the first energy scan data, may determine (2418) a third direction index corresponding to the first peak in second energy scan data associated with the other microphone pair, and may determine (2420) a fourth direction index corresponding to a complementary peak in the second energy scan data. Thus, the device 110 may determine the direction indexes in both the first energy scan data and the second energy scan data that correspond to the two potential directions associated with the first peak.

The device 110 may determine (2422) first energy value associated with the first direction index in the first energy scan data, may determine (2424) a second energy value associated with the third direction index in the second energy scan data, and may determine (2426) a third energy value associated with the fourth direction index in the second energy scan data. Thus, the device 110 may acquire information from the first energy scan data and the second energy scan data necessary to perform peak validation. Finally, the device 110 may determine (2428) whether there are additional peaks in the first energy scan data and, if so, may loop to step 2412 to repeat steps 2412-2426 for the additional peaks. While not illustrated in FIG. 24A, the device 110 may perform steps 2410-2428 for both the first microphone pair and the second microphone pair.

As illustrated in FIG. 24B, the device 110 may determine (2450) first raw peak data for the first microphone pair and may set (2452) valid peak flags to a value of zero for all peaks. The device 110 may select (2454) a first peak in the first raw peak data and may determine (2456) whether the peak is unambiguous (e.g., peak contains 0 or 7c), meaning that the peak only corresponds to a single direction. If the peak is unambiguous, the device 110 may set (2458) the valid peak flag to a value of one. If the peak is not unambiguous (e.g., peak does not contain 0 or 7c), the device 110 may determine (2460) whether the second energy value corresponding to the third direction index (e.g., primary peak in the second validated peak data) is greater than the third energy value corresponding to the fourth direction index (e.g., complementary peak in the second validated peak data). If the second energy value is greater than the third energy value (e.g., $2^{nd}$ Energy>$3^{rd}$ Energy), the device 110 may set (2458) the valid peak flag to a value of one. If the second energy value is not greater than the third energy value, this indicates that the peak does not correspond to the direction of the audio source and the device 110 leaves the valid peak flag set to the value of zero.

The device 110 may then determine whether (2462) there is an additional peak represented in the first raw peak data and, if so, may loop to step 2454 to select the additional peak. If not, the device 110 may output (2464) the first validated peak data associated with the first microphone pair. The device 110 may then repeat steps 2450-2464 for the second microphone pair, although the disclosure is not limited thereto.

Figure 25:
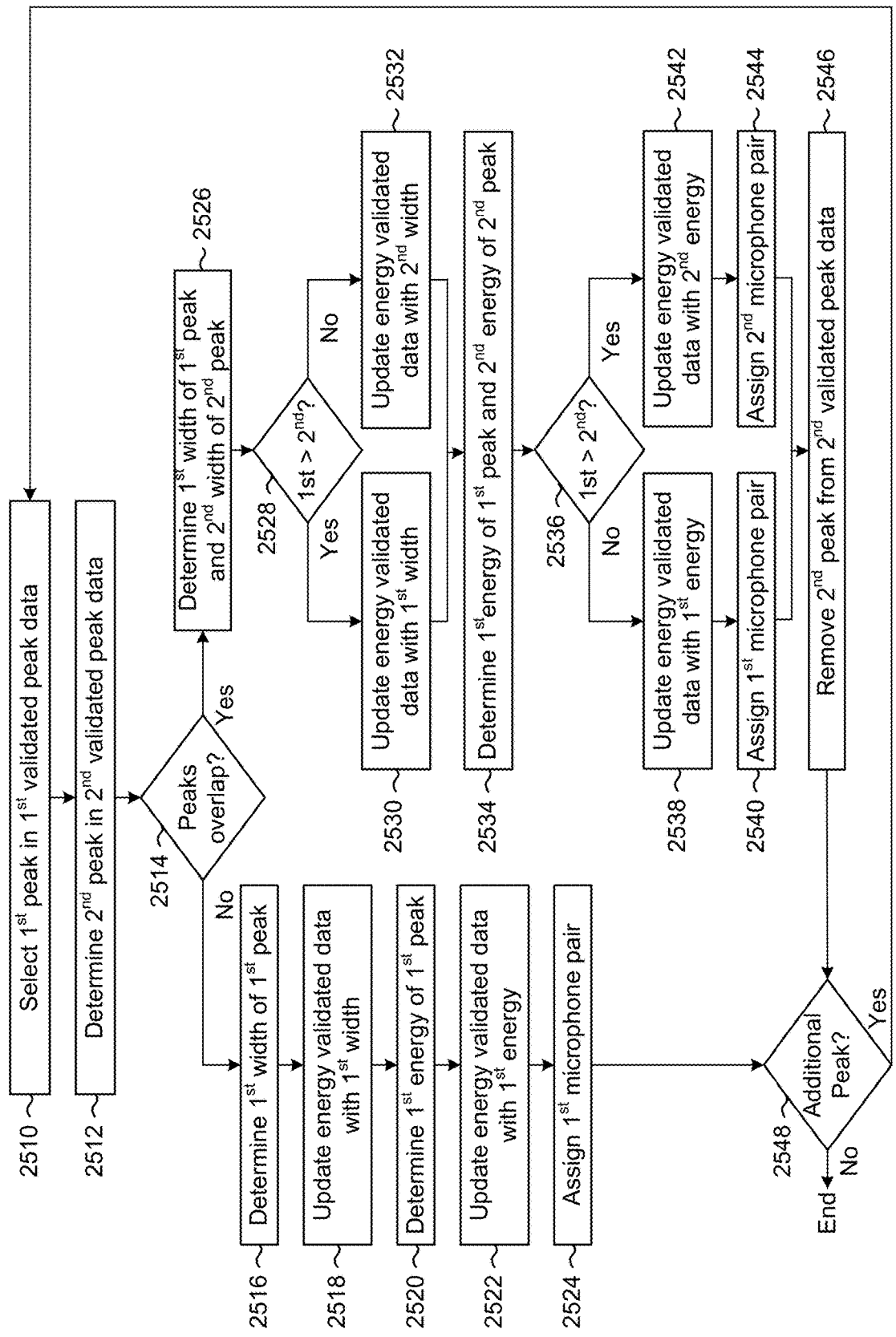
FIG. 25 is a flowchart conceptually illustrating a method for performing directional speech separation using three microphones according to examples of the present disclosure.

FIG. 25 is a flowchart conceptually illustrating a method for performing directional speech separation using three microphones according to examples of the present disclosure. As illustrated in FIG. 25, the device 110 may select (2510) a first peak in the first validated peak data, determine (2512) if there is a second peak in the second validated peak data that corresponds to the first peak, and determine (2514) whether the first peak and the second peak overlap. For example, the device 110 may determine that there is not a second peak in the second validated peak data that corresponds to the first peak, in which case the device 110 determines that the peaks do not overlap and proceeds to step 2516. Alternatively, the device 110 may determine that there is a second peak that corresponds to the first peak, in which case the device 110 determines that the peaks overlap and proceeds to step 2526.

When the first peak does not overlap any peaks in the second validated peak data, the device 110 may update the energy validated data and the array assignment data using the information associated with the first peak in the first validated peak data. For example, the device 110 may determine (2516) a first width of the first peak, may update (2518) energy validated data with the first width, may determine (2520) a first energy value associated with the first peak, may update (2522) the energy validated data with the first energy value, and may assign (2524) the first microphone pair to the first peak (e.g., associate the first microphone pair with the direction indexes corresponding to the first peak).

When the first peak does overlap the second peak in the second validated peak data, the device 110 may update the energy validated data and the array assignment data using information associated with a combination of the first peak and the second peak. As illustrated in FIG. 25, the device 110 may determine (2526) a first width of the first peak and a second width of the second peak and may update the validated peak data using the larger width. For example, the device 110 may determine (2528) whether the first width is greater than the second width and, if so, may update (2530) the energy validated data with the first width. If the first width is smaller than the second width, however, the device 110 may update (2532) the energy validated data with the second width instead.

The device 110 may then determine (2534) a first energy value of the first peak and a second energy value of the second peak and may determine (2536) whether the first energy value is greater than the second energy value. If the first energy value is not greater than the second energy value (e.g., $1^{st}$ Energy<$2^{nd}$ Energy), the device 110 may update (2538) the energy validated data with the first energy value and assign (2540) the first microphone pair to the first peak (e.g., associate the first microphone pair with the direction indexes corresponding to the first peak). If the first energy value is greater than the second energy value (e.g., $1^{st}$ Energy>$2^{nd}$ Energy), the device 110 may update (2542) the energy validated data with the second energy value and assign (2540) the second microphone pair to the first peak (e.g., associate the second microphone pair with the direction indexes corresponding to the first peak).

The device 110 may then remove the second peak from the second validated peak data (e.g., to avoid reprocessing the same direction indexes) and determine (2548) whether there is an additional peak in the first validated peak data. If there is an additional peak, the device 110 may loop to step 2510 and repeat steps 2510-2546 for the additional peak. If there is not an additional peak, the process may end.

While not illustrated in FIG. 25, the device 110 may perform steps 2510-2548 for peaks represented in the second validated peak data without departing from the disclosure. For example, if the device 110 processes the first validated peak data first, then the only peaks remaining in the second validated peak data are isolated peaks that do not overlap the already processed peaks in the first validated peak data. Therefore, the device 110 may perform steps 2516-2524 for each of the isolated peaks, updating the energy validated data and the array assignment data with the information from the second validated peak data. However, the disclosure is not limited thereto, and the device 110 may process the second validated peak data at a different point in time and some peaks may overlap without departing from the disclosure.

Figure 26:
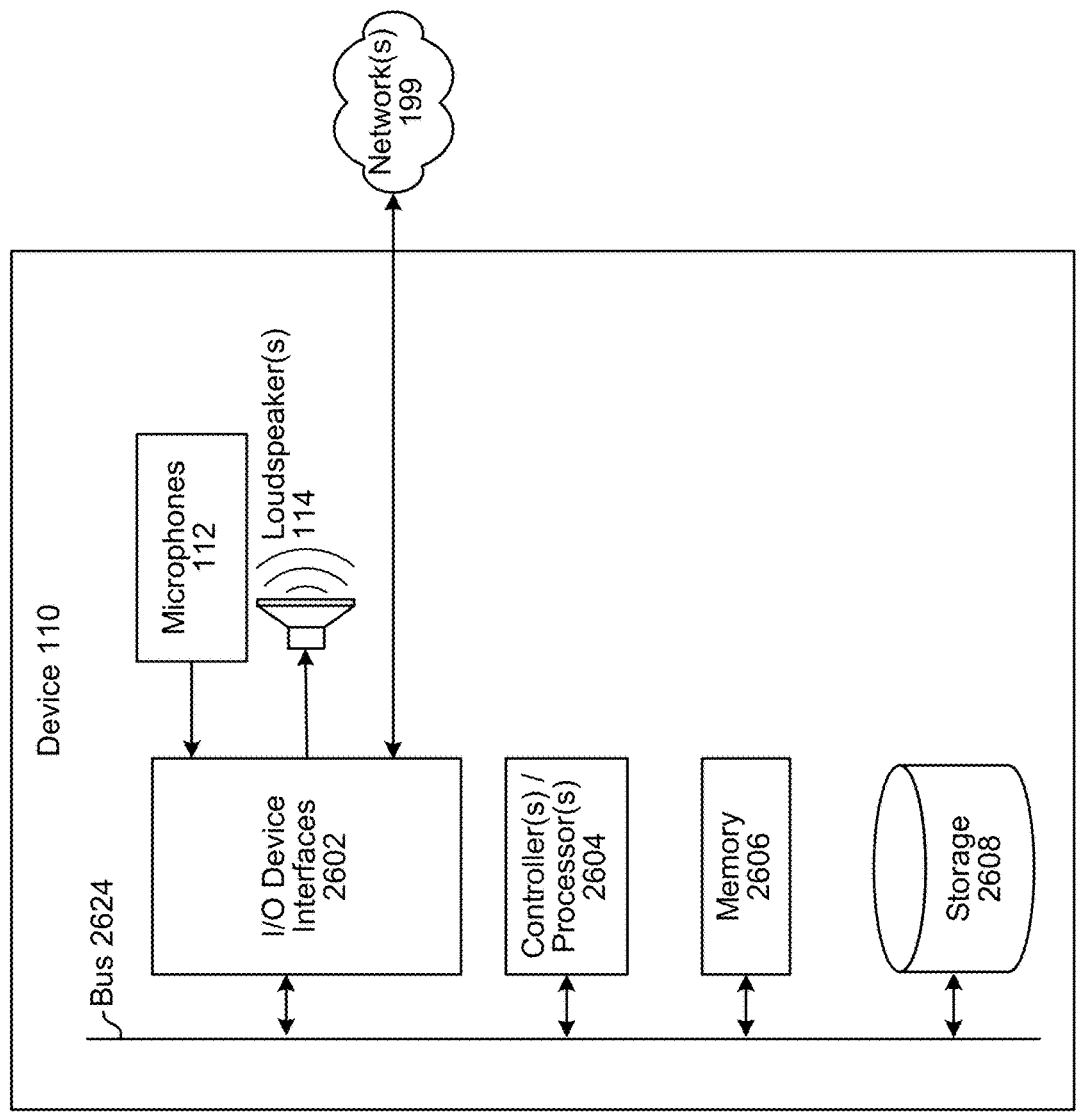
FIG. 26 is a block diagram conceptually illustrating example components of a system according to embodiments of the present disclosure.

FIG. 26 is a block diagram conceptually illustrating example components of a system for directional speech separation according to embodiments of the present disclosure. In operation, the system 100 may include computer-readable and computer-executable instructions that reside on the device 110, as will be discussed further below.

As illustrated in FIG. 26, the device 110 may include an address/data bus 2624 for conveying data among components of the device 110. Each component within the device 110 may also be directly connected to other components in addition to (or instead of) being connected to other components across the bus 2624.

The device 110 may include one or more controllers/processors 2604, which may each include a central processing unit (CPU) for processing data and computer-readable instructions, and a memory 2606 for storing data and instructions. The memory 2606 may include volatile random access memory (RAM), non-volatile read only memory (ROM), non-volatile magnetoresistive (MRAM) and/or other types of memory. The device 110 may also include a data storage component 2608, for storing data and controller/processor-executable instructions (e.g., instructions to perform the algorithm illustrated in FIGS. 1, 11, 12, 13, 14, 15, 16, 23, 24A-24B, and/or 25). The data storage component 2608 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 2602.

The device 110 includes input/output device interfaces 2602. A variety of components may be connected through the input/output device interfaces 2602. For example, the device 110 may include one or more microphone(s) 112 and/or one or more loudspeaker(s) 114 that connect through the input/output device interfaces 2602, although the disclosure is not limited thereto. Instead, the number of microphone(s) 112 and/or loudspeaker(s) 114 may vary without departing from the disclosure. In some examples, the microphone(s) 112 and/or loudspeaker(s) 114 may be external to the device 110.

The input/output device interfaces 2602 may be configured to operate with network(s) 199, for example a wireless local area network (WLAN) (such as WiFi), Bluetooth, ZigBee and/or wireless networks, such as a Long Term Evolution (LTE) network, WiMAX network, 3G network, etc. The network(s) 199 may include a local or private network or may include a wide network such as the internet. Devices may be connected to the network(s) 199 through either wired or wireless connections.

The input/output device interfaces 2602 may also include an interface for an external peripheral device connection such as universal serial bus (USB), FireWire, Thunderbolt, Ethernet port or other connection protocol that may connect to network(s) 199. The input/output device interfaces 2602 may also include a connection to an antenna (not shown) to connect one or more network(s) 199 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 110 may include components that may comprise processor-executable instructions stored in storage 2608 to be executed by controller(s)/processor(s) 2604 (e.g., software, firmware, hardware, or some combination thereof). For example, components of the device 110 may be part of a software application running in the foreground and/or background on the device 110. Some or all of the controllers/components of the device 110 may be executable instructions that may be embedded in hardware or firmware in addition to, or instead of, software. In one embodiment, the device 110 may operate using an Android operating system (such as Android 4.3 Jelly Bean, Android 4.4 KitKat or the like), an Amazon operating system (such as FireOS or the like), or any other suitable operating system.

Executable computer instructions for operating the device 110 and its various components may be executed by the controller(s)/processor(s) 2604, using the memory 2606 as temporary "working" storage at runtime. The executable instructions may be stored in a non-transitory manner in non-volatile memory 2606, storage 2608, or an external device. Alternatively, some or all of the executable instructions may be embedded in hardware or firmware in addition to or instead of software.

The components of the device 110, as illustrated in FIG. 26, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the components, components and/or processes described above may be combined or rearranged without departing from the scope of the present disclosure. The functionality of any component described above may be allocated among multiple components, or combined with a different component. As discussed above, any or all of the components may be embodied in one or more general-purpose microprocessors, or in one or more special-purpose digital signal processors or other dedicated microprocessing hardware. One or more components may also be embodied in software implemented by a processing unit. Further, one or more of the components may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:

detecting, by a first microphone of a microphone array, first audio within a first audible frequency range;

detecting, by a second microphone of the microphone array, second audio within the first audible frequency range;

determining first audio data using the first microphone, a portion of the first audio data representing the first audio;

determining second audio data using the second microphone, a first portion of the second audio data representing the second audio;

determining, using a third microphone of the microphone array, third audio data, a first portion of the third audio data representing third audio within the first audible frequency range;

determining a first lag estimate value indicating a first phase difference between the portion of the first audio data and the first portion of the second audio data;

determining that the first lag estimate value is within a first range of values, the first range of values corresponding to one of a first direction or a second direction of a plurality of directions;

determining a first amount of energy of the portion of the first audio data;

determining that the first amount of energy exceeds a threshold value, indicating that the portion of the first audio data corresponds to an audio source;

determining, using the second audio data and the third audio data, a second portion of the second audio data that corresponds to the first direction;

determining a second amount of energy of the second portion of the second audio data;

determining, using the second audio data and the third audio data, a third portion of the second audio data that corresponds to the second direction;

determining a third amount of energy of the second portion of the second audio data;

determining that the second amount of energy exceeds the third amount of energy;

determining, in response to the second amount of energy exceeding the third amount of energy, that the audio source corresponds to the first direction;

determining that the second amount of energy exceeds the first amount of energy;

in response to the second amount of energy exceeding the first amount of energy, associating the audio source with a first microphone pair comprising the first microphone and the second microphone; and generating association data indicating that two or more of the plurality of directions are associated with the audio source and the first microphone pair, the two or more of the plurality of directions including the first direction.

2. The computer-implemented method of claim 1, further comprising:

using the first audio data and the second audio data to determine a first series of energy values associated with the first direction;

using the first audio data and the second audio data to determine a second series of energy values associated with a third direction of the plurality of directions;

determining, using the first series of energy values, a first portion of cross-correlation data, the cross-correlation data indicating a correlation between each direction of the plurality of directions and the first direction;

performing a second cross-correlation between the first series of energy values and the second series of energy values to determine a second portion of the cross-correlation data; and using the cross-correlation data to determine a lower boundary value and an upper boundary value corresponding to the audio source.

3. The computer-implemented method of claim 1, further comprising:

using the association data to determine that the first direction is associated with the first microphone pair;

using the first audio data and the second audio data to generate cross-correlation data indicating a correlation between each direction of the plurality of directions and the first direction;

using the cross-correlation data to generate mask data corresponding to the audio source, wherein the mask data indicates a plurality of frequencies that are associated with the audio source;

generating fourth audio data by calculating a mean of the first audio data and the second audio data; and generating output audio data by multiplying the mask data and the fourth audio data, the output audio data including a representation of first speech generated by the audio source.

4. A computer-implemented method, comprising:

receiving first audio data associated with a first microphone;

receiving second audio data associated with a second microphone;

receiving third audio data associated with a third microphone;

determining, based at least in part on a phase difference between a portion of the first audio data and a portion of the second audio data, that a first energy value associated with an audio source corresponds to one of a first direction or a second direction of a plurality of directions;

using the second audio data and the third audio data to determine a second energy value corresponding to the first direction;

using the second audio data and the third audio data to determine a third energy value corresponding to the second direction;

using the second energy value and the third energy value to determine that the audio source corresponds to the first direction;

determining that the first energy value is less than the second energy value; and associating the audio source with the first direction and a first microphone pair comprising the first microphone and the second microphone.

5. The computer-implemented method of claim 4, further comprising:

using the first microphone pair to generate mask data corresponding to the audio source, wherein the mask data indicates a plurality of frequencies that are associated with the audio source;

using at least the first audio data to generate fourth audio data; and generating output audio data by applying the mask data to the fourth audio data, the output audio data including a representation of first speech associated with the audio source.

6. The computer-implemented method of claim 4, further comprising:

using the first audio data and the second audio data to determine a first series of energy values associated with the first direction;

using the first audio data and the second audio data to determine a second series of energy values associated with a third direction of the plurality of directions;

determining, using the first series of energy values, a first portion of first cross-correlation data, the first cross-correlation data indicating a correlation between each direction of the plurality of directions and the first direction;

performing a second cross-correlation between the first series of energy values and the second series of energy values to determine a second portion of the first cross-correlation data; and using the first cross-correlation data to determine a first lower boundary value and a first upper boundary value corresponding to the audio source at a first time.

7. The computer-implemented method of claim 6, further comprising:

using the first audio data and the second audio data to determine a third series of energy values associated with the first direction;

using the first audio data and the second audio data to determine a fourth series of energy values associated with the third direction;

determining that the audio source corresponds to the third direction;

performing a third cross-correlation between the fourth series of energy values and the third series of energy values to determine a first portion of second cross-correlation data, the second cross-correlation data indicating a correlation between each direction of the plurality of directions and the third direction;

performing a fourth cross-correlation between the fourth series of energy values and the fourth series of energy values to determine a second portion of the second cross-correlation data; and using the second cross-correlation data to determine a second lower boundary value and a second upper boundary value corresponding to the audio source at a second time.

8. The computer-implemented method of claim 4, further comprising:

using the first audio data and the second audio data to generate cross-correlation data indicating a correlation between each direction of the plurality of directions and the first direction;

using the cross-correlation data to generate mask data corresponding to the audio source, wherein the mask data indicates a plurality of frequencies that are associated with the audio source;

generating fourth audio data by calculating a mean of the first audio data and the second audio data; and generating output audio data by applying the mask data to the fourth audio data, the output audio data including a representation of first speech associated with the audio source.

9. The computer-implemented method of claim 4, further comprising:

determining a first angle corresponding to the first direction, the first angle relative to a first axis that is formed by the first microphone and the second microphone;

determining a second angle corresponding to the second direction, the second angle opposite the first angle relative to the first axis;

using the first angle to determine a third angle corresponding to the first direction, the third angle relative to a second axis that is formed by the second microphone and the third microphone; and using the second angle to determine a fourth angle corresponding to the second direction, the fourth angle relative to the second axis, wherein;

determining the first energy value further comprises determining the first energy value associated with a portion of the first audio data that corresponds to the first angle;

determining the second energy value further comprises determining the second energy value associated with a first portion of the second audio data that corresponds to the third angle;

determining the third energy value further comprises determining the third energy value associated with a second portion of the second audio data that corresponds to the fourth angle; and determining that the audio source corresponds to the first direction further comprises determining that the second energy value is greater than the third energy value.

10. The computer-implemented method of claim 4, wherein determining the first energy value further comprises:

determining a first lag estimate value associated with the first microphone pair, the first lag estimate value indicating the phase difference between the portion of the first audio data and the portion of the second audio data, the portion of the first audio data and the portion of the second audio data associated with a first frequency range;

determining lag estimate data including the first lag estimate value and a second lag estimate value corresponding to a second frequency range;

determining that the first lag estimate value corresponds to one of the first direction or the second direction; and determining, based on the first audio data and the lag estimate data, the first energy value.

11. The computer-implemented method of claim 4, further comprising:

using the first microphone pair to determine first energy data corresponding to the plurality of directions;

detecting a first peak in the first energy data, the first peak corresponding to the first direction;

determining a first width of the first peak;

using a second microphone pair to determine second energy data corresponding to the plurality of directions, the second microphone pair comprising the second microphone and the third microphone;

detecting a second peak in the second energy data, the second peak corresponding to the first direction;

determining a second width of the second peak;

determining that the second width is greater than the first width;

generating a first portion of energy peak data indicating the second width; and using the second width to generate mask data corresponding to the audio source, wherein the mask data indicates a plurality of frequency ranges that are associated with the audio source.

12. The computer-implemented method of claim 4, further comprising:

using the first audio data and the second audio data to determine a fourth energy value associated with a second audio source, the fourth energy value corresponding to one of a third direction or a fourth direction of the plurality of directions;

using the second audio data and the third audio data to determine a fifth energy value corresponding to the third direction;

using the second audio data and the third audio data to determine a sixth energy value corresponding to the fourth direction;

using the fifth energy value and the sixth energy value to determine that the second audio source corresponds to the fourth direction;

determining that the sixth energy value is less than the fourth energy value;

associating the second audio source with the fourth direction and a second microphone pair comprising the second microphone and the third microphone; and generating association data indicating that the first direction is associated with the audio source and the first microphone pair and that the fourth direction is associated with the second audio source and the second microphone pair.

13. A system comprising:

at least one processor; and memory including instructions operable to be executed by the at least one processor to cause the system to:

receive first audio data associated with a first microphone;

receive second audio data associated with a second microphone;

receive third audio data associated with a third microphone;

determine, based at least in part on a phase difference between a portion of the first audio data and a portion of the second audio data, that a first energy value associated with an audio source corresponds to one of a first direction or a second direction of a plurality of directions;

use the second audio data and the third audio data to determine a second energy value corresponding to the first direction;

use the second audio data and the third audio data to determine a third energy value corresponding to the second direction;

use the second energy value and the third energy value to determine that the audio source corresponds to the first direction;

determine that the first energy value is less than the second energy value; and associate the audio source with the first direction and a first microphone pair comprising the first microphone and the second microphone.

14. The system of claim 13, wherein the memory further comprises instructions that, when executed by the at least one processor, further cause the system to:

use the first microphone pair to generate mask data corresponding to the audio source, wherein the mask data indicates a plurality of frequencies that are associated with the audio source;

use at least the first audio data to generate fourth audio data; and generate output audio data by applying the mask data to the fourth audio data, the output audio data including a representation of first speech associated with the audio source.

15. The system of claim 13, wherein the memory further comprises instructions that, when executed by the at least one processor, further cause the system to:
use the first audio data and the second audio data to determine a first series of energy values associated with the first direction;
use the first audio data and the second audio data to determine a second series of energy values associated with a third direction of the plurality of directions;
determine, using the first series of energy values, a first portion of first cross-correlation data, the first cross-correlation data indicating a correlation between each direction of the plurality of directions and the first direction;
perform a second cross-correlation between the first series of energy values and the second series of energy values to determine a second portion of the first cross-correlation data; and
use the first cross-correlation data to determine a first lower boundary value and a first upper boundary value corresponding to the audio source at a first time.

16. The system of claim 15, wherein the memory further comprises instructions that, when executed by the at least one processor, further cause the system to:
use the first audio data and the second audio data to determine a third series of energy values associated with the first direction;
use the first audio data and the second audio data to determine a fourth series of energy values associated with the third direction;
determine that the audio source corresponds to the third direction;
perform a third cross-correlation between the fourth series of energy values and the third series of energy values to determine a first portion of second cross-correlation data, the second cross-correlation data indicating a correlation between each direction of the plurality of directions and the third direction;
perform a fourth cross-correlation between the fourth series of energy values and the fourth series of energy values to determine a second portion of the second cross-correlation data; and
use the second cross-correlation data to determine a second lower boundary value and a second upper boundary value corresponding to the audio source.

17. The system of claim 13, wherein the memory further comprises instructions that, when executed by the at least one processor, further cause the system to:
use the first audio data and the second audio data to generate cross-correlation data indicating a correlation between each direction of the plurality of directions and the first direction;
use the cross-correlation data to generate mask data corresponding to the audio source, wherein the mask data indicates a plurality of frequencies that are associated with the audio source;
generate fourth audio data by calculating a mean of the first audio data and the second audio data; and
generate output audio data by applying the mask data to the fourth audio data, the output audio data including a representation of first speech associated with the audio source.

18. The system of claim 13, wherein the memory further comprises instructions that, when executed by the at least one processor, further cause the system to:
determine a first angle corresponding to the first direction, the first angle relative to a first axis that is formed by the first microphone and the second microphone;
determine a second angle corresponding to the second direction, the second angle opposite the first angle relative to the first axis;
use the first angle to determine a third angle corresponding to the first direction, the third angle relative to a second axis that is formed by the second microphone and the third microphone;
use the second angle to determine a fourth angle corresponding to the second direction, the fourth angle relative to the second axis;
determine the first energy value associated with a portion of the first audio data that corresponds to the first angle;
determine the second energy value associated with a first portion of the second audio data that corresponds to the third angle; and
determine the third energy value associated with a second portion of the second audio data that corresponds to the fourth angle; and
determine that the second energy value is greater than the third energy value.

19. The system of claim 13, wherein the memory further comprises instructions that, when executed by the at least one processor, further cause the system to:
determine a first lag estimate value associated with the first microphone pair, the first lag estimate value indicating the phase difference between the portion of the first audio data and the portion of the second audio data, the portion of the first audio data and the portion of the second audio data associated with a first frequency range;
determine lag estimate data including the first lag estimate value and a second lag estimate value corresponding to a second frequency range;
determine that the first lag estimate value corresponds to one of the first direction or the second direction; and
determine, based on the first audio data and the lag estimate data, the first energy value.

20. The system of claim 13, wherein the memory further comprises instructions that, when executed by the at least one processor, further cause the system to:
use the first microphone pair to determine first energy data corresponding to the plurality of directions;
detect a first peak in the first energy data, the first peak corresponding to the first direction;
determine a first width of the first peak;
use a second microphone pair to determine second energy data corresponding to the plurality of directions, the second microphone pair comprising the second microphone and the third microphone;
detect a second peak in the second energy data, the second peak corresponding to the first direction;
determine a second width of the second peak;
determine that the second width is greater than the first width;
generate a first portion of energy peak data indicating the second width; and
use the second width to generate mask data corresponding to the audio source, wherein the mask data indicates a plurality of frequency ranges that are associated with the audio source.

* * * * *